(12) United States Patent　　(10) Patent No.: US 12,544,137 B2
Zimmermann et al.　　(45) Date of Patent: Feb. 10, 2026

(54) ULTRASOUND BASED MULTIPLE BONE REGISTRATION SURGICAL SYSTEMS AND METHODS OF USE IN COMPUTER-ASSISTED SURGERY

(71) Applicant: MAKO Surgical Corp., Weston, FL (US)

(72) Inventors: Peter Zimmermann, Freiburg (DE); Raphael Prevost, Munich (DE)

(73) Assignee: MAKO Surgical Corp.

( * ) Notice: Subject to any disclaimer, the term of this patent is extended or adjusted under 35 U.S.C. 154(b) by 697 days.

(21) Appl. No.: 17/452,317

(22) Filed: Oct. 26, 2021

(65) Prior Publication Data

US 2022/0125517 A1　　Apr. 28, 2022

Related U.S. Application Data

(60) Provisional application No. 63/105,973, filed on Oct. 27, 2020.

(51) Int. Cl.
*A61B 34/10*　　(2016.01)
*A61B 34/20*　　(2016.01)
*G06T 7/37*　　(2017.01)

(52) U.S. Cl.
CPC .............. *A61B 34/10* (2016.02); *A61B 34/20* (2016.02); *G06T 7/37* (2017.01);
(Continued)

(58) Field of Classification Search
CPC ... A61B 34/10; A61B 34/20; A61B 2034/105; A61B 2034/2055; A61B 2034/2063;
(Continued)

(56) References Cited

U.S. PATENT DOCUMENTS 5,595,193 A　　1/1997　Walus et al.
2008/0312530 A1 *　12/2008　Malackowski ...... A61B 5/1127
　　　　　　　　　　　　　　　　　　600/426
(Continued)

FOREIGN PATENT DOCUMENTS

WO　WO 2019/035049 A1　2/2019
WO　WO-2020026223 A1 *　2/2020 ........... G06F 18/214

OTHER PUBLICATIONS

International Search Report and Written Opinion, PCT/US2021/072042, dated Jan. 31, 2022.

*Primary Examiner* — Sean A Frith
(74) *Attorney, Agent, or Firm* — Polsinelli PC

(57) ABSTRACT

Disclosed herein is a surgical system for surgical registration of patient bones to a surgical plan. As part of its ability to perform the surgical registration, the system is configured to process an ultrasound image of patient bones, the ultrasound image including a bone surface for each of the patient bones. The system includes a computing device including a processing device and a computer-readable medium with one or more executable instructions stored thereon. The processing device is configured to execute the one or more executable instructions. The one or more executable instructions: i) detects the bone surface of each of the patient bones in the ultrasound image; and ii) segregates a first point cloud of ultrasound image pixels associated with the bone surface of each of the patient bones.

32 Claims, 29 Drawing Sheets
(12 of 29 Drawing Sheet(s) Filed in Color)

(52) U.S. Cl.
CPC . *A61B 2034/105* (2016.02); *A61B 2034/2055* (2016.02); *A61B 2034/2063* (2016.02); *G06T 2207/10028* (2013.01); *G06T 2207/10136* (2013.01); *G06T 2207/20081* (2013.01); *G06T 2207/20084* (2013.01); *G06T 2207/30008* (2013.01)

(58) Field of Classification Search
CPC ............. G06T 7/37; G06T 2207/10028; G06T 2207/10136; G06T 2207/20081; G06T 2207/20084; G06T 2207/30008
See application file for complete search history.

(56) References Cited

U.S. PATENT DOCUMENTS

| | | | |
|---|---|---|---|
| 2013/0144135 A1* | 6/2013 | Mahfouz .................. | A61B 5/00 600/309 |
| 2014/0193053 A1* | 7/2014 | Kadoury ................ | A61B 90/36 382/128 |
| 2017/0071673 A1* | 3/2017 | Ferro .................... | A61B 5/1079 |
| 2017/0367766 A1* | 12/2017 | Mahfouz ............... | A61B 8/4472 |
| 2019/0314091 A1* | 10/2019 | Murphy ................. | A61B 34/20 |

\* cited by examiner

FIG. 4B
FIG. 4C
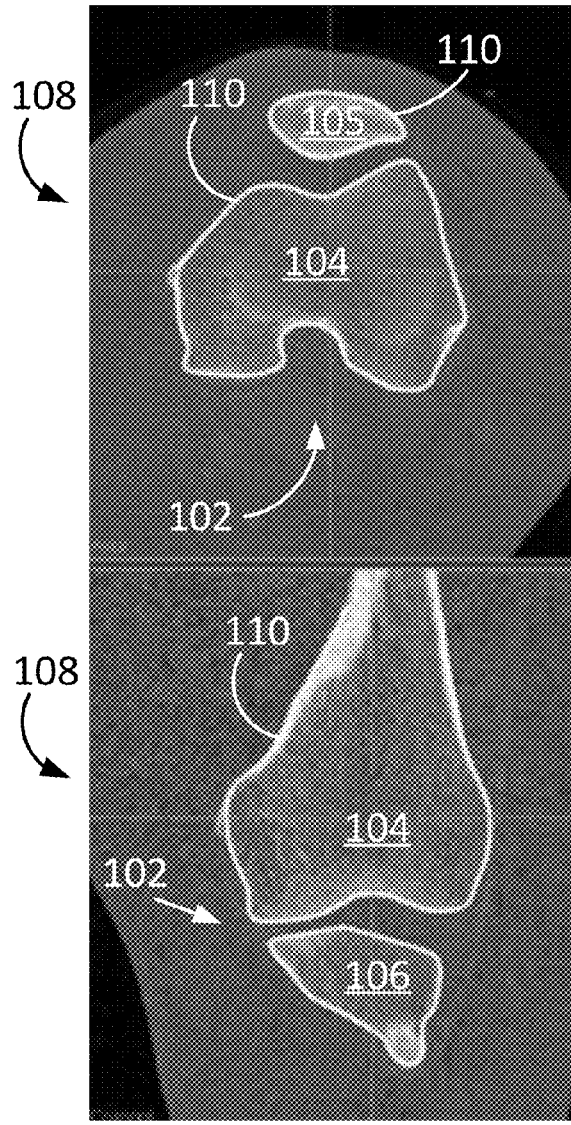
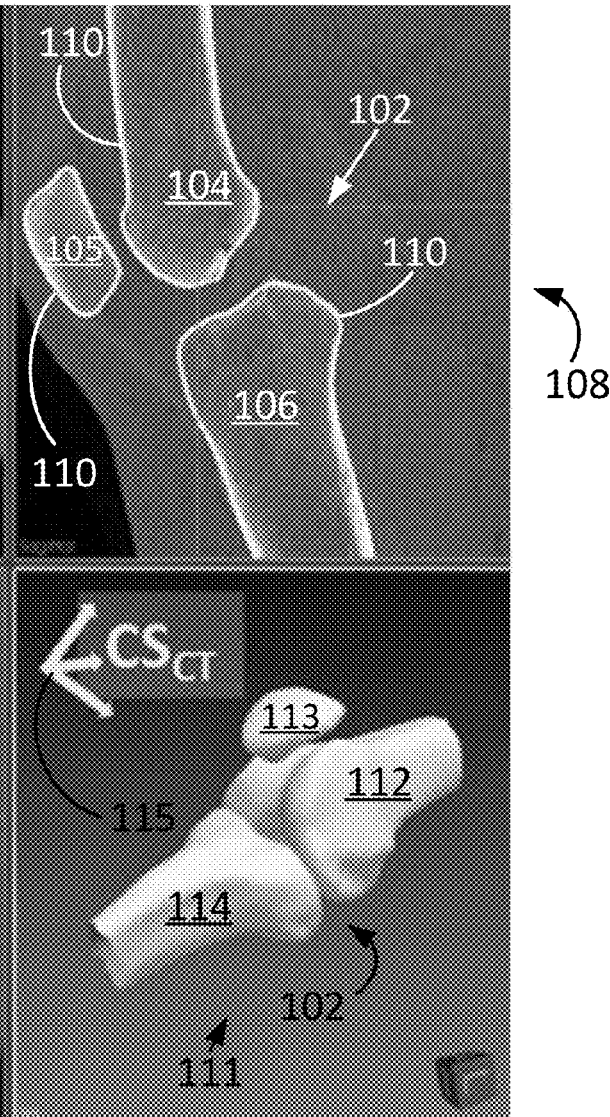
FIG. 4D
FIG. 4E

ULTRASOUND BASED MULTIPLE BONE REGISTRATION SURGICAL SYSTEMS AND METHODS OF USE IN COMPUTER-ASSISTED SURGERY

CROSS-REFERENCE TO RELATED APPLICATIONS

This application claims the benefit of U.S. Provisional Application No. 63/105,973, filed Oct. 27, 2020, which is hereby incorporated by reference in its entirety into the present application.

TECHNICAL FIELD

The present disclosure relates to medical systems and methods for use in computer-assisted surgery. More specifically, the present disclosure relates to surgical registration systems and methods in computers-assisted surgery.

BACKGROUND

Modern orthopedic joint replacement surgery typically involves at least some degree of preoperative planning of the surgery in order to increase the effectiveness and efficiency of the particular procedure. In particular, preoperative planning may increase the accuracy of bone resections and implant placement while reducing the overall time of the procedure and the time the patient joint is open and exposed.

The use of robotic systems in the performance of orthopedic joint replacement surgery can greatly reduce the intraoperative time of a particular procedure. Increasingly, the effectiveness of the procedure may be based on the tools, systems, and methods utilized during the preoperative planning stages.

Examples of steps involved in preoperative planning may involve determining: implant size, position, and orientation; resection planes and depths; access trajectories to the surgical site; and others. In certain instances, the preoperative plan may involve generating a three-dimensional ("3D"), patient specific, model of the patient bone(s) and soft tissue to undergo the joint replacement. The 3D patient model may be used as a visual aid in planning the various possibilities of implant sizes, implant orientations, implant positions, and corresponding resection planes and depths, among other parameters.

But, before the robotic system can perform the joint replacement, the robotic system and navigation system must be registered to the patient. Registration involves mapping of the virtual boundaries and constraints as defined in the preoperative plan to the patient in physical space so the robotic system can be accurately tracked relative to the patient and constrained relative to the boundaries as applied to the patient's anatomy.

While the framework for certain aspects of surgical registration may be known in the art, there is a need for systems and methods to further refine certain aspects of registration to further increase efficiency and effectiveness in robotic and robotic-assisted orthopedic joint replacement surgery.

BRIEF SUMMARY

Aspects of the present disclosure may include one or a combination of various neural network(s) being trained to detect, and optionally classify, bone surfaces in ultrasound images.

Aspects of the present disclosure may also include an algorithm able to co-register simultaneously bone surfaces of N bones (typically forming a joint) between an ultrasound modality and a second modality (e.g. CT/MRI, or surface reconstruction employing one or more statistical/generic models morphed according to patient anatomical data), capturing these bones by optimizing: at least N×6 DOF transformations from the ultrasound modality to the second modality; and classification information assigning regions in the ultrasound modality image data to one of the N captured bones.

In certain instances, in order to stitch together individual ultrasound images (capturing just a slice/small part of the bone) into one consistent 3D-image data set, the ultrasound probe is tracked relative to anatomy trackers attached to each of the N captured bones. Where the scanned bones are immobilized, the ultrasound images can be stitched together by tracking the ultrasound probe only.

In certain instances, the multiple registrations can be 3D-point cloud-/mesh based. In such a situation, the N bones may be segmented in the 2nd modality (CT/MRI-bone-segmentation), obtaining triangulated meshes.

In certain instances, the multiple registrations can be image-based. In such a situation, the classified ultrasound data is directly matched to the second modality without the need of detecting the bone surfaces of the ultrasound images.

Aspects of the present disclosure may include a system for surgical registration of patient bones to a surgical plan, the surgical registration employing ultrasound images of the patient bones, the ultrasound images including an individual ultrasound image including bone surfaces of multiple bones, the individual ultrasound image having been generated from an ultrasound scan resulting from a single swath of an ultrasound probe across the patient bones. In such a system, the system includes a computing device including a processing device and a computer-readable medium with one or more executable instructions stored thereon. The processing device is configured to execute the one or more instructions. The one or more executable instructions include one or more neural networks trained to: i) detect the bone surfaces in the individual ultrasound image; and ii) classify each of the bone surfaces in the individual ultrasound image according to type of bone to arrive at classified bone surfaces.

The one or more neural networks may include a convolutional network that detects the bone surfaces in the individual ultrasound image. Depending on the embodiment, the one or more neural networks may include a pixel classification network and/or a likelihood classification network that classify each of the bone surfaces.

The system is advantageous because it can receive an individual ultrasound image having bone surfaces of multiple bones and then: i) detect the bone surfaces in the individual ultrasound image; and ii) classify each of the bone surfaces according to its type of bone to arrive at classified bone surfaces. In other words, the system can still detect and classify bone surfaces despite the individual ultrasound image including bone surfaces of multiple bones. This capability advantageously allows the individual ultrasound image to be generated from an ultrasound scan resulting from a single swath of an ultrasound probe across the patient bones forming a joint. Accordingly, because of this capability, there is no need for swaths of the ultrasound probe across the patient bones of the joint to be limited to a single bone; the swath can simply extend across all bones of a joint such that the resulting ultrasound images contain multiple bones and the system is able to detect the bone surfaces and classify them such that the bone surfaces are sorted out by the system.

In one version of the system, the processing device executes the one or more instructions to compute a transformation of 2D image pixels of the classified bone surfaces of the individual ultrasound image to 3D points, thereby generating a classified 3D bone surface point cloud. Depending on the embodiment, in computing the transformation of 2D image pixels of the classified bone surfaces of the individual ultrasound image to 3D points, the propagation speed of ultrasound waves in a certain medium may be accounted for, a known set of poses of an ultrasound probe may be acquired relative to a probe tracker in relation to the ultrasound probe coordinate system, and a transform may be calculated between a probe tracker space and the ultrasound probe coordinate system.

In one version of the system, the processing device executes the one or more instructions to compute an initial or rough registration of the patient bones to a computer model of the patient bones.

In one embodiment of the system in computing the initial or rough registration of the patient bones to the computer model of the patient bones, a first point cloud and a second point cloud are generated by the system, the first point cloud being of a first bone of the patient bones relative to a first tracker associated with the first bone, and the second point cloud being of a second bone of the patient bones relative to a second tracker associated with the second bone. Thus, in the context of a patient knee, the first point cloud is of a femur of the patient bones relative to a first tracker secured to the femur, and the second point cloud is of a tibia relative to a second tracker secured to the tibia. In computing the initial or rough registration of the patient bones to the computer model of the patient bones, the system matches bony surface points of the first point cloud onto a computer model of the first bone and the bony surface points of the second point cloud onto a computer model of the second bone.

In other embodiments of the system in computing the initial or rough registration of the patient bones to the computer model of the patient bones, the system may employ landmark based registration and/or anatomy tracker pins based registration.

In one version of the system, the processing device executes the one or more instructions to compute a final multiple bone registration employing the initial or rough registration and the classified 3D bone surface point cloud, wherein the final multiple bone registration achieves convergence between the classified 3D bone surface point cloud and the patient bones. Depending on the embodiment, in computing the final multiple bone registration wherein there is convergence between the classified 3D bone surface point cloud and the patient bones, the system may apply the initial or rough registration to the classified 3D bone surface point cloud with reference to a first tracker. In the context of a knee joint, the first tracker may be attached to the femur.

Depending on the embodiment, in computing the final multiple bone registration wherein there is convergence between the classified 3D bone surface point cloud and the patient bones, the system iteratively calculates nearest points of the classified 3D surface point cloud to the computer model of the patient bones.

Aspects of the present disclosure may include a method of registering multiple bones of a patient joint to a surgical plan. Depending on the embodiment, the method may include: receiving ultrasound images of the patient joint, wherein at least some of the ultrasound images depict the multiple bones; employing a convolutional network to detect in the ultrasound images bone surfaces of the multiple bones; employing at least one of a likelihood classifier network or a pixel classifier network to classify each of the bone surfaces according to its type of bone to arrive at classified bone surfaces; transforming 2D ultrasound image pixels of the classified bone surfaces into 3D, resulting in a classified 3D bone surface point cloud; generate an initial rough registration of the multiple bones of the patient joint to medical image representations of the multiple bones of the patient joint; and calculate a final multiple bone registration of the multiple bones of the patient joint to the surgical plan by applying the initial rough registration to the classified 3D bone surface point cloud.

In one embodiment, in transforming the 2D ultrasound image pixels of the classified bone surfaces into 3D, the propagation speed of ultrasound waves in a certain medium may be accounted for.

In one embodiment, in transforming the 2D ultrasound image pixels of the classified bone surfaces into 3D, the 2D ultrasound image pixels of the classified bone surfaces may be mapped from 2D pixel space into a 3D metric coordinate system of an ultrasound probe coordinate system.

In one embodiment, in transforming the 2D ultrasound image pixels of the classified bone surfaces into 3D, a known set of poses of an ultrasound probe may be acquired relative to a probe tracker in relation to the ultrasound probe coordinate system.

In one embodiment, in transforming the 2D ultrasound image pixels of the classified bone surfaces into 3D, a transform may be calculated between a probe tracker space and the ultrasound probe coordinate system.

In one embodiment, in generating an initial rough registration of the multiple bones of the patient joint to medical image representations of the multiple bones of the patient joint, a first point cloud and a second point cloud may be generated, the first point cloud being of a first bone of the multiple bones relative to a first tracker associated with the first bone, the second point cloud being of a second bone of the multiple bones relative to a second tracker associated with the second bone.

In one embodiment, in generating an initial rough registration of the multiple bones of the patient joint to medical image representations of the multiple bones of the patient joint, bony surface points of the first point cloud may be matched onto a computer model of the first bone and bony surface points of the second point cloud are matched onto a computer model of the second bone.

In one embodiment, in generating an initial rough registration of the multiple bones of the patient joint to medical image representations of the multiple bones of the patient joint, landmark based registration may be employed.

In one embodiment, in generating an initial rough registration of the multiple bones of the patient joint to medical image representations of the multiple bones of the patient joint, anatomy tracker pins based registration may be employed.

In one embodiment, in calculating a final multiple bone registration of the multiple bones of the patient joint to the surgical plan by applying the initial rough registration to the classified 3D bone surface point cloud, the final multiple bone registration achieves convergence between the classified 3D bone surface point cloud and the patient bones. In doing so, the initial rough registration may be applied to the classified 3D bone surface point cloud with reference to a first tracker. Depending on the embodiment, during this final registration, the algorithm employed converges until its results reach a stable state, and the algorithm may also refine the classification of the classified 3D bone surface point cloud itself, so that any initial errors in the classification can be eliminated or at least reduced. In achieving these aspects of the final registration, the classified 3D bone surface point cloud and the initial or rough registration become well registered, resulting in the final multiple bone registration.

In one embodiment, in calculating a final multiple bone registration of the multiple bones of the patient joint to the surgical plan by applying the initial rough registration to the classified 3D bone surface point cloud, iterative calculations may be made of the nearest points of the classified 3D surface point cloud to the computer model of the patient bones.

Aspects of the present disclosure may include a method for surgical registration of patient bones to a surgical plan. Depending on the embodiment, the method may include: receiving ultrasound images of the patient bones, the ultrasound images including an individual ultrasound image including bone surfaces of multiple bones, the individual ultrasound image having been generated from an ultrasound scan resulting from a single swath of an ultrasound probe across the patient bones; and employing one or more neural networks trained to: detect the bone surfaces in the individual ultrasound image; and classify each of the bone surfaces in the individual ultrasound image according to type of bone to arrive at classified bone surfaces.

Aspects of the present disclosure may include a surgical system configured to process an ultrasound image of patient bones, the ultrasound image including a bone surface for each of the patient bones. In one embodiment, the system includes a computing device including a processing device and a computer-readable medium with one or more executable instructions stored thereon. The processing device is configured to execute the one or more executable instructions. The one or more executable instructions i) detect the bone surface of each of the patient bones in the ultrasound image; and ii) segregate a first point cloud of ultrasound image pixels associated with the bone surface of each of the patient bones.

In one version of the embodiment, the detecting of the bone surfaces may occur via an image processing algorithm forming at least a portion of the one or more executable instructions. The image processing algorithm may include a machine learning model. Segregating the first point cloud may occur via a pixel classification neural network forming at least a portion of the one or more executable instructions. Segregating the first point cloud may occur via an image-based classification neural network forming at least a portion of the one or more executable instructions.

In one version of the embodiment, the processing device may execute the one or more executable instructions to compute a transformation of the first point cloud into a segregated 3D point cloud that is segregated such that the ultrasound image pixels of the segregated 3D point cloud are each correlated to a corresponding bone surface of the patient bones. In computing the transformation of the first point cloud into the segregated 3D point cloud, the ultrasound image pixels may be calibrated to an ultrasound probe tracker and the ultrasound probe tracker is calibrated to a tracking camera. In calibrating the ultrasound image pixels to the ultrasound probe tracker, a propagation speed of ultrasound waves in a certain medium may be accounted for. In computing the transformation of the first point cloud into the segregated 3D point cloud, the ultrasound image pixels may be calibrated to an ultrasound probe tracker, the ultrasound probe tracker is calibrated to a tracking camera, and a coordinate system is relative to the bone surface via an anatomy tracker located on the bone surface of the patient bones. The segregating the first point cloud may occur via geometric analysis of the first point cloud.

In one version of the embodiment, the one or more executable instructions may compute an initial or rough registration of a second point cloud taken from the patient bones to bone models of the patient bones. The second point cloud may include multiple point clouds relative to multiple trackers on the patient bones. The multiple point clouds may include one point cloud registered to one bone model of the bone models of the patient bones and another point cloud registered to another bone model of the bone models of the patient bones.

The initial or rough registration may be landmark based. The initial or rough registration may be computed from a position and orientation of anatomy trackers. In computing the initial or rough registration, a third point cloud and a fourth point cloud may be generated by the system, the third point cloud being of a first bone of the patient bones relative to a first tracker associated with the first bone, the fourth point cloud being of a second bone of the patient bones relative to a second tracker associated with the second bone.

In one version of the embodiment, in the computing the initial or rough registration, the system may match bony surface points of the third point cloud onto a computer model of the first bone and the bony surface points of the fourth point cloud onto a computer model of the second bone.

In one version of the embodiment, the processing device may execute the one or more instructions to compute a final multiple bone registration employing the initial or rough registration and the segregated 3D point cloud, wherein the final multiple bone registration achieves a final registration between the segregated 3D point cloud and the patient bones. In computing the final multiple bone registration wherein there is the final registration between the classified 3D bone surface point cloud and the patient bones, the system may iteratively refine the registration of the segregated 3D point cloud to the computer model of the patient bones, and iteratively refine the segregation of the segregated 3D point cloud.

Aspects of the present disclosure may include a method of processing an ultrasound image of patient bones, the ultrasound image including a bone surface for each of the patient bones. One embodiment of such a method may include: detecting the bone surface of each of the patient bones in the ultrasound image; and segregating a first point cloud of ultrasound image pixels associated with the bone surface of each of the patient bones.

In one version of the embodiment, the detecting of the bone surfaces may occur via an image processing algorithm. The image processing algorithm may include a machine learning model. The segregating the first point cloud may occur via a pixel classification neural network. The segregating the first point cloud may occur via an image-based classification neural network.

In one version of the embodiment, the method further includes computing a transformation of the first point cloud into a segregated 3D point cloud that is segregated such that the ultrasound image pixels of the segregated 3D point cloud are each correlated to a corresponding bone surface of the patient bones. In computing the transformation of the first point cloud into the segregated 3D point cloud, the ultrasound image pixels may be calibrated to an ultrasound probe tracker and the ultrasound probe tracker is calibrated to a tracking camera. In calibrating the ultrasound image pixels to the ultrasound probe tracker, a propagation speed of ultrasound waves in a certain medium may be accounted for.

In one version of the embodiment, in computing the transformation of the first point cloud into the segregated 3D point cloud, the ultrasound image pixels may be calibrated to an ultrasound probe tracker, the ultrasound probe tracker is calibrated to a tracking camera, and a coordinate system is relative to the bone surface via an anatomy tracker located on the bone surface of the patient bones. The segregating the first point cloud may occur via geometric analysis of the first point cloud.

In one version of the embodiment, the method further includes computing an initial or rough registration of a second point cloud taken from the patient bones to bone models of the patient bones. The second point cloud may include multiple point clouds relative to multiple trackers on the patient bones. The multiple point clouds may include one point cloud registered to one bone model of the bone models of the patient bones and another point cloud registered to another bone model of the bone models of the patient bones. The initial or rough registration may be landmark based. The initial or rough registration may be computed from a position and orientation of anatomy trackers.

In one version of the embodiment, in computing the initial or rough registration, a third point cloud and a fourth point cloud may be generated, the third point cloud being of a first bone of the patient bones relative to a first tracker associated with the first bone, the fourth point cloud being of a second bone of the patient bones relative to a second tracker associated with the second bone. In computing the initial or rough registration, bony surface points of the third point cloud may be matched onto a computer model of the first bone and the bony surface points of the fourth point cloud are matched onto a computer model of the second bone.

In one version of the embodiment, the method further includes computing a final multiple bone registration employing the initial or rough registration and the segregated 3D point cloud, wherein the final multiple bone registration achieves a final registration between the segregated 3D point cloud and the patient bones. In computing the final multiple bone registration wherein there is the final registration between the classified 3D bone surface point cloud and the patient bones, the registration of the segregated 3D point cloud to the computer model of the patient bones may be iteratively refined, and the segregation of the segregated 3D point cloud is iteratively refined.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4B is an axial image of the knee joint showing the femur and patella.

FIG. 4C is a sagittal image of the knee joint showing the femur, patella and tibia.

FIG. 4D is a coronal image of the knee joint showing the femur and tibia.

FIG. 4E is a 3D joint model including 3D models of the femur, patella and tibia.

DETAILED DESCRIPTION

Figure 1:
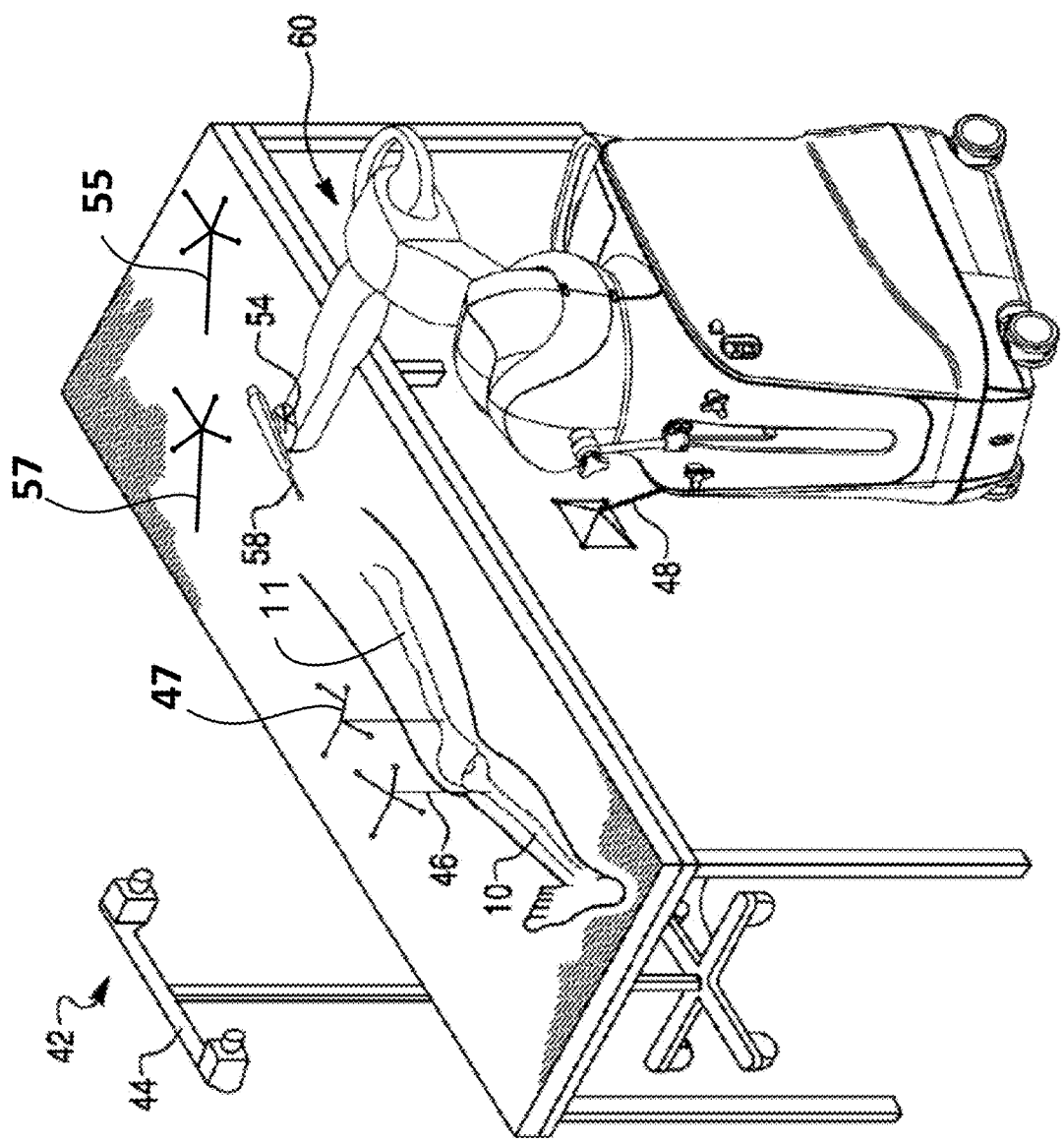
FIG. 1 is an illustration of a surgical system.
Figure 1:
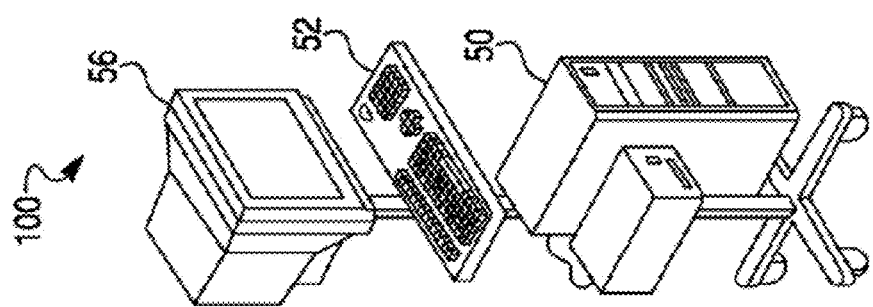

The present application incorporates by reference the following applications in their entireties: International Application PCT/US2017/049466, filed Aug. 30, 2017, entitled "SYSTEMS AND METHODS FOR INTRA-OPERATIVE PELVIC REGISTRATION"; PCT/US2016/034847 filed May 27, 2016, entitled "PREOPERATIVE PLANNING AND ASSOCIATED INTRAOPERATIVE REGISTRATION FOR A SURGICAL SYSTEM"; U.S.

patent application Ser. No. 12/894,071, filed Sep. 29, 2010, entitled "SURGICAL SYSTEM FOR POSITIONING PROSTHETIC COMPONENT AND/OR FOR CONSTRAINING MOVEMENT OF SURGICAL TOOL"; U.S. patent application Ser. No. 13/234,190, filed Sep. 16, 2011, entitled "SYSTEMS AND METHOD FOR MEASURING PARAMETERS IN JOINT REPLACEMENT SURGERY"; U.S. patent application Ser. No. 11/357,197, filed Feb. 21, 2006, entitled "HAPTIC GUIDANCE SYSTEM AND METHOD"; U.S. patent application Ser. No. 12/654,519, filed Dec. 22, 2009, entitled "TRANSMISSION WITH FIRST AND SECOND TRANSMISSION ELEMENTS"; U.S. patent application Ser. No. 12/644,964, filed Dec. 22, 2009, entitled "DEVICE THAT CAN BE ASSEMBLED BY COUPLING"; and U.S. patent application Ser. No. 11/750, 807, filed May 18, 2007, entitled "SYSTEM AND METHOD FOR VERIFYING CALIBRATION OF A SURGICAL DEVICE".

Surgical registration systems and methods for use in conjunction with a surgical system 100 are disclosed herein. Surgical registration entails mapping of virtual boundaries, determined in preoperative planning, for example, with working boundaries in physical space. A surgical robot may be permitted to perform certain actions within the virtual boundaries, such as boring a hole or resecting a bone surface. Once the virtual boundaries are mapped to the physical space of the patient, the robot may bore the hole or resect the bone surface in a location and orientation as planned, but may be constrained from performing such actions outside the pre-planned virtual boundaries. Accurate and precise registration of the patient's anatomy allows for accurate navigation of the surgical robot during the surgical procedure. The need for accuracy and precision in the registration process must be balanced with the time required to perform the registration.

In the case of a robotically assisted surgery, virtual boundaries may be defined in the preoperative planning. In the case of a fully robotic surgery, a virtual toolpath may be defined in the preoperative planning. In either case, preoperative planning may include, for example, defining bone resection depths and identifying whether or not unacceptable notching of the femoral anterior cortex is associated with the proposed bone resection depths and proposed pose of the candidate implants. Assuming the preoperatively planned bone resection depths and implant poses are free of unacceptable notching of the femoral anterior cortex and approved by the surgeon, the bone resection depths can be updated to account for cartilage thickness by intraoperatively registering the cartilage condylar surfaces of the actual patient bones to the patient bone models employed in the preoperative planning. By so accounting for the cartilage thickness, the actual implants, upon implantation via the surgical system 100, will have their respective condylar surfaces located so as to act in place of the resected cartilage condylar surfaces of the actual patient bones. Further description of preoperative planning may be found in PCT/US2016/034847 filed May 27, 2016, entitled "PREOPERATIVE PLANNING AND ASSOCIATED INTRAOPERATIVE REGISTRATION FOR A SURGICAL SYSTEM", which is incorporated by reference in its entirety herein.

Before beginning a detailed discussion of the surgical registration, an overview of the surgical system and its operation will now be given as follows.

I. Overview of Surgical System

To begin a detailed discussion of the surgical system, reference is made to FIG. 1. As can be understood from FIG. 1, the surgical system 100 includes a navigation system 42, a computer 50, and a haptic device 60 (also referred to as a robotic arm 60). The navigation system tracks the patient's bone (i.e., tibia 10, femur 11), as well as surgical tools (e.g., pointer device, probe, cutting tool) utilized during the surgery, to allow the surgeon to visualize the bone and tools on a display 56 during the osteotomy procedure.

The navigation system 42 may be any type of navigation system configured to track the pose (i.e. position and orientation) of a bone. For example, the navigation system 42 may include a non-mechanical tracking system, a mechanical tracking system, or any combination of non-mechanical and mechanical tracking systems. The navigation system 42 includes a detection device 44 that obtains a pose of an object with respect to a coordinate frame of reference of the detection device 44. As the object moves in the coordinate frame of reference, the detection device tracks the pose of the object to detect movement of the object.

In one embodiment, the navigation system 42 includes a non-mechanical tracking system as shown in FIG. 1. The non-mechanical tracking system is an optical tracking system with a detection device 44 and trackable elements (e.g. navigation markers 46, 47) that are respectively disposed on tracked objects (e.g., patient tibia 10 and femur 11) and are detectable by the detection device 44. In one embodiment, the detection device 44 includes a visible light-based detector, such as a MicronTracker (Claron Technology Inc., Toronto, Canada), that detects a pattern (e.g., a checkerboard pattern) on a trackable element. In another embodiment, the detection device 44 includes a stereo camera pair sensitive to infrared radiation and positionable in an operating room where the arthroplasty procedure will be performed. The trackable element is affixed to the tracked object in a secure and stable manner and includes an array of markers having a known geometric relationship to the tracked object. As is known, the trackable elements may be active (e.g., light emitting diodes or LEDs) or passive (e.g., reflective spheres, a checkerboard pattern, etc.) and have a unique geometry (e.g., a unique geometric arrangement of the markers) or, in the case of active, wired or wireless markers, a unique firing pattern. In operation, the detection device 44 detects positions of the trackable elements, and the surgical system 100 (e.g., the detection device 44 using embedded electronics) calculates a pose of the tracked object based on the trackable elements' positions, unique geometry, and known geometric relationship to the tracked object. The tracking system 42 includes a trackable element for each object the user desires to track, such as the navigation marker 46 located on the tibia 10 and the navigation marker 47 located on the femur 11. During haptically guided robotic-assisted surgeries, the navigation system may further include a haptic device marker 48 (to track a global or gross position of the haptic device 60), an end effector marker 54 (to track a distal end of the haptic device 60), and free-hand navigation probes 55, 57 for use in the registration process and that will be in the form of a tracked ultrasound probe 55 and a tracked stylus 57 that has a pointed tip for touching certain relevant anatomical landmarks on the patient and certain registration locations on parts of the system 100. Additionally or alternatively, the system 100 may employ electro-magnetic tracking.

While the systems and methods disclosed herein are given in the context of a robotic assisted surgical system employing the above-described navigation system, such as, for example, that employed by the Mako® surgical robot of Stryker®, the disclosure is readily applicable to other navigated surgical systems. For example, additionally or alternatively, the systems and methods disclosed herein may be applied to surgical procedures employing navigated arthroplasty jigs to prepare the bone, such as, for example, in the context the eNact Knee Navigation software of Stryker®. Similarly and also additionally or alternatively, the systems and methods disclosed herein may be applied to surgical procedures employing navigated saws or handheld robots to prepare the bone.

As indicated in FIG. 1, the surgical system 100 further includes a processing circuit, represented in the figures as a computer 50. The processing circuit includes a processor and memory device. The processor can be implemented as a general purpose processor, an application specific integrated circuit (ASIC), one or more field programmable gate arrays (FPGAs), a group of processing components, a purpose-specific processor, or other suitable electronic processing components. The memory device (e.g., memory, memory unit, storage device, etc.) is one or more devices (e.g., RAM, ROM, Flash memory, hard disk storage, etc.) for storing data and/or computer code for completing or facilitating the various processes, layers and functions described in the present application. The memory device may be or include volatile memory or non-volatile memory. The memory device may include database components, object code components, script components, or any other type of information structure for supporting the various activities and information structures described in the present application. According to an exemplary embodiment, the memory device is communicably connected to the processor via the processing circuit and includes computer code for executing (e.g., by the processing circuit and/or processor) one or more processes described herein.

The computer 50 is configured to communicate with the navigation system 42 and the haptic device 60. Furthermore, the computer 50 may receive information related to orthopedic/arthroplasty procedures and perform various functions related to performance of osteotomy procedures. For example, the computer 50 may have software as necessary to perform functions related to image analysis, surgical planning, registration, navigation, image guidance, and haptic guidance. More particularly, the navigation system may operate in conjunction with an autonomous robot or a surgeon-assisted device (haptic device) in performing the arthroplasty procedure.

Figure 2:
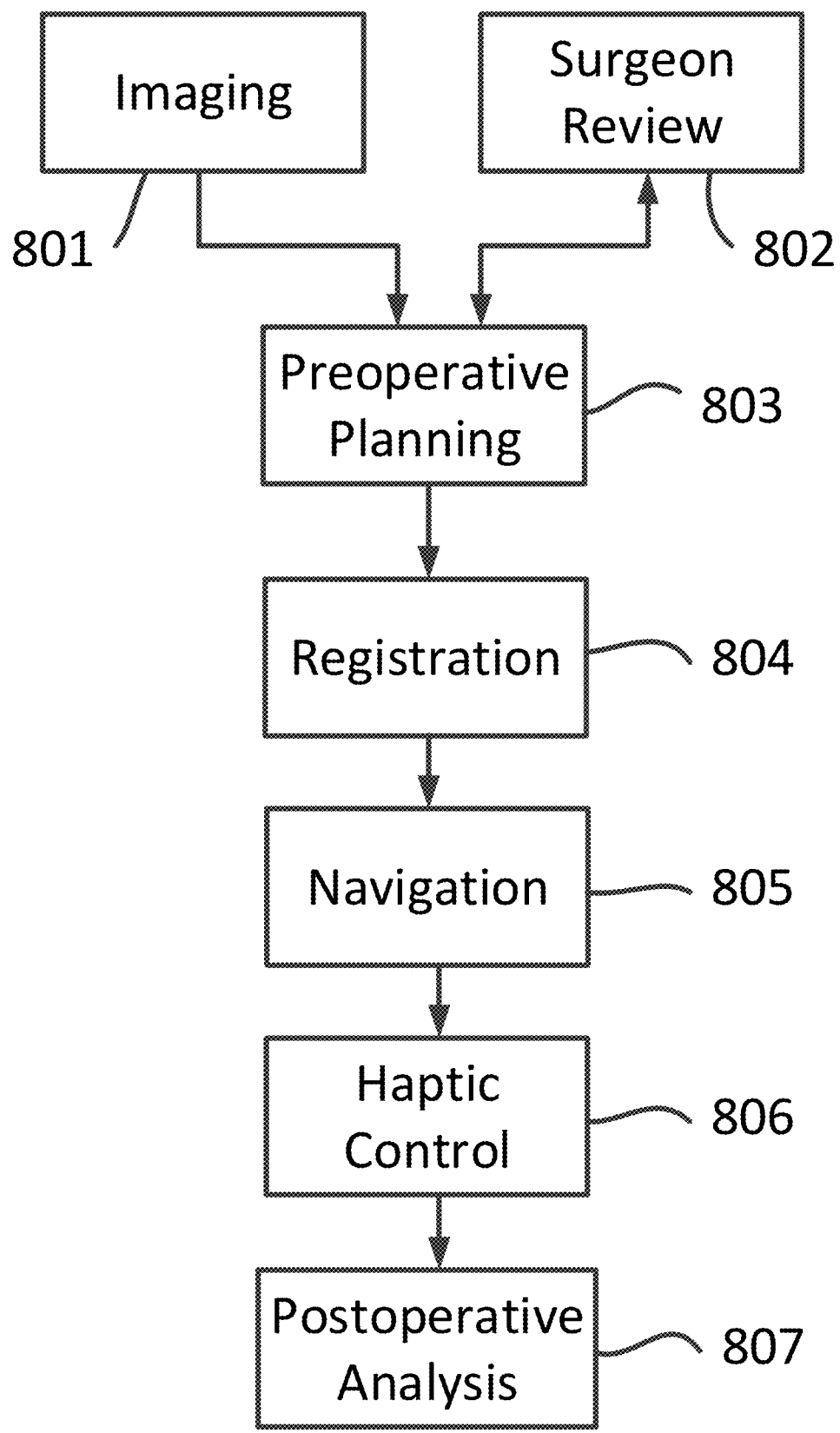
FIG. 2 is a flow chart illustrating surgical planning and performance of an arthroplasty.

The computer 50 receives images of the patient's anatomy on which an arthroplasty procedure is to be performed. Referring to FIG. 2, prior to performance of an arthroplasty, the patient's anatomy may be scanned using any known imaging technique, such as CT or MRI (Step 801) captured with a medical imaging machine. And while the disclosure makes reference to medical images captured or generated with a medical imaging machine such as a CT or MRI machine, other methods of generating the medical images are possible and contemplated herein. For example, an image of the bone may be generated intra-operatively via a medical imaging machine such as a hand-held scanning or imaging device that scans or registers the topography of the bone surface. As yet another example, patient anatomical data taken from a wide variety of modalities, either preoperatively or intraoperatively, may be used to generate the medical images by morphing one or more statistical/generic models according to the patient anatomical data. Thus, the term medical imaging machine is intended to encompass devices of various size (e.g., C-arm, hand-held device), located at imaging centers or used intra-operatively, and the term medical images is intended to encompass images, models or other patient anatomically representative data useful in planning and performing the arthroplasty procedure.

Continuing on, the scan data is then segmented to obtain a three-dimensional representation of the patient's anatomy. For example, prior to performance of a knee arthroplasty, a three-dimensional representation of the femur and tibia is created. Using the three-dimensional representation and as part of the planning process, femoral and tibial landmarks can be selected, and the patient's femoral-tibial alignment is calculated along with the orientation and placement of the proposed femoral and tibial implants, which may be selected as to model and size via the computer 50. The femoral and tibial landmarks may include the femoral head center, the distal trochlear groove, the center of intercondylar eminence, the tibia-ankle center, and the medial tibial spine, among others. The femoral-tibial alignment is the angle between the femur mechanical axis (i.e., line from femoral head center to distal trochlear groove) and the tibial mechanical axis (i.e., line from ankle center to intercondylar eminence center). Based on the patient's current femoral-tibial alignment and the desired femoral-tibial alignment to be achieved by the arthroplasty procedure and further including the size, model and placement of the proposed femoral and tibial implants, including the desired extension, varus-valgus angle, and internal-external rotation associated with the implantation of the proposed implants, the computer 50 is programmed to calculate the desired implantation of the proposed implants or at least assist in the preoperative planning of the implantation of the proposed implants, including the resections to be made via the haptic device 60 in the process of performing the arthroplasty procedure (Step 803). The preoperative plan achieved via Step 803 is provided to the surgeon for review, adjustment and approval, and the preoperative plan is updated as directed by the surgeon (Step 802).

Since the computer 50 is used to develop a surgical plan according to Step 803, it should be understood that a user can interact with the computer 50 at any stage during surgical planning to input information and modify any portion of the surgical plan. The surgical plan may include a plurality of planned virtual boundaries (in the case of a haptic-based robotically-assisted surgery) or a tool pathway plan (in the case of an autonomous robotic surgery). The virtual boundaries or toolpaths can represent holes and/or cuts to be made in a bone 10, 11 during an arthroplasty procedure. Once the surgical plan has been developed, a haptic device 60 is used to assist a user in creating the planned holes and cuts in the bones 10, 11. Preoperative planning, especially with respect to bone resection depth planning and the prevention of femoral anterior shaft notching, will be explained more fully below.

The drilling of holes and creation of cuts or resections in bones 10, 11 can be accomplished with the assistance of a haptically guided interactive robotic system, such as the haptic guidance system described in U.S. Pat. No. 8,010,180, titled "Haptic Guidance System and Method," granted Aug. 30, 2011, and hereby incorporated by reference herein in its entirety. As the surgeon manipulates a robotic arm to drill holes in the bone or perform cuts with a high speed drill, sagittal saw, or other suitable tool, the system provides haptic feedback to guide the surgeon in sculpting the holes and cuts into the appropriate shape, which is pre-programmed into the control system of the robotic arm. Haptic guidance and feedback will be explained more fully below.

During surgical planning, the computer 50 further receives information related to femoral and tibial implants to be implanted during the arthroplasty procedure. For example, a user may input parameters of selected femoral and tibial implants into the computer 50 using the input device 52 (e.g. keyboard, mouse, etc.). Alternatively, the computer 50 may contain a pre-established database of various implants and their parameters, and a user can choose the selected implants from the database. In a still further embodiment, the implants may be custom designed based on a patient-specific surgical plan. Selection of the implants may occur during any stage of surgical planning The surgical plan may further be based on at least one parameter of the implants or a function of a parameter of the implants. Because the implants can be selected at any stage of the surgical planning process, the implants may be selected prior to or after determination of the planned virtual boundaries by the computer 50. If the implants are selected first, the planned virtual boundaries may be based at least in part on a parameter of the implants. For example, the distance (or any other relationship) between the planned virtual boundaries representing holes or cuts to made in the bones 10, 11 may be planned based on the desired varus-valgus femoral-tibial alignment, extension, internal-external rotation, or any other factors associated with a desired surgical outcome of the implantation of the arthroplasty implants. In this manner, implementation of the surgical plan will result in proper alignment of the resected bone surfaces and holes to allow the selected implants to achieve the desired surgical outcome. Alternatively, the computer 50 may develop the surgical plan, including the planned virtual boundaries, prior to implant selection. In this case, the implant may be selected (e.g. input, chosen, or designed) based at least in part on the planned virtual boundaries. For example, the implants can be selected based on the planned virtual boundaries such that execution of the surgical plan will result in proper alignment of the resected bone surfaces and holes to allow the selected implants to achieve the desired surgical outcome.

The virtual boundaries or toolpath exist in virtual space and can be representative of features existing or to be created in physical (i.e. real) space. Virtual boundaries correspond to working boundaries in physical space that are capable of interacting with objects in physical space. For example, working boundaries can interact with a surgical tool 58 coupled to haptic device 60. Although the surgical plan is often described herein to include virtual boundaries representing holes and resections, the surgical plan may include virtual boundaries representing other modifications to a bone 10, 11. Furthermore, virtual boundaries may correspond to any working boundary in physical space capable of interacting with objects in physical space.

It should be noted that, while the systems and methods disclosed herein are in the context of arthroplasty, they are readily useful in the context of surgeries that do not employ an implant. Thus, for example and not by way of limitation, the navigation and haptics could be preoperatively planned to allow the system disclosed herein to cut out a bone tumor (sarcoma) or make another type of incision or resection in boney or soft tissues in performing generally any type of navigated surgery.

Referring again to FIG. 2, after surgical planning and prior to performing an arthroplasty procedure, the physical anatomy (e.g. bones 10, 11) is registered to a virtual representation of the anatomy (e.g. a preoperative three-dimensional representation) using a registration technique (Step 804), as described in detail below. Registration of the patient's anatomy allows for accurate navigation during the surgical procedure (Step 805), which enables each of the virtual boundaries to correspond to a working boundary in physical space. For example, referring to FIGS. 3A and 3B, a virtual boundary 62 representing a resection in a tibia bone 10 is displayed on a computer or other display 63 and the virtual boundary 62 corresponds to a working boundary 66 in physical space 69, such as a surgery site in a surgical operating room. A portion of working boundary 66 in turn corresponds to the planned location of the resection in the tibia 10.

Figure 3B:
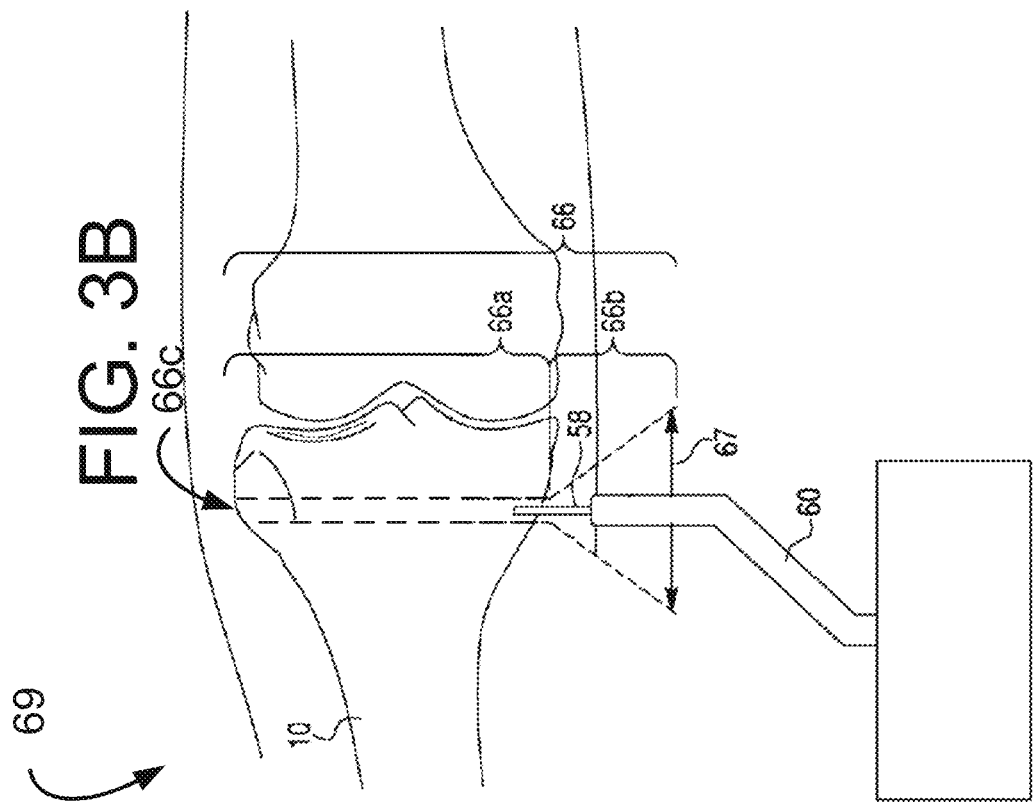
FIGS. 3A and 3B illustrate haptic guidance during performance of an arthroplasty.
Figure 3A:
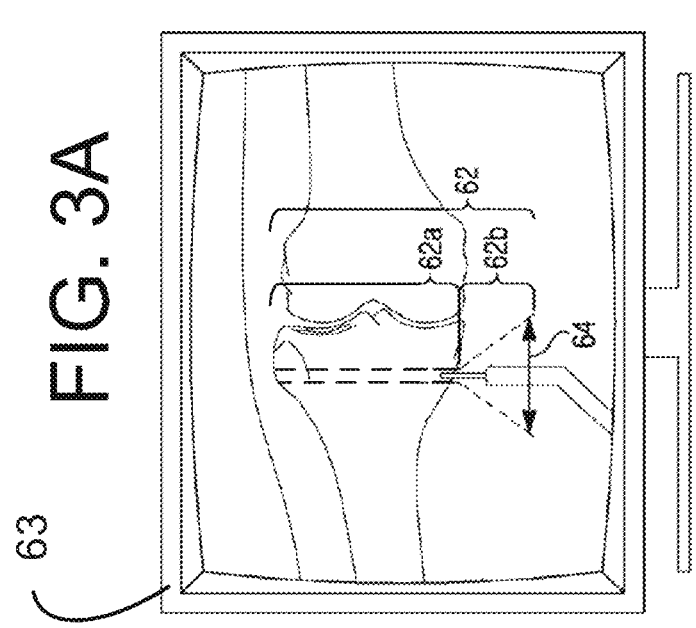

The virtual boundaries and, therefore, the corresponding working boundaries, can be any configuration or shape. Referring to FIG. 3A, virtual boundary 62 representing a proximal resection to be created in the tibia bone 10, may be any configuration suitable for assisting a user during creation of the proximal resection in the tibia 10. Portions of virtual boundary 62, illustrated within the virtual representation of the tibia bone 10, represent bone to be removed by a surgical tool. Similar virtual boundaries may be generated for holes to be drilled or milled into the tibia bone 10 for facilitating the implantation of a tibial implant on the resected tibia 10. The virtual boundaries (and therefore, the corresponding working boundaries) may include a surface or surfaces that fully enclose and surround a three-dimensional volume. In an alternative embodiment, the virtual and working boundaries do not fully enclose a three-dimensional volume, but rather include both "active" surfaces and "open" portions. For example, virtual boundary 62 representing a proximal resection in a tibia bone may have an essentially rectangular box-shaped "active" surface 62a and a collapsing funnel or triangular box-shaped "active" surface 62b connected to the rectangular box-shaped portion, with an "open" portion 64. In one embodiment, virtual boundary 62 can be created with a collapsing funnel as described in U.S. application Ser. No. 13/340,668, titled "Systems and Methods for Selectively Activating Haptic Guide Zones," filed Dec. 29, 2011, and hereby incorporated by reference herein in its entirety. The working boundary 66 corresponding to virtual boundary 62 has the same configuration as virtual boundary 62. In other words, working boundary 66 guiding a proximal resection in a tibia bone 10 may have an essentially rectangular box-shaped "active" surface 66a and a collapsing funnel or triangular box-shaped "active" surface 66b connected to the rectangular box-shaped portion, with an "open" portion 67.

In an additional embodiment, the virtual boundary 62 representing the resection in the bone 10 includes only the substantially rectangular box-shaped portion 62 a. An end of a virtual boundary having only a rectangular box-shaped portion may have an "open" top such that the open top of the corresponding working boundary coincides with the outer surface of the bone 10. Alternatively, as shown in FIGS. 3A and 3B, the rectangular box-shaped working boundary portion 66a corresponding to virtual boundary portion 62 a may extend past the outer surface of the bone 10.

In some embodiments, the virtual boundary 62 representing a resection through a portion of the bone may have an essentially planar shape, with or without a thickness. Alternatively, virtual boundary 62 can be curved or have an irregular shape. Where the virtual boundary 62 is depicted as a line or planar shape and the virtual boundary 62 also has a thickness, the virtual boundary 62 may be slightly thicker than a surgical tool used to create the resection in the bone, such that the tool can be constrained within the active surfaces of working boundary 66 while within the bone. Such a linear or planar virtual boundary 62 may be planned such that the corresponding working boundary 66 extends past the outer surface of the bone 10 in a funnel or other appropriate shape to assist a surgeon as the surgical tool 58 is approaching the bone 10. Haptic guidance and feedback (as described below) can be provided to a user based on relationships between surgical tool 58 and the active surfaces of working boundaries.

The surgical plan may also include virtual boundaries to facilitate entry into and exit from haptic control, including automatic alignment of the surgical tool, as described in U.S. application Ser. No. 13/725,348, titled "Systems and Methods for Haptic Control of a Surgical Tool," filed Dec. 21, 2012, and hereby incorporated by reference herein in its entirety.

The surgical plan, including the virtual boundaries, may be developed based on information related to the patient's bone density. The density of a patient's bone is calculated using data obtained from the CT, MRI, or other imaging of the patient's anatomy. In one embodiment, a calibration object representative of human bone and having a known calcium content is imaged to obtain a correspondence between image intensity values and bone density measurements. This correspondence can then be applied to convert intensity values of individual images of the patient's anatomy into bone density measurements. The individual images of the patient's anatomy, with the corresponding map of bone density measurements, are then segmented and used to create a three-dimensional representation (i.e. model) of the patient's anatomy, including the patient's bone density information. Image analysis, such as finite element analysis (FEA), may then be performed on the model to evaluate its structural integrity.

The ability to evaluate the structural integrity of the patient's anatomy improves the effectiveness of arthroplasty planning. For example, if certain portions of the patient's bone appear less dense (i.e. osteoporotic), the holes, resections and implant placement can be planned to minimize the risk of fracture of the weakened portions of bone. Furthermore, the planned structure of the bone and implant combination after implementation of the surgical plan (e.g. the post-operative bone and implant arrangement) can also be evaluated for structural integrity, pre-operatively, to improve surgical planning. In this embodiment, holes and/or cuts are planned and the bone model and implant model are manipulated to represent the patient's bone and implant arrangement after performance of the arthroplasty and implantation procedures. Various other factors affecting the structural integrity of the post-operative bone and implant arrangement may be taken into account, such as the patient's weight and lifestyle. The structural integrity of the post-operative bone and implant arrangement is analyzed to determine whether the arrangement will be structurally sound and kinematically functional post-operatively. If the analysis uncovers structural weaknesses or kinematic concerns, the surgical plan can be modified to achieve a desired post-operative structural integrity and function.

In one embodiment, once the surgical plan has been finalized, a surgeon may perform the arthroplasty procedure with the assistance of haptic device 60 (step 806). In one embodiment, as an alternative or an addition to the haptic device 60 (step 806), the surgical system 100 employs the OrthoMap® Precision Knee navigation software of Advanced Guidance Technologies of Stryker®. The OrthoMap® Precision Knee navigation software facilitates cutting guides to be navigated into place.

In the context of the embodiment employing haptic device 60 according to Step 806, through haptic device 60, the surgical system 100 provides haptic guidance and feedback to the surgeon to help the surgeon accurately implement the surgical plan. Haptic guidance and feedback during an arthroplasty procedure allows for greater control of the surgical tool compared to conventional arthroplasty techniques, resulting in more accurate alignment and placement of the implant. Furthermore, haptic guidance and feedback is intended to eliminate the need to use K-wires and fluoroscopy for planning purposes. Instead, the surgical plan is created and verified using the three-dimensional representation of the patient's anatomy, and the haptic device provides guidance during the surgical procedure.

"Haptic" refers to a sense of touch, and the field of haptics relates to human interactive devices that provide tactile and/or force feedback to an operator. Tactile feedback generally includes tactile sensations such as, for example, vibration. Force feedback (also known as "wrench") refers to feedback in the form of force (e.g., resistance to movement) and/or torque. Wrench includes, for example, feedback in the form of force, torque, or a combination of force and torque. Haptic feedback may also encompass disabling or altering the amount of power provided to the surgical tool, which can provide tactile and/or force feedback to the user.

Surgical system 100 provides haptic feedback to the surgeon based on a relationship between surgical tool 58 and at least one of the working boundaries. The relationship between surgical tool 58 and a working boundary can be any suitable relationship between surgical tool 58 and a working boundary that can be obtained by the navigation system and utilized by the surgical system 100 to provide haptic feedback. For example, the relationship may be the position, orientation, pose, velocity, or acceleration of the surgical tool 58 relative to one or more working boundaries. The relationship may further be any combination of position, orientation, pose, velocity, and acceleration of the surgical tool 58 relative to one or more working boundaries. The "relationship" between the surgical tool 58 and a working boundary may also refer to a quantity or measurement resulting from another relationship between the surgical tool 58 and a working boundary. In other words, a "relationship" can be a function of another relationship. As a specific example, the "relationship" between the surgical tool 58 and a working boundary may be the magnitude of a haptic force generated by the positional relationship between the surgical tool 58 and a working boundary.

During operation, a surgeon manipulates the haptic device 60 to guide a surgical tool 58 coupled to the device. The surgical system 100 provides haptic feedback to the user, through haptic device 60, to assist the surgeon during creation of the planned holes, cuts, or other modifications to the patient's bone needed to facilitate implantation of the femoral and tibial implants. For example, the surgical system 100 may assist the surgeon by substantially preventing or constraining the surgical tool 58 from crossing a working boundary. The surgical system 100 may constrain the surgical tool from crossing a working boundary by any number and combination of haptic feedback mechanisms, including by providing tactile feedback, by providing force feedback, and/or by altering the amount of power provided to the surgical tool. "Constrain," as used herein, is used to describe a tendency to restrict movement. Therefore, the surgical system may constrain the surgical tool 58 directly by applying an opposing force to the haptic device 60, which tends to restrict movement of the surgical tool 58. The surgical system may also constrain the surgical tool 58 indirectly by providing tactile feedback to alert a user to change his or her actions, because alerting a user to change his or her actions tends to restrict movement of the surgical tool 58. In a still further embodiment, the surgical system 100 may constrain the surgical tool 58 by limiting power to the surgical tool 58, which again tends to restrict movement of the tool.

In various embodiments, the surgical system 100 provides haptic feedback to the user as the surgical tool 58 approaches a working boundary, upon contact of the surgical tool 58 with the working boundary, and/or after the surgical tool 58 has penetrated the working boundary by a predetermined depth. The surgeon may experience the haptic feedback, for example, as a vibration, as a wrench resisting or actively opposing further movement of the haptic device, or as a solid "wall" substantially preventing further movement of the haptic device. The user may alternatively experience the haptic feedback as a tactile sensation (e.g. change in vibration) resulting from alteration of power provided to the surgical tool 58, or a tactile sensation resulting from cessation of power provided to the tool. If power to the surgical tool is altered or stopped when the surgical tool 58 is drilling, cutting, or otherwise operating directly on bone, the surgeon will feel haptic feedback in the form of resistance to further movement because the tool is no longer able to drill, cut, or otherwise move through the bone. In one embodiment, power to the surgical tool is altered (e.g. power to the tool is decreased) or stopped (e.g. the tool is disabled) upon contact between the surgical tool 58 and a working boundary. Alternatively, the power provided to the surgical tool 58 may be altered (e.g. decreased) as the surgical tool 58 approaches a working boundary.

In another embodiment, the surgical system 100 may assist the surgeon in creating the planned holes, cuts, and other modifications to the bone by providing haptic feedback to guide the surgical tool 58 towards or along a working boundary. As one example, the surgical system 100 may provide forces to the haptic device 60 based on a positional relationship between the tip of surgical tool 58 and the closest coordinates of a working boundary. These forces may cause the surgical tool 58 to approach the closest working boundary. Once the surgical tool 58 is substantially near to or contacting the working boundary, the surgical system 100 may apply forces that tend to guide the surgical tool 58 to move along a portion of the working boundary. In another embodiment, the forces tend to guide the surgical tool 58 to move from one portion of the working boundary to another portion of a working boundary (e.g. from a funnel-shaped portion of the working boundary to a rectangular box-shaped portion of a working boundary).

In yet another embodiment, the surgical system 100 is configured to assist the surgeon in creating the planned holes, cuts, and modifications to the bone by providing haptic feedback to guide the surgical tool from one working boundary to another working boundary. For example, the surgeon may experience forces tending to draw the surgical tool 58 towards working boundary 66 when the user guides the surgical tool 58 towards working boundary 66. When the user subsequently removes the surgical tool 58 from the space surrounded by working boundary 66 and manipulates the haptic device 60 such that the surgical tool 58 approaches a second working boundary (not shown), the surgeon may experience forces pushing away from working boundary 66 and towards the second working boundary.

Haptic feedback as described herein may operate in conjunction with modifications to the working boundaries by the surgical system 100. Although discussed herein as modifications to "working boundaries," it should be understood that the surgical system 100 modifies the virtual boundaries, which correspond to the working boundaries. Some examples of modifications to a working boundary include: 1) reconfiguration of the working boundary (e.g. a change in shape or size), and 2) activating and deactivating the entire working boundary or portions of the working boundary (e.g. converting "open" portions to "active" surfaces and converting "active" surfaces to "open" portions). Modifications to working boundaries, similarly to haptic feedback, may be performed by the surgical system 100 based on a relationship between the surgical tool 58 and one or more working boundaries. Modifications to the working boundaries further assist a user in creating the required holes and cuts during an arthroplasty procedure by facilitating a variety of actions, such as movement of the surgical tool 58 towards a bone and cutting of the bone by the surgical tool 58.

In one embodiment, modifications to the working boundary facilitate movement of the surgical tool 58 towards a bone 10. During a surgical procedure, because the patient's anatomy is tracked by the navigation system, the surgical system 100 moves the entirety of working boundary 66 in correspondence with movement of the patient's anatomy. In addition to this baseline movement, portions of working boundary 66 may be reshaped and/or reconfigured to facilitate movement of the surgical tool 58 towards the bone 10. As one example, the surgical system may tilt funnel-shaped portion 66*b* of working boundary 66 relative to the rectangular box-shaped portion 66*a* during the surgical procedure based on a relationship between the surgical tool 58 and the working boundary 66. The working boundary 66 can therefore be dynamically modified during the surgical procedure such that the surgical tool 58 remains within the space surrounded by the portion 66*b* of working boundary 66 as the surgical tool 58 approaches the bone 10.

In another embodiment, working boundaries or portions of working boundaries are activated and deactivated. Activating and deactivating entire working boundaries may assist a user when the surgical tool 58 is approaching the bone 10. For example, a second working boundary (not shown) may be deactivated during the time when the surgeon is approaching the first working boundary 66 or when the surgical tool 58 is within the space surrounded by the first working boundary 66. Similarly, the first working boundary 66 may be deactivated after the surgeon has completed creation of a first corresponding resection and is ready to create a second resection. In one embodiment, working boundary 66 may be deactivated after surgical tool 58 enters the area within the funnel-portion leading to the second working boundary but is still outside of first funnel-portion 66*b*. Activating a portion of a working boundary converts a previously open portion (e.g. open top 67) to an active surface of the working boundary. In contrast, deactivating a portion of the working boundary converts a previously active surface (e.g. the end portion 66*c* of working boundary 66) of the working boundary to an "open" portion.

Activating and deactivating entire working boundaries or their portions may be accomplished dynamically by the surgical system 100 during the surgical procedure. In other words, the surgical system 100 may be programmed to determine, during the surgical procedure, the presence of factors and relationships that trigger activation and deactivation of virtual boundaries or portions of the virtual boundaries. In another embodiment, a user can interact with the surgical system 100 (e.g. by using the input device 52) to denote the start or completion of various stages of the arthroplasty procedure, thereby triggering working boundaries or their portions to activate or deactivate.

In view of the operation and function of the surgical system 100 as described above, the discussion will now turn to methods of preoperatively planning the surgery to be performed via the surgical system 100, followed by a detailed discussion of methods of registering the preoperative plan to the patient's actual bone and also to applicable components of the surgical system 100.

The haptic device 60 may be described as a surgeon-assisted device or tool because the device 60 is manipulated by a surgeon to perform the various resections, drill holes, etc. In certain embodiments, the device 60 may be an autonomous robot, as opposed to surgeon-assisted. That is, a tool path, as opposed to haptic boundaries, may be defined for resecting the bones and drilling holes since an autonomous robot may only operate along a pre-determined tool path such that there is no need for haptic feedback. In certain embodiments, the device 60 may be a cutting device with at least one degree of freedom that operates in conjunction with the navigation system 42. For example, a cutting tool may include a rotating burr with a tracker on the tool. The cutting tool may be freely manipulate-able and handheld by a surgeon. In such a case, the haptic feedback may be limited to the burr ceasing to rotate upon meeting the virtual boundary. As such, the device 60 is to be viewed broadly as encompassing any of the devices described in this application, as well as others.

After the surgical procedure is complete, a postoperative analysis (step 807) may be performed immediately or after a period of time. The postoperative analysis may determine the accuracy of the actual surgical procedure as compared with the planned procedure. That is, the actual implant placement position and orientation may be compared with the values as planned. Factors such as varus-valgus femoral-tibial alignment, extension, internal-external rotation, or any other factors associated with the surgical outcome of the implantation of the arthroplasty implants may be compared with the values as planned.

II. Preoperative Steps of Arthroplasty Procedure

The preoperative steps of an arthroplasty procedure may include the imaging of the patient and the preoperative planning process that may include implant placement, bone resection depth determination, and an anterior shaft notching assessment, among other assessments. The bone resection depth determination includes selecting and positioning three dimensional computer models of candidate femoral and tibial implants relative to three dimensional computer models of the patient's distal femur and proximal tibia to determine a position and orientation of the implants that will achieve a desirable surgical outcome for the arthroplasty procedure. As part of this assessment, the depths of the necessary tibial and femoral resections are calculated, along with the orientations of the planes of those resections.

The anterior shaft notching assessment includes determining whether or not an anterior flange portion of the three dimensional model of the selected femoral implant will intersect the anterior shaft of the three dimensional model of the patient's distal femur when the implant three dimensional model is positioned and oriented relative to the femur three dimensional model as proposed during the bone resection depth determination. Such an intersection of the two models is indicative of notching of the anterior femoral shaft, which must be avoided.

Determining bone resection depth and performing an anterior shaft notching assessment is described in PCT/US2016/034847, filed May 27, 2016, which is hereby incorporated by reference in its entirety.

A. Preoperative Imaging

Figure 4A:
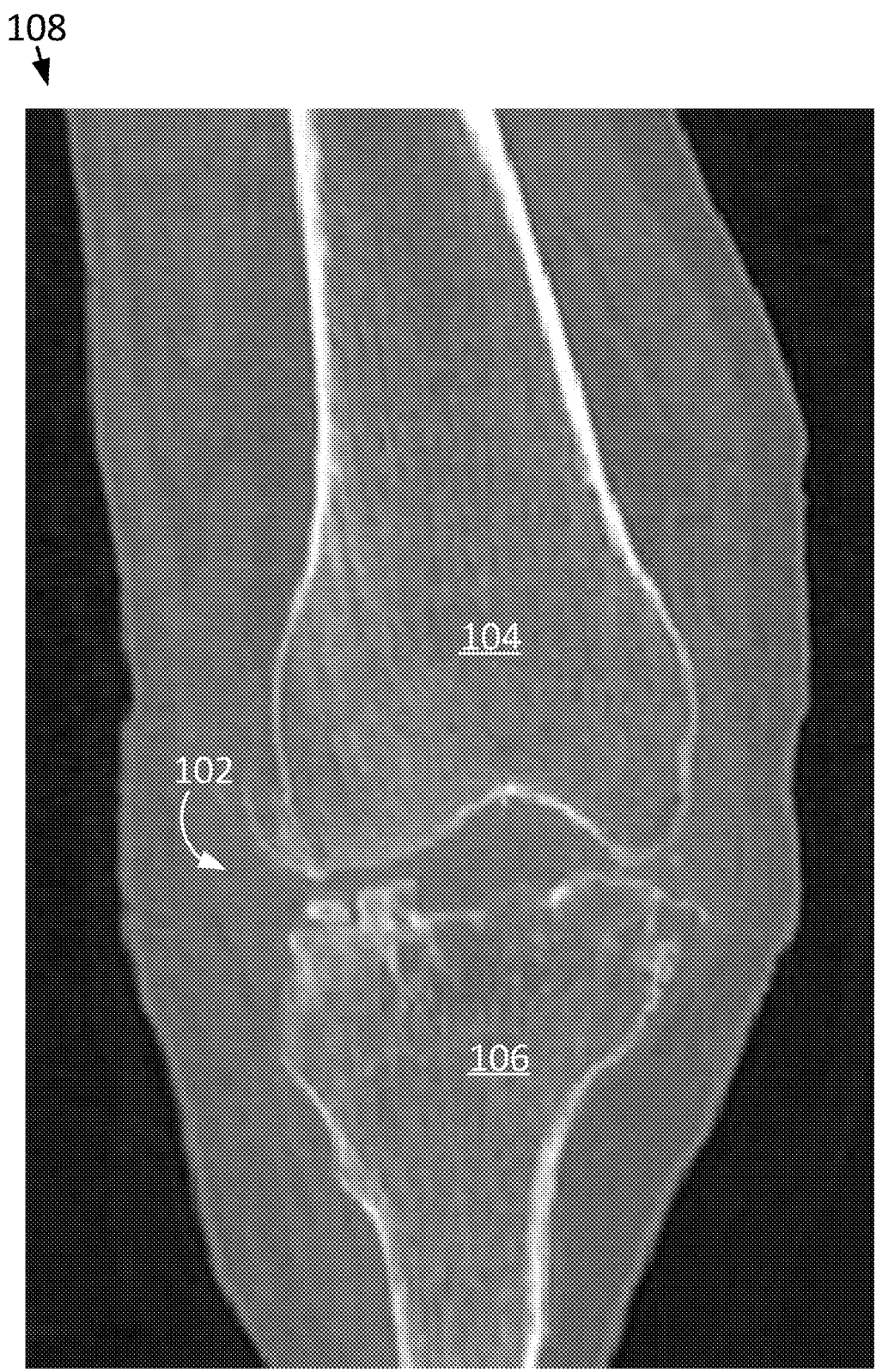
FIG. 4A is a coronal image of a knee joint showing a femur and tibia.

In preparation for a surgical procedure (e.g., knee arthroplasty, hip arthroplasty, ankle arthroplasty, shoulder arthroplasty, elbow arthroplasty, spine procedures (e.g., fusions, implantations, correction of scoliosis, etc.)), a patient may undergo preoperative imaging at an imaging center, for example. The patient may undergo magnetic resonance imaging ("MRI"), a computed tomography ("CT") scan, a radiographic scan ("X-ray"), among other imaging modalities, of the operative joint. As seen in FIG. 4A, which is an example coronal image scan of a patient knee joint 102 including a femur 104, patella 105 (shown in other figures), and tibia 106, the patient knee may undergo a CT scan. The CT scan may include a helical scan of the knee joint 102 packaged as a Digital Imaging and Communications in Medicine ("DICOM") file. From the file, two-dimensional image slices or cross-sections are viewable in multiple planes (e.g., coronal, sagittal, axial). As can be understood from FIGS. 4B, 4C and 4D, the segmentation process may be performed on the two-dimensional images 108 by applying a spline 110 over the bone contour line. Or, the segmentation process may be performed on the images 108 as a whole without the need to apply a spline 110 to the 2D image slices. Such preoperative imaging and planning steps may be found in PCT/US2019/066206, filed Dec. 13, 2019, which is hereby incorporated by reference in its entirety.

FIGS. 4B, 4C, and 4D illustrate, respectively, an axial image 108 of the femur 104 and patella 105 with splines 110 on the bone surfaces, a sagittal image 108 of the joint 102 with splines 110 on the bone surfaces of the femur 104, patella 105 and tibia 106, and a coronal image 108 of the joint 102 with splines 110 on the femur 104 and tibia 106. In certain instances, the segmentation process may be a manual process with a person identifying the splines 110 on each two-dimensional image slice 108. In certain instances, the segmentation process may be automated where the splines 110 are automatically applied to the bone contour lines in the image slices 108. And in certain instances, the segmentation process may be a combination of manual and automatic processes.

After the segmentation process is complete, the segmented images 108 may be combined in order to generate a three-dimensional ("3D") bone model 111 of the joint 102, including a 3D femoral model 112, 3D patella model 113, and a 3D tibial model 114.

As seen in FIG. 4E, which is an isometric axial-coronal-sagittal view of the 3D joint model 111, the model 111 represents the joint 102 and, more specifically, its femur 104, patella 105 and tibia 106, in a degenerated state, prior to performance of any surgical procedure to modify the bones. From this 3D joint model 111, various steps of a preoperative planning process may be performed. Each of these 3D bone models 112-114 may be generated relative to the coordinate system of the medical imaging system used to generate the two-dimensional image slices 108. For example, where the images slices 108 are generated via CT imaging, the 3D bone models may be generated relative to the CT coordinate system 115.

In certain instances, a 3D model 111 of the patient joint, including 3D models 112, 113, and 114 of each bone 104, 105, and 106 of the patient joint 102, may be generated from a statistical model or generic model of those bones and joint, the statistical models or generic models being morphed or otherwise modified to approximate the bones 104, 105, and 106 of the patient joint 102 based on certain factors that do not require segmenting the 2D image slices 108 with splines 110. In certain instances, the segmentation process may fit 3D statistical or generic bone models to the scanned images 108 of the femur 104, patella 105 and tibia 106 manually, automatically, or a combination of manually and automatically. In such an instance, the segmentation process would not entail applying a spline 110 to each of the two-dimensional image slices 108. Instead, the 3D statistical or generic bone models would be fitted or morphed to the shapes of the femur 104, patella 105 and tibia 106 in the scanned image 108. Thus, the morphed or fitted 3D bone model would entail the 3D joint model 111 shown in FIG. 4E.

In one embodiment, the generic bone model may be a result of an analysis of the medical images (e.g., CT, MRI, X-ray, etc.) of many (e.g., thousands or tens of thousands) of actual bones with respect to size and shape, and this analysis is used to generate the generic bone model, which is a statistical average of the many actual bones. In another embodiment, a statistical model is derived which describes the statistical distribution of the population, including the variation of size, shape and appearance in the image.

In certain instances, other methods of generating patient models may be employed. For example, patient bone models or portions thereof may be generated intra-operatively via registering a bone or cartilage surface in one or more areas of the bone. Such a process may generate one or more bone surface profiles. Thus, the various methods described herein are intended to encompass three dimensional bone models generated from segmented medical images (e.g., CT, MRI) as well as intra-operative imaging methods, and others.

While the imaging and subsequent steps of the method are described in reference to a knee joint 102, the teachings in the present disclosure are equally applicable to other joints such as the hip, ankle, shoulder, wrist, elbow, and spine, among others.

B. Preoperative Planning of Implant Selection, Positioning and Orientation of the Implant After the 3D femoral model 112 of the patient joint 102 is generated, the remaining parts of the preoperative planning may commence. For instance, the surgeon or the surgical system 100 may select an appropriate implant, and the implant position and orientation may be determined. These selections may determine the appropriate cuts or resections to the patient bones in order to fit the chosen implant. Such preoperative planning steps may be found in PCT/US2016/034847, filed May 27, 2016, which is hereby incorporated by reference in its entirety.

III. Surgical Procedure

After the preoperative planning steps are completed, the surgery may commence according to the plan. That is, the surgeon may use the haptic device 60 of the surgical system 100 to perform resections of the patient's bone, and the surgeon may implant an implant to restore the function to the joint. Steps of the surgical procedure may include the following.

A. Registration

Registration is the process of mapping the preoperative plan including the bone models 111-114 (of FIG. 4E) and the associated virtual boundaries or tool paths to the patient's physical bones so the robotic arm 60 is spatially oriented relative to the patient's physical bones in order to accurately perform the surgical procedure. The preoperative plan including the bone models 111-114 and associated virtual boundaries or tool paths may be stored on the computer 50 in a first coordinate system (x1, y1, z1). The navigation system 42, which tracks the movements of the robotic arm 60 via various tracker arrays (e.g., 48, 54), is also in communication with the computer 50. The navigation system 42 also tracks the patient's body via various tracker arrays 46, 47 respectively positioned on the tibia 10 and femur 11. In this way, the position and orientation (i.e., pose) of the robotic arm 60 and the operative bones 10, 11 are known relative to each other in a second coordinate system (x2, y2, z2) in the computer 50. The process of mapping, transforming, or registering the first coordinate system (x1, y1, z1) and the second coordinate system (x2, y2, z2) together in a common coordinate system is known as registration.

Once registered, the bone models 111-114 and virtual boundaries or toolpaths may be "locked" to the appropriate location on the patient's physical bone such that any movement of the patient's physical bone will cause the bone models 111-114 and virtual boundaries or toolpaths to move accordingly. Thus, the robot arm 60 may be constrained to operate with the virtual boundaries or along the toolpath, which is defined in the preoperative plan, and which moves with the patient's bones as they move. In this way, the robotic arm 60 is spatially aware of the pose of the patient's physical body via the registration process.

i. Creation of Classified/Segregated 3D Bone Surface Point Cloud from Intra-Operative Ultrasound Data As discussed in detail below, the computer 50 of the surgical system 100, and more specifically, the processor and memory of the computer, store and execute one or more algorithms that employ one or a combination of various neural networks(s) trained to: detect bone surfaces in ultrasound images; and classify those bone surfaces in the ultrasound images according to the anatomy being captured.

As also discussed in detail below, the computer 50 of the surgical system 100, and more specifically, the processor and memory of the computer, store and execute one or more algorithms that allow simultaneous co-registering of the bone surfaces of N bones (typically forming a joint) between an ultrasound modality and a second modality (e.g. CT/MRI) capturing the N bones. The co-registering of the bone surfaces of the N bones between the two modalities is achieved via the one or more algorithms optimizing: N×6 DOF transformations from the ultrasound modality to the second modality; and classification information assigning regions in image data of the ultrasound modality to one of the N captured bones.

In one embodiment, the co-registering of the bone surfaces of the N bones between the two modalities can occur between a 3D point cloud and triangulated meshes to be 3D point cloud/mesh-based. In such a situation, the N bones need to be segmented in the second modality (e.g., CT/MRI bone segmentation) to obtain the triangulated meshes, and the 3D point cloud is applied to the triangulated meshes.

Figure 5A:
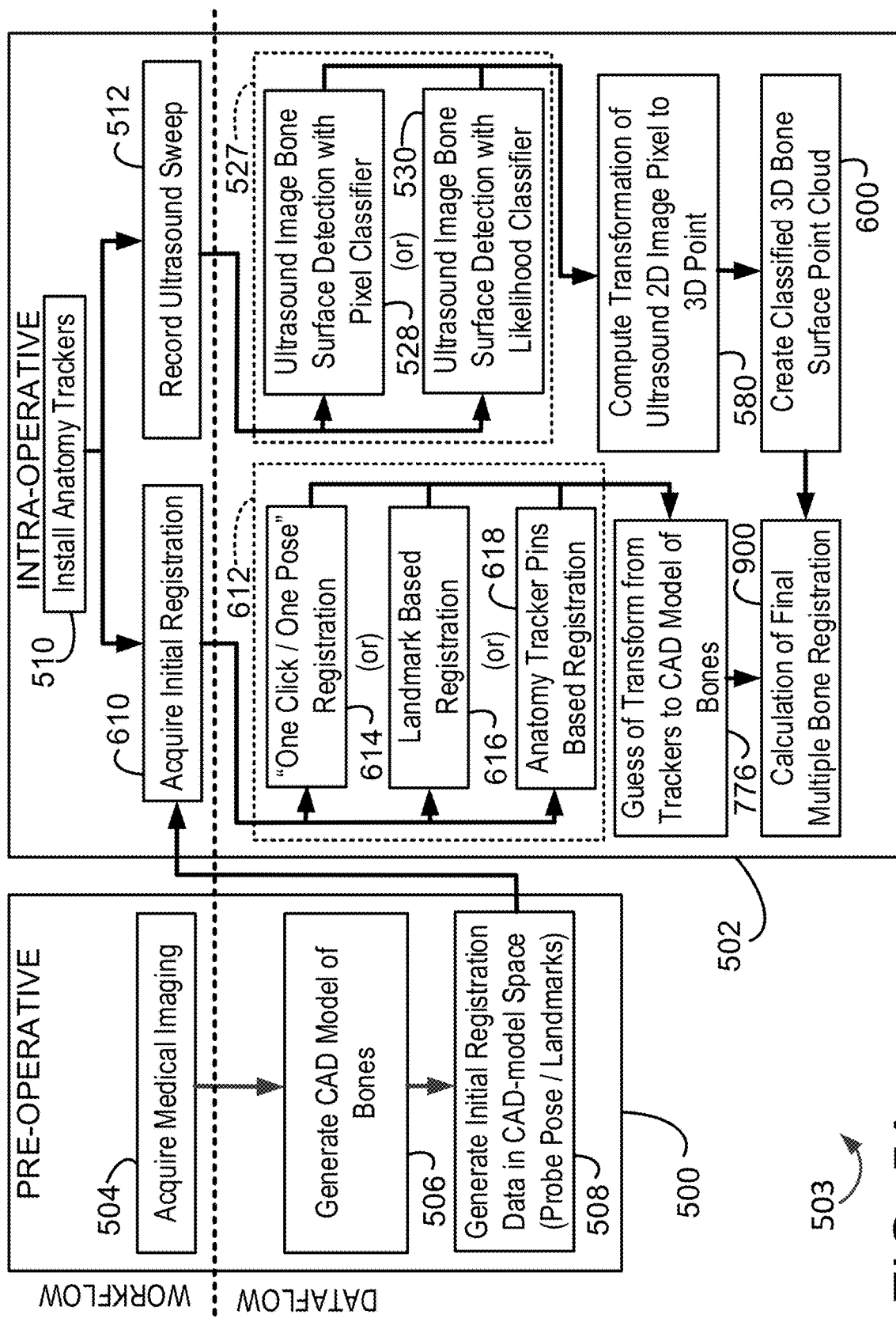
FIG. 5A is a flow chart illustrating pre-operative and intra-operative aspects of the registration process indicated in FIG. 2, which is an ultrasound based multiple bone registration process.

In another embodiment, the co-registering of the bone surfaces of the N bones between the two modalities can be image-based. In other words, the classified ultrasound image data is directly matched to the second modality without the need to detect bone surfaces To begin a discussion of the one or more algorithms for simultaneously co-registering of the bone surfaces of N bones between the two modalities capturing the N bones, reference is made to FIG. 5A. FIG. 5A is a flow chart illustrating greater detail regarding the overall registration process (Step 804) indicated in FIG. 2 as employed by the surgical system 100 depicted in FIG. 1. The process depicted in FIG. 5A is an ultrasound based multiple bone registration process 503 employing a two-step procedure wherein an initial or rough registration (Step 776) resulting from Steps 610, 612, 776 is combined with a classified or segregated 3D bone surface point cloud (Step 600) resulting from Steps 512, 527, 580, 600 and created from ultrasound sweeps taken of the surgical target region (i.e., the patient joint region in the context of a patient joint arthroplasty) (Step 900). Thus, it may be said that the ultrasound based multiple bone registration process 503 has two major steps or aspects wherein an initial registration establishes a first guess of the registration alignment and then that starting point is refined by computing a highly accurate alignment therefrom.

The classified or segregated 3D bone surface point cloud (Step 600) of the ultrasound based multiple bone registration process 503 starts off with the intraoperative ultrasound images being taken of most, if not all, of the patient surface area surrounding the patient joint and each bone thereof in the vicinity of the patient joint. For example, for a knee arthroplasty, the ultrasound sweeps are over most if not all of the knee, up and down one or more times to get ultrasound image data of the bone surface of each bone (femur, tibia and patella) of the patient knee. The intraoperative ultrasound images are then algorithmically analyzed via machine learning to determine which individual points of millions of individual points of the acquired ultrasound image points belong to each bone of the patient joint, resulting in a classified or segregated point cloud pertaining to each bone. In other words, in the context of a knee arthroplasty, the algorithm appropriately assigns each point or pixel of the intraoperative ultrasound images to its respective bone of the knee joint such that each point or pixel can be said to be classified or segregated to correspond to its respective bone, thereby resulting in the classified or segregated 3D bone surface point cloud. Stated another way, each point or pixel of the intraoperative ultrasound images are transformed into the classified or segregated 3D bone surface point cloud such that the ultrasound image pixels or points of the classified or segregated 3D bone surface point cloud are each correlated to a corresponding bone surface of the patient bones.

As can be understood from FIG. 5A, the initial or rough registration (Step 776) begins with a tracked probe 57 intraoperatively being applied to the patient knee following a certain pre-operative planned pose or set of landmarks with respect to the patient's anatomy to generate a transformation registering the physical tracked bones to 3D CAD bone models 111 generated from segmented medical imaging (CT, MRI, etc.) of the patient's knee bones. A final registration occurs via the algorithmic combination of the initial registration of Step 776 with the classified 3D bone surface point cloud of Step 600, wherein the respective portions of the classified point cloud are algorithmically matched to the point cloud of the initial registration and its respective surfaces of the 3D CAD bone model (Step 900). During this final registration, the algorithm employed converges until its results reach a stable state, and the algorithm may also refine the classification or segregation of the classified or segregated 3D bone surface point cloud itself, so that any initial errors in the classification/segregation can be eliminated or at least reduced. In achieving these aspects of the final registration, the classified or segregated 3D bone surface point cloud and the initial or rough registration become well registered, resulting in the final multiple bone registration. This final multiple bone registration of Step 900 can then be employed by the surgical system 100 in performing the surgery on the patient joint.

This ultrasound-based registration process 503 of the surgical system 100 is efficient in that registration can be achieved by a medical professional simply performing ultrasound sweeps of the patient joint area, the machine learning then taking over to identify which points in the ultrasound sweeps belong to which bone of the patient joint, and then assigning/matching those points to the correct bone of the 3D bone model. Thus, the registration process 503 allows for all of the multiple bones of a patient joint to be imaged via ultrasound at one time, the system then identifying and segregating the points of the point cloud that pertain to each bone of the joint, followed by assignment/matching of the points to the appropriate bone of the 3D model of the joint to complete the final registration process, the points not only being assigned to the appropriate bone but also positioned on the corresponding anatomical location on the bone.

As indicated in FIG. 5A, the ultrasound-based registration process 503 of the surgical system 100 includes a preoperative aspect 500 and an intra-operative aspect 502, and the preoperative aspect 500 and the intra-operative aspect 502 are each divided into workflow and dataflow portions. For the workflow portion, a person operates a machine/tool/device/system or physically acts in executing an identified workflow step. For the dataflow portion, as discussed in greater detail below in reference to FIG. 16, one or more hardware processors 1302 of a computer system 1300 associated with the surgical system 100 depicted in FIG. 1 executes programs in performing an identified dataflow step.

During the workflow portion of the preoperative aspect 500, medical images are acquired of the patient's joint (Step 504), as discussed above in section "A. Preoperative Imaging" of this Detailed Description. As indicated in FIG. 5A, the pre-operative aspect 500 continues with a dataflow portion, wherein the medical images are then used to generate 3D CAD models of the bones forming the patient's joint (Step 506), as discussed above in section "A. Preoperative Imaging" of this Detailed Description in reference to FIGS. 4A-4E. The dataflow portion of the pre-operative aspect 500 concludes with the generation of initial registration data in CAD-model space relative to the 3D CAD models 111-114 (FIG. 4E) of the patient bones 104-106 of the patient joint images 108 (FIGS. 4A-4D) (Step 508). Specifically, this generation of initial registration data (Step 508) includes defining the above-described probe poses and anatomical landmarks in the 3D CAD-model space.

Turning to the workflow portion of the intra-operative aspect 502 of the ultrasound based multiple bone registration process 503 of FIG. 5A, a medical professional installs the anatomy trackers (e.g., see 46, 47 in FIG. 1) on the patient's bones (e.g., tibia 10 and femur 11 in FIG. 1) (Step 510). While in a preferred embodiment, the trackers 46, 47 are typically installed in the patient bones 10, 11 at the beginning of the intra-operative part 502 of the overall registration process 503 of FIG. 5A as indicated at Step 510, in one alternative embodiment, parts of the registration can be done before trackers 46, 47 (FIG. 1) are attached to the bones 10, 11 if the target limb (e.g., leg) is sufficiently immobilized. For example, the initial registration (Step 776) is completed followed by the creation of the classified point cloud (Step 600), as both discussed in greater detail below relative to FIG. 5A and others. The locations of the trackers 46, 47 can then be identified and the trackers accordingly installed on the patient bones 10, 11. The initial registration 776 is repeated, after which the initial registration of Step 776 and the classified point cloud of Step 600 can be combined to achieve the final registration (Step 900).

Again referring to FIG. 5A to continue with the preferred embodiment, where the trackers 46, 47 are installed on the patient bones 10, 11 according to Step 510 at the beginning of the intra-operative part 502 of the overall registration process 503, the medical professional then utilizes the trackable ultrasound probe (e.g., see 55 in FIG. 1) to record multiple ultrasound sweeps of the patient's bones across the joint region (Step 512). These sweeps may be of the joint area in a general manner, capturing the various bones (e.g., femur, tibia and patella in the context of the knee joint) in a collage of ultrasound image data points undefined as to which data point pertains to which bone and where on the bone.

Figure 5B:
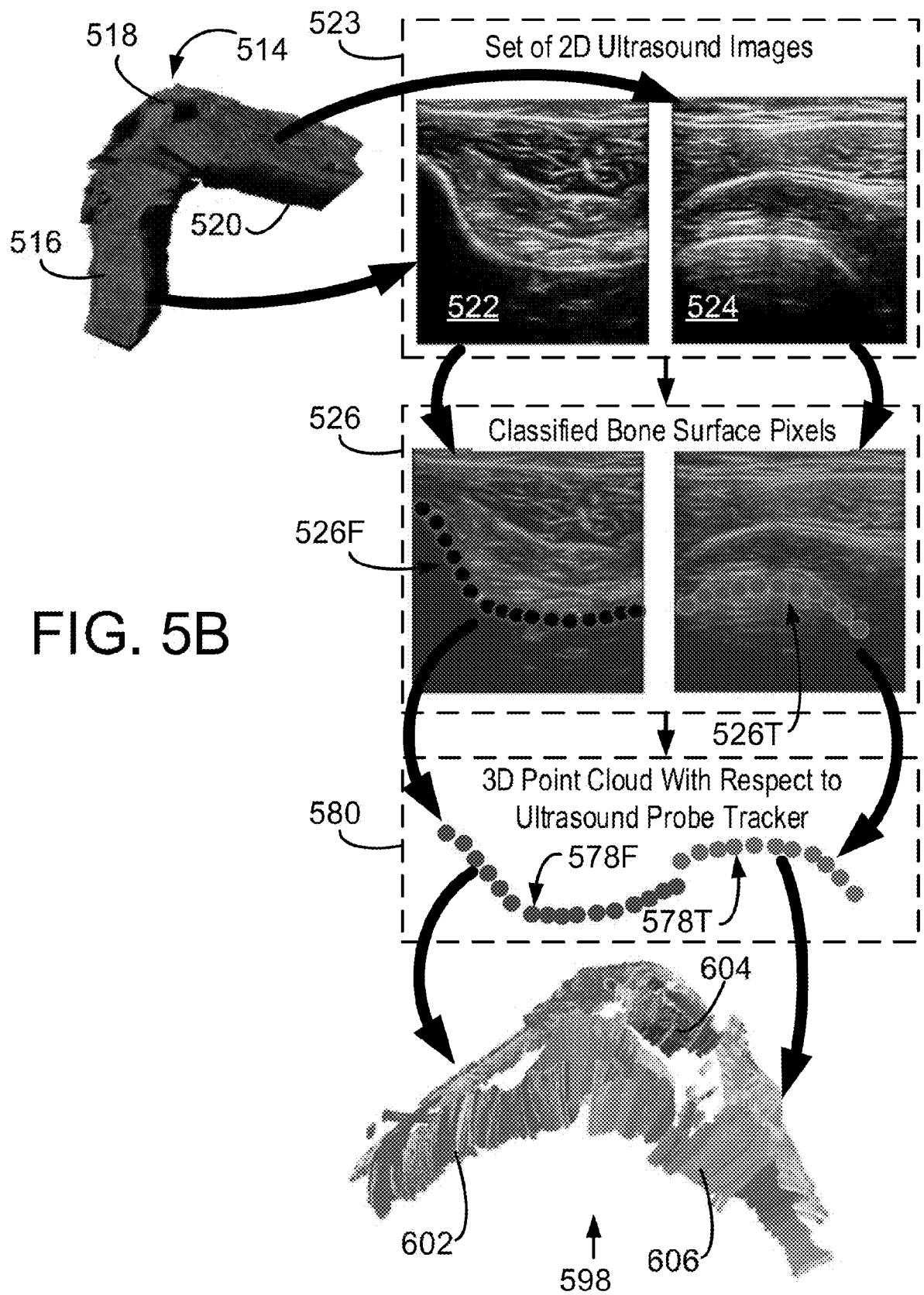
FIG. 5B is a pictorial depiction of aspects of a portion of the registration process of FIG. 5A, namely a process for the creation of a classified or segregated three dimensional ("3D") bone surface point cloud from ultrasound sweeps.

As can be understood from FIG. 5B, which is a pictorial depiction of a process for the creation of a classified three dimensional ("3D") bone surface point cloud from the ultrasound sweeps, the ultrasound sweeps 514 resulting from Step 512 of FIG. 5A have ultrasound image data associated with the femur 11, patella (not shown) and tibia 10 (e.g., see FIG. 1) that is undefined as to which bone and location on a bone. While not actually defined at this point in the process, as shown in FIG. 5B, the ultrasound sweeps 514 can be understood to have femur data points 516, patella data point 518, and tibia data points 520. This data can be placed in the form of a set of 2D ultrasound images 523 including femur ultrasound images 522, patella ultrasound images (not shown), and tibia ultrasound images 524, although these ultrasound images have data points that are undefined as to whether a specific point is part of a bone or soft tissue, and undefined as to which specific bone of the joint the specific data point belongs and where on the specific bone. The surgical system 100 then converts the set of 2D ultrasound images 523 into classified bone surface pixels 526 as shown in FIG. 5B via the classification module (Step 527) of FIG. 5A. It should be noted that while 2D ultrasound images are depicted in FIG. 5B and discussed herein, the process described herein can be readily accomplished with the use of 3D ultrasound images substituted for, or intermingled with, the 2D ultrasound images. Accordingly, throughout this disclosure, any mention of 2D ultrasound images should be understood to also encompass 3D ultrasound images.

As indicated in FIG. 5A, in one embodiment, generating classified bone surface pixels 526 from the set of 2D ultrasound images 523, the classification module (Step 527) may employ either of two alternative classification processes, namely by ultrasound image bone surface via pixel classification neural network (Step 528) or by ultrasound image bone surface detection via likelihood classification neural network (Step 530). In other embodiments, generating classified bone surface pixels 526 from the set of 2D ultrasound images 523, the classification module (Step 527) may employ other processes, such as, for example, deducing the none classification from the distance of the two navigation markers 46, 47 fixed on the bones 10, 11, and/or running a classification algorithm on the resulting point cloud itself, without looking at the image but just the 3D arrangement of the different points. In yet other embodiments, the classification of the point cloud is solved via other non-machine learning processes or other networks besides classification and convolution, such as, for example, random forest. In still further embodiments, the classification of the point cloud may be solved via non-machine learning processes. In one embodiment, the classification of the point cloud may be solved via geometric analysis of the point cloud. For example, such geometric analysis of the point cloud may include splitting main axes like principal component analysis (e.g. in the context of knee arthroplasty), clustering methods like connected component analysis (e.g. in the context of spine/vertebrae procedures), and shape properties like convex/concave/tubular/etc. Ultimately, for purposes of not unduly limiting this disclosure, there is a classification module 527 that receives an image as input and a bone classified point cloud is output from the classification module, and there are many different processes that can be part of the classification module to achieve these ends.

Figure 6A:
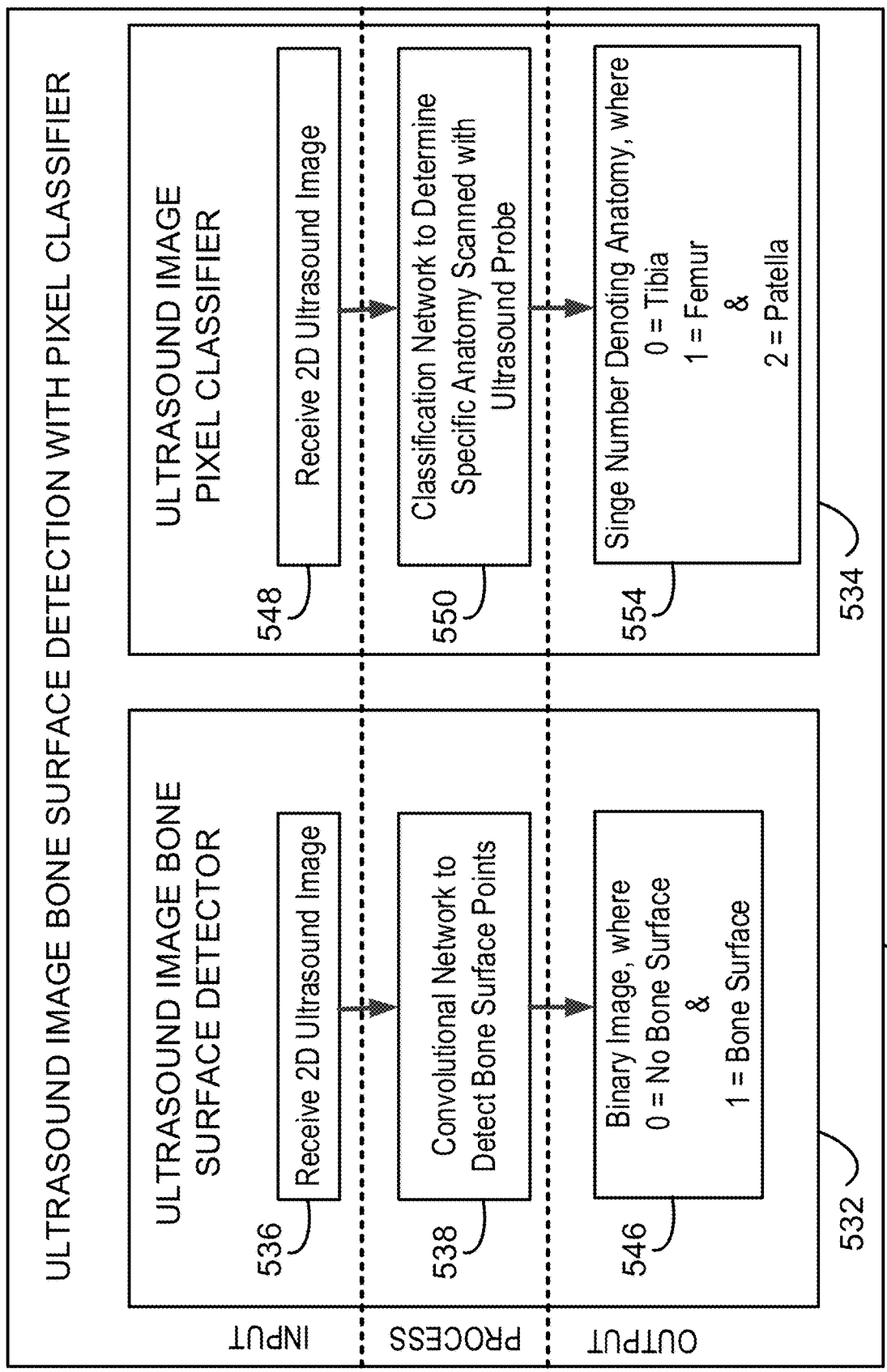
FIG. 6A is flow chart of a portion of the registration process of FIG. 5A, namely the process for ultrasound image bone surface detection utilizing pixel classification.
Figure 6B:
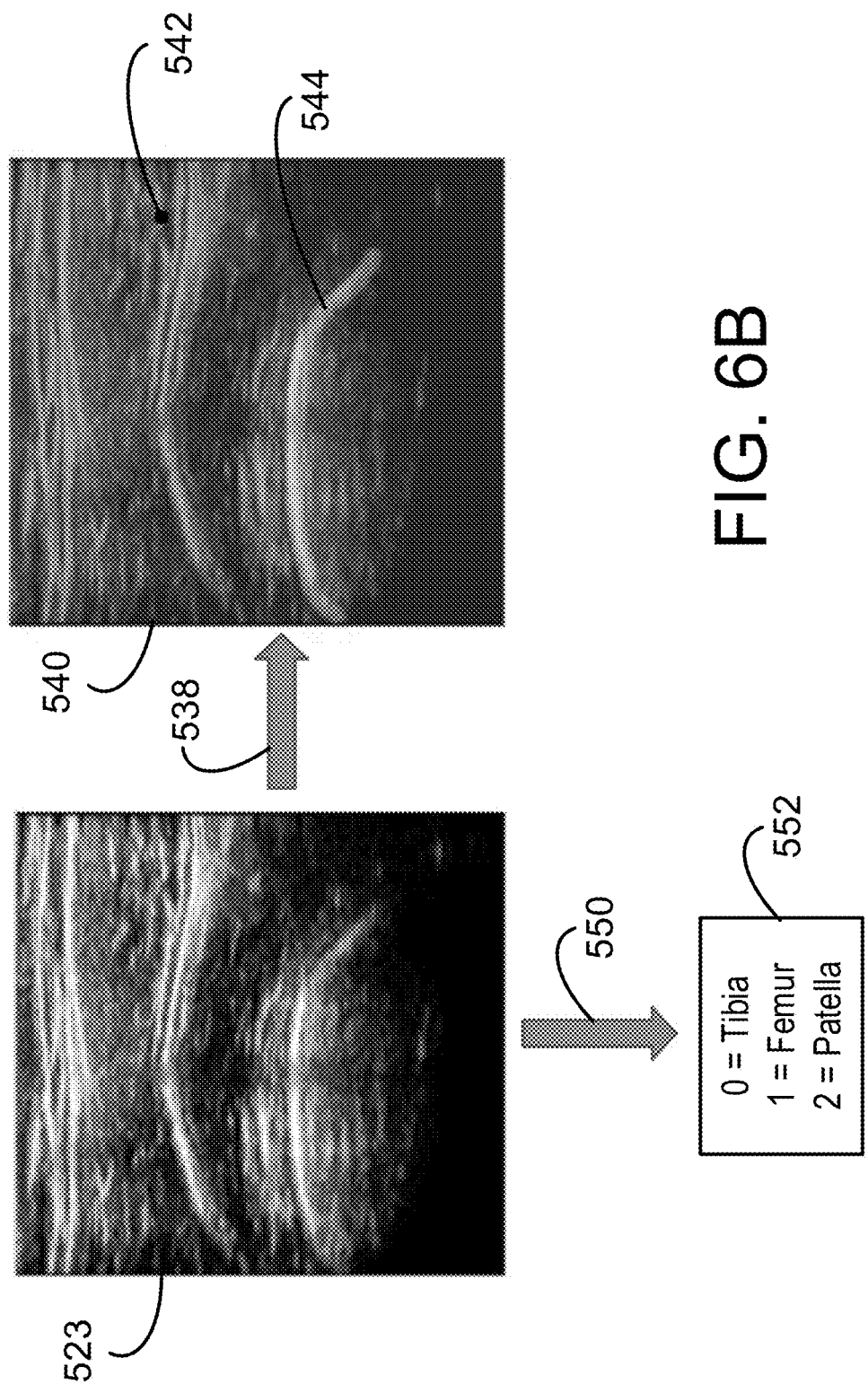
FIG. 6B is a pictorial depiction of the process of FIG. 6A.

FIG. 6A is a flow chart of the process of the surgical system 100 for ultrasound image bone surface detection utilizing pixel classification (Step 528), and FIG. 6B is a pictorial depiction of the process of FIG. 6A. As shown in FIG. 6A, this process employs an ultrasound image bone surface detector 532 and an ultrasound image pixel classifier 534, both of which are broken into input, process and output portions. As indicated in FIGS. 6A and 6B, the ultrasound image bone surface detector 532 receives as input the 2D ultrasound images 523 of FIG. 5B (Step 536) and processes them via a convolutional network to detect the presence and absence of bone surface points at each point across each ultrasound image (Step 538), outputting a binary image 540 where "zero (0) equals no bone surface" 542 and "one (1) equals a bone surface" 544 (Step 546).

Similarly, the ultrasound image pixel classifier 534 receives as input the 2D ultrasound images 523 of FIG. 5B (Step 548) and processes them via a classification network to determine the specific type of anatomy present at each point across each ultrasound image (Step 550), outputting a single number 552 denoting the type of anatomy where "zero (0) equals the tibia", "one (1) equals the femur" and "two (2) equals the patella" (Step 554). It should be remembered, that while the examples given in this Detailed Discussion are in the context of a knee joint, the concepts taught herein are equally applicable to any type of joint such as, for example but not by way of limitation, spine, shoulder, elbow, wrist, hip, ankle, etc.

Figure 7A:
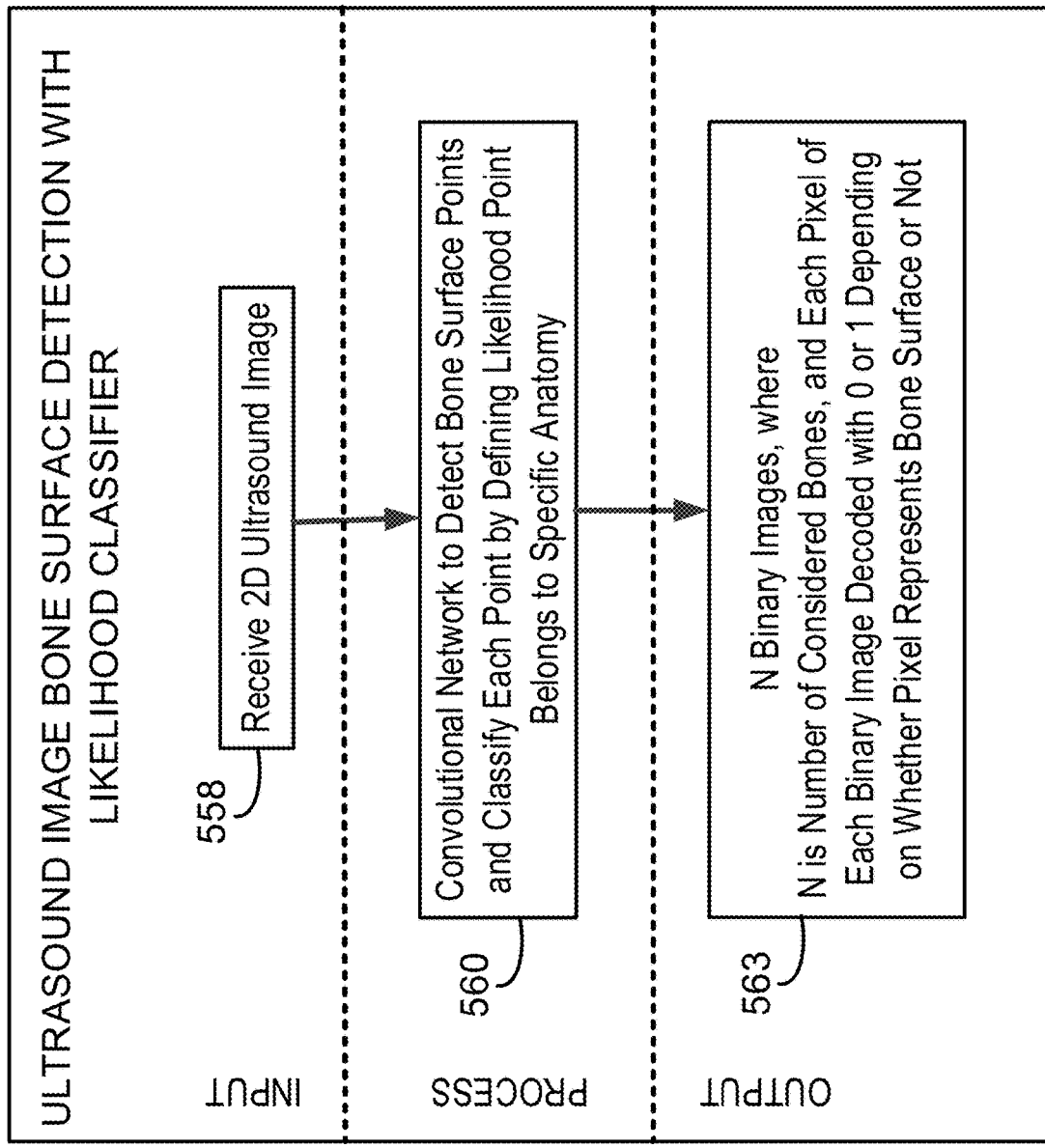
FIG. 7A is flow chart of a portion of the registration process of FIG. 5A, namely the process for ultrasound image bone surface detection utilizing likelihood classification.
Figure 7B:
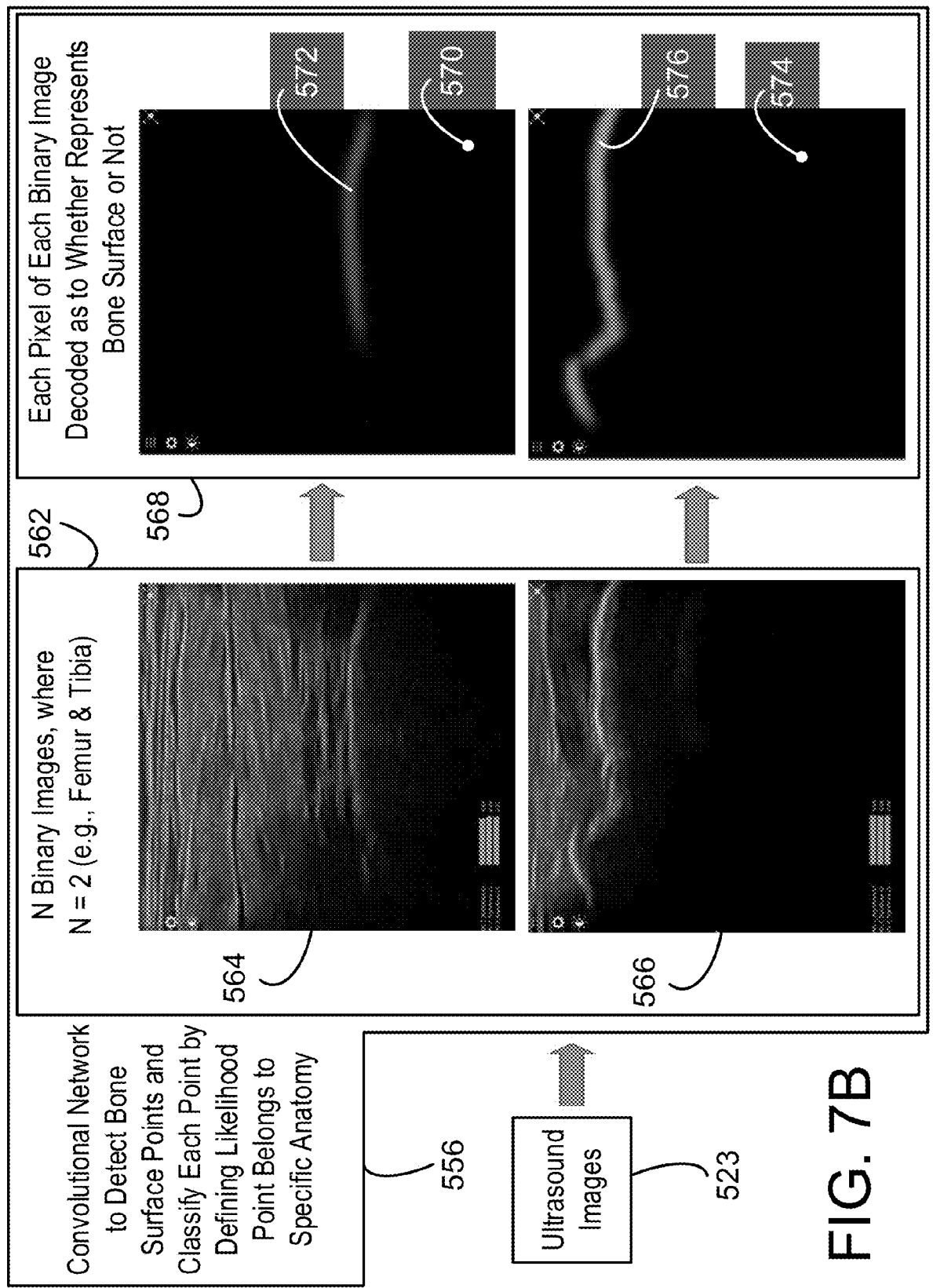
FIG. 7B is a pictorial depiction of the process of FIG. 7A.

FIG. 7A is a flow chart of the process of the surgical system 100 for ultrasound image bone surface detection utilizing likelihood classification (Step 530), and FIG. 7B is a pictorial depiction of the process of FIG. 7A. This process is broken into input, process and output portions. As shown in FIGS. 7A and 7B, the convolutional network 556 receives as input the 2D ultrasound images 523 of FIG. 5B (Step 558) and processes them to detect bone surface points and classify each point by defining the likelihood the point belongs to a specific anatomy (Step 560). For example, in the context of a knee, the convolutional network 556 detects bone surface points in the 2D ultrasound images 523 and then calculates the likelihood that any specific detected bone surface point pertains to the femur, tibia or patella (Step 560). The convolutional network 556 outputs N binary images 562 where N is the number of considered bones, and each pixel of each binary image is decoded with "zero (0)" or "one (1) depending on whether the pixel represents the bone surface or not (Step 563).

As can be understood from FIG. 7B, in an illustrative example where the patella is ignored solely for the sake of this example, the number N of binary images would be two because there is a femur and tibia. Were the patella also used in this example, the number of N of binary images would be three because there is a femur, patella and tibia.

Continuing with the example where the number N of binary images would be two, the convolutional network 556 analyzes the ultrasound images 523 and classifies the images 523 according to the likelihood they represent a tibia image 564 or a femur image 566, the classification being via an algorithmic assessment of the ultrasound images 523 in the context of machine learning (Step 562 of FIG. 7B). The pixels of each classified image 564 that is classified according to Step 562 are then decoded as to whether or not each specific pixel represents a bone surface or not (Step 568 of FIG. 7B). For example, the classified tibia image 564 is assessed to identify its non-bone surface pixels 570 and its bone surface pixels 572, which will be tibia bone surface pixels 572 (Step 568). Similarly, the classified femur image 566 is assessed to identify its non-bone surface pixels 574 and its bone surface pixels 576, which will be femur bone surface pixels 576 (Step 568).

Returning to FIGS. 5A and 5B, once the classified bone surface pixels 526 have been generated from the set of 2D ultrasound images 523 via the classification module (Step 527) to provide 2D femur classified bone surface pixels 526F and 2D tibia classified bone surface pixels 526T, a 2D to 3D transformation of these 2D surface pixels 526F, 526T is computed to convert the 2D surface pixels 526F, 526T into 3D surface pixels 578F, 578T (Step 580).

Figure 8A:
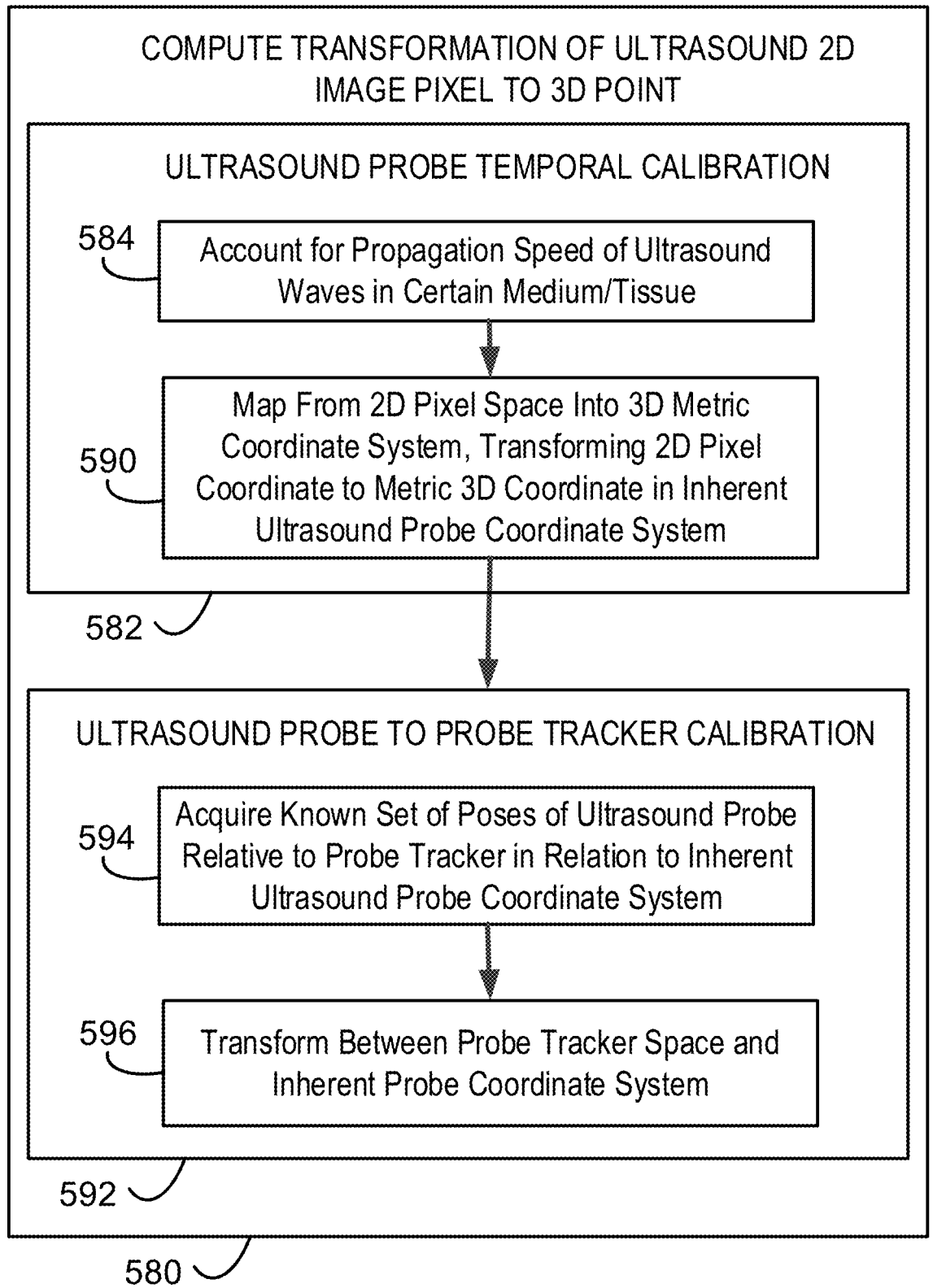
FIG. 8A is flow chart of a portion of the registration process of FIG. 5A, namely the process for computing transformation of ultrasound two dimensional ("2D") image pixels to 3D points.
Figure 8B:
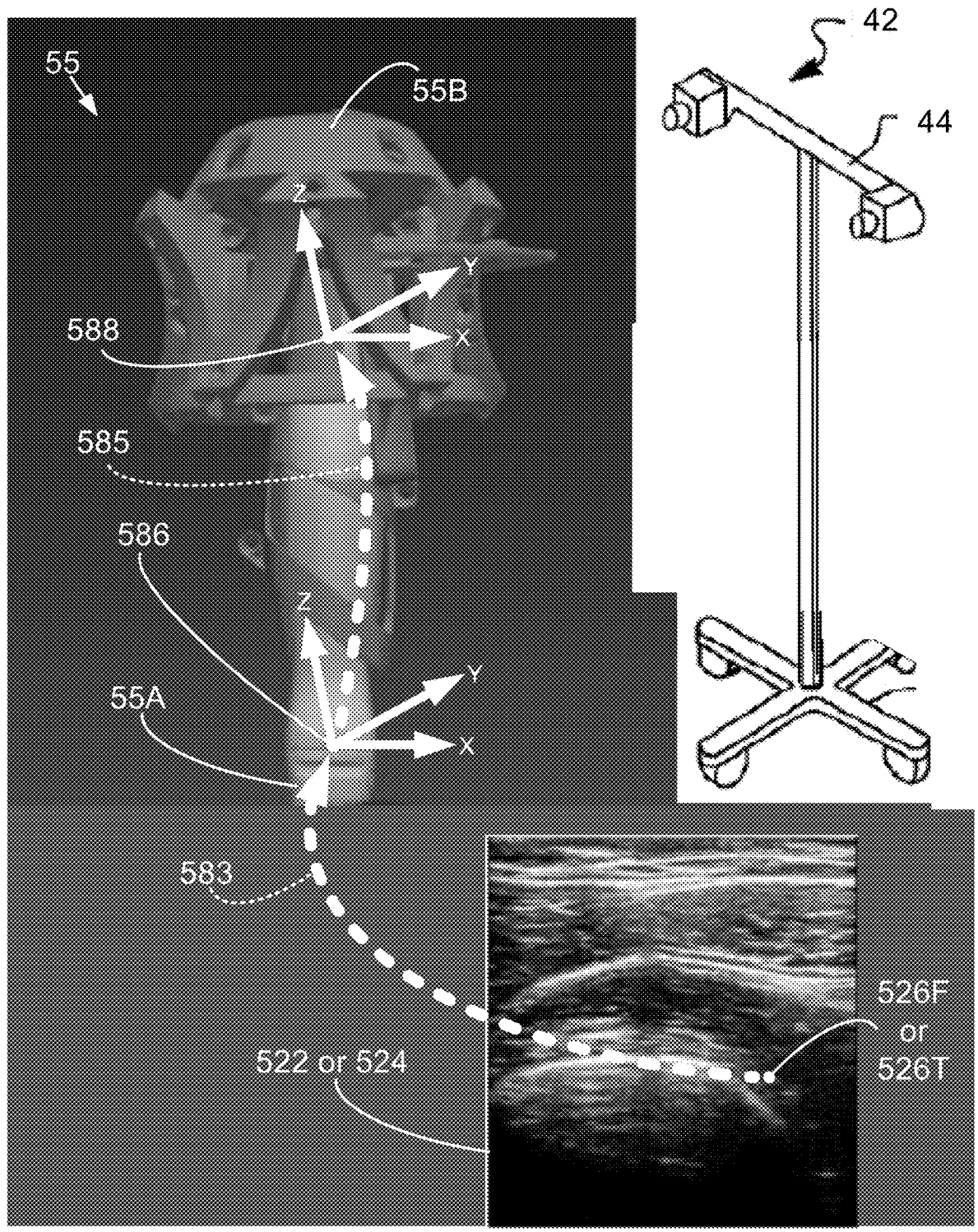
FIG. 8B is a pictorial depiction of the process of FIG. 8A.

FIG. 8A is a flow chart of the process for computing the transformation of the 2D surface pixels 526F, 526T into 3D surface pixels 578F, 578T (Step 580), and FIG. 8B is a pictorial depiction of the process of FIG. 8A. As shown in FIGS. 8A and 8B, this process employs an ultrasound probe temporal calibration (Step 582), wherein the propagation speed of ultrasound waves 583 in certain mediums/tissues is accounted for when the ultrasound scans (514 in FIG. 5B) are taken of the bones (10, 11 in FIG. 1) via ultrasound waves 583 projected and detected via the ultrasound probe distal tip 55A, the ultrasound probe trackable element 55B being detected by the detection device 44 of the navigation system 42 as the ultrasound probe 55 is being tracked intra-operatively (Step 584). The distal tip 55A includes a sensor array with its own inherent coordinate system 586. In doing so, the 2D surface pixels 526F, 526T of the ultrasound images 522, 524 undergo a transform 585 to be mapped from 2D pixel space (2D pixel coordinate system) 586 into the 3D metric coordinate system 588, transforming the 2D surface pixels 526F, 526T to the 3D surface pixels 578F, 578T and the 2D pixel coordinate thereof to the 3D coordinate in the inherent ultrasound probe coordinate system 588 (Step 590).

As indicated in FIG. 8A and can be understood from FIG. 8B, upon completion of the ultrasound probe temporal calibration (Step 582), the process moves on to an ultrasound probe to probe tracker calibration (Step 592). In doing so, the system acquires a known set of poses of the ultrasound probe 55 relative to the probe detection device 44 of the navigation system 42 in relation to the inherent ultrasound probe coordinate system 588 (Step 594). The system then completes a transform between the probe tracker space and the inherent ultrasound probe coordinate system (Step 596).

For additional information regarding complementary and/or alternative processes associated with computing the transformation of the 2D surface pixels 526F, 526T into 3D surface pixels 578F, 578T according to Step 580 or a version thereof, reference is made to PCT Application Number PCT/IB20 18/056 189 (International Publication Number WO 2019/035049 A1), international filing date Aug. 16, 2018 and entitled "ULTRASOUND BONE REGISTRATION WITH LEARNING-BASED SEGMENTATION AND SOUND SPEED CALIBRATION," this application being hereby incorporated by reference in its entirety into the present disclosure.

While the immediately preceding discussion takes place in the context of a 2D ultrasound probe, it should be understood that the 2D ultrasound probe can be replaced with a 3D ultrasound probe to carry on the processes disclosed in this Detailed Description. Thus, the processes disclosed in this Detailed Description should not be limited to 2D ultrasound probes and 2D pixels/points, but should be considered to include 3D ultrasound probes and any type of ultrasound pixels/points in the image coordinate system, whether those ultrasound pixels/points are 2D or 3D.

Each individual ultrasound sweep with the ultrasound probe will generate an individual ultrasound image that captures a slice or small part of the patient bone. Multiple individual ultrasound sweeps with the ultrasound probe are typically needed when ultrasound imaging the patient bone. In order to stitch together each individual ultrasound image into one consistent 3D ultrasound image data set, the ultrasound probe is tracked relative to the anatomy trackers attached to each of the N captured bones.

In the instance where the ultrasound scanned bones are immobilized, the process of stitching together the individual ultrasound images can be simplified. Specifically, in such an instance, each individual ultrasound image can be stitched together with the other individual ultrasound images by tracking the ultrasound probe only.

As can be understood from FIGS. 5A and 5B, once the system completes Step 580, it then creates a classified 3D bone surface point cloud 598 (Step 600). The classified 3D bone surface point cloud 598 will have femur points 602 classified to the femur, patella points 604 classified to the patella, and tibia points 606 classified to the tibia. For additional complementary aspects or alternative aspects of a process for registration using an ultrasound probe, reference is made to U.S. patent application Ser. No. 14/144,961, filed Dec. 31, 2013, and entitled "SYSTEMS AND METHODS OF REGISTRATION USING AN ULTRASOUND PROBE", the disclosure of which is hereby incorporated herein by reference in its entirety.

ii. Initial Rough Registration

As discussed above and indicated in FIG. 5A, during the workflow portion of the preoperative aspect 500, medical images are acquired of the patient's joint (Step 504), as discussed above in section "A. Preoperative Imaging" of this Detailed Description. As indicated in FIG. 5A, the pre-operative aspect 500 continues with a dataflow portion, wherein the medical images are then used to generate 3D CAD models of the bones forming the patient's joint (Step 506), as discussed above in section "A. Preoperative Imaging" of this Detailed Description in reference to FIGS. 4A-4E. The dataflow portion of the pre-operative aspect 500 concludes with the generation of initial registration data in CAD-model space relative to the 3D CAD models 111-114 (FIG. 4E) of the patient bones 104-106 of the patient joint images 108 (FIGS. 4A-4D) (Step 508). Specifically, this generation of initial registration data (Step 508) includes defining the above-described probe poses and anatomical landmarks in the 3D CAD-model space.

Figure 9A:
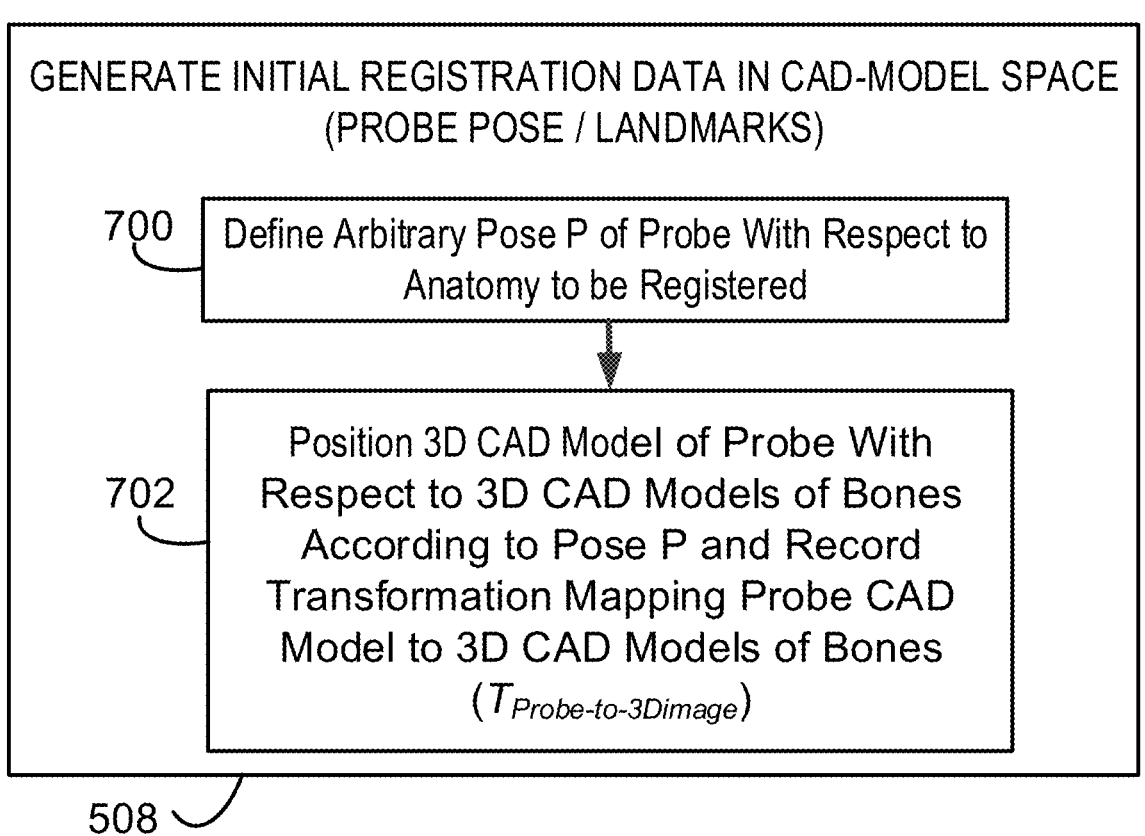
FIG. 9A is a flow chart of a portion of the registration process of FIG. 5A, namely the process of obtaining general registration data in CAD-model space (probe pose/landmarks).
Figure 9B:
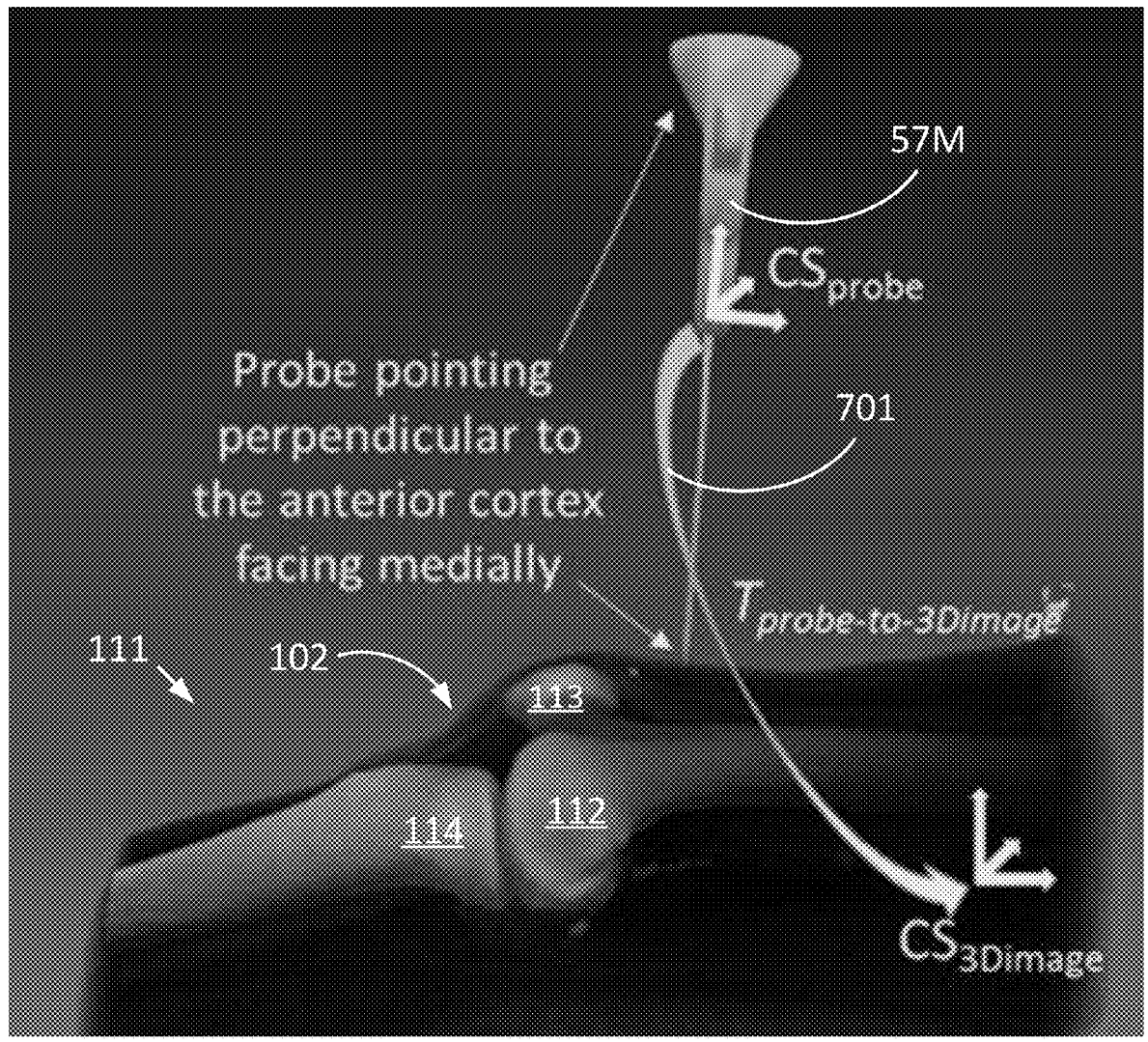
FIG. 9B is a pictorial depiction of the process of FIG. 9A.

For a discussion of the pre-operative process for defining the probe poses and anatomical landmarks according to Step 508 of FIG. 5A, reference is now made to FIG. 9A, which is a flow chart outlining the process of Step 508. As shown in FIG. 9A, Step 508 begins by defining an arbitrary pose P of the probe with respect to the patient anatomy to be registered (Step 700). As can be understood from FIGS. 9A and 9B, a 3D CAD model of the probe 57 (FIG. 1) (i.e., 3D CAD probe model 57M) is then positioned in the defined arbitrary pose P relative to the 3D CAD bone model 111 shown in FIG. 4E, and a transformation ($T_{Probe-to-3Dimage}$) 701 is recorded, the transformation 701 mapping the 3D CAD probe model 57M to the 3D CAD bone model 111 from the probe coordinate system $CS_{probe}$ to the 3D image coordinate space $CS_{3Dimage}$ (Step 702). Specifically, as one non-limiting example of a host of possible arbitrary poses P, the 3D CAD probe model 57M is placed such that it points perpendicular to the center of the femoral anterior cortex of the 3D CAD femur model 112 of the 3D CAD bone model 111 of the knee region 102 and faces medially, as illustrated in FIG. 9B. Of course, any other arbitrary pose P can be defined that is suitable for the specific surgical application. Step 702 can be performed by a dedicated surgical planner or a surgeon. The 3D CAD bone model 111 of the knee region 102 may be a volume rendered or other type of CT image or medical image or model defined therefrom.

Figure 10A:
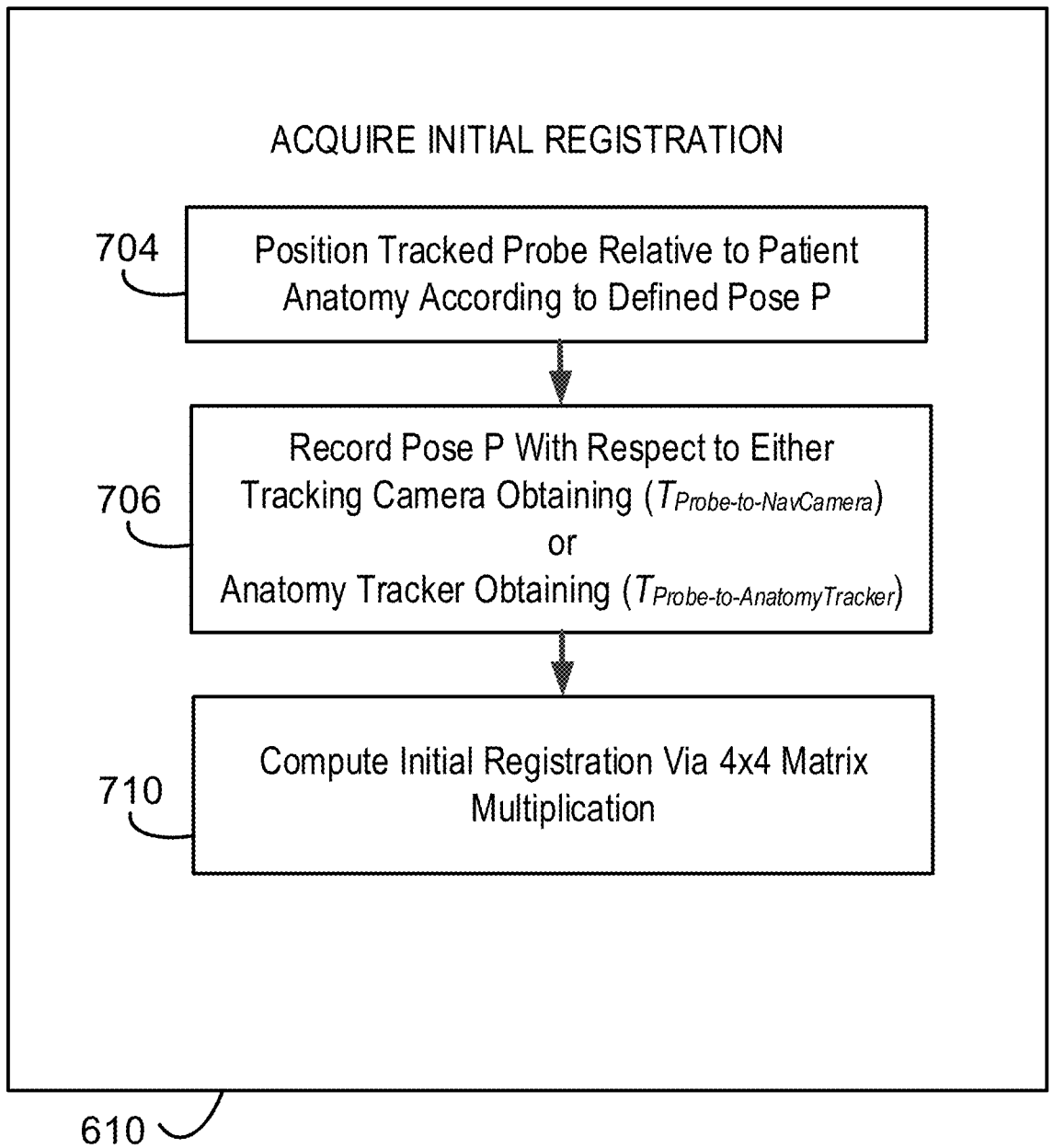
FIG. 10A is a flow chart of the registration process of FIG. 5A, namely wherein the initial registration is acquired intra-operatively.

As indicated in FIG. 5A, once the generation of initial registration data has been completed as discussed above with respect to Step 508, initial registration data is acquired (Step 610) as part of the workflow portion of the intraoperative aspect 502 of the ultrasound based multiple bone registration process 503. For a discussion of the intraoperative process for acquiring initial registration data according to Step 610 of FIG. 5A, reference is now made to FIG. 10A, which is a flow chart outlining the process of Step 610. As shown in FIG. 10A, Step 610 begins by positioning the tracked probe 57 relative to the patient anatomy according to the defined pose P of Step 508 (Step 704). In other words, for Step 704, the pose P depicted in FIG. 9B between the 3D CAD probe model 57M and 3D CAD femur model 112 of the 3D CAD bone model 111 is replicated intraoperatively between the actual physical probe 57 and the patient's actual femur 11 in this example. This intra-operative pose P is then recorded (Step 706).

Figure 10B:
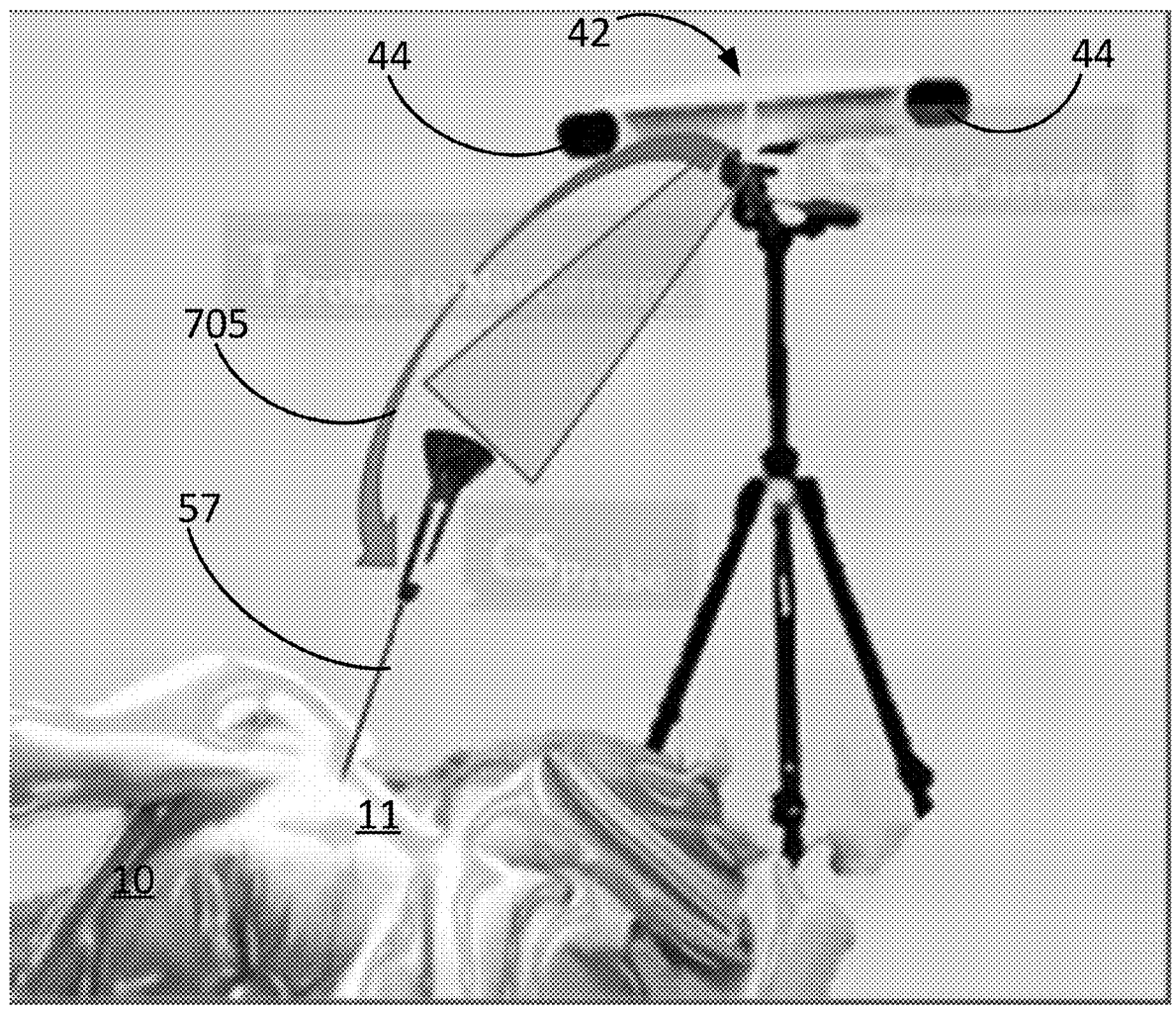
FIGS. 10B and 10C are pictorial depictions of alternative aspects of the process of FIG. 10A.

As can be understood from FIG. 10B, the recording of the intra-operative pose P of Step 706 can be achieved with a tracking camera 44 of a tracking system 42 that obtains the transformation ($T_{Probe\text{-}to\text{-}NavCamera}$) 705. Alternatively, as indicated in FIG. 10C, the recording of the intra-operative pose P of Step 706 can be achieved with an anatomy tracker 47 of a tracking system 42 that obtains the transformation ($T_{Probe\text{-}to\text{-}AnatomyTracker}$) 707.

Figure 10C:
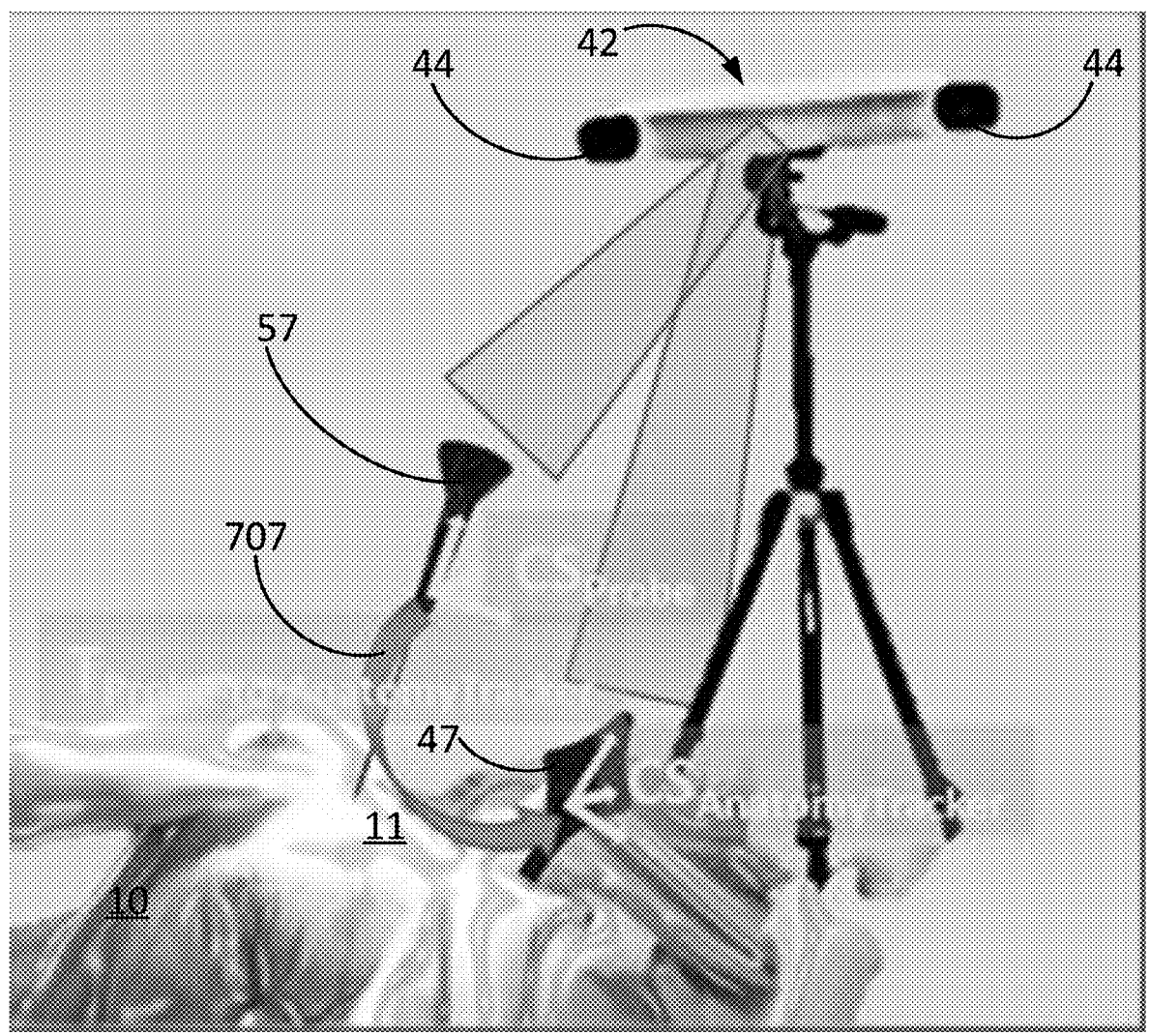

The process of Step 610 ends with the computation of the initial registration via 4×4 matrix multiplication wherein $T_{NavCamera\text{-}to\text{-}3Dimage} = T_{Probe\text{-}to\text{-}3Dimage} * \text{inv}(T_{Probe\text{-}to\text{-}NavCamera})$ where a tracking camera 44 is employed as shown in FIG. 10B or wherein $T_{AnatomyTracker\text{-}to\text{-}3Dimage} = T_{Probe\text{-}to\text{-}3Dimage} * \text{inv}(T_{Probe\text{-}to\text{-}AnatomyTracker})$ where an anatomy tracker 47 is employed as shown in FIG. 10C (Step 710). As indicated in FIG. 5A, this initial registration data then enters a registration module 612 as part of the dataflow portion of the intra-operative aspect 502 of the ultrasound based multiple bone registration process 503.

As indicated in FIG. 5A, the registration module (Step 612) may employ any of a wide variety of alternative registration processes, such as for three non-limiting examples, a "one click/one pose" registration (Step 614), a "landmark based" registration (Step 616), or an "anatomy tracker pins based" registration (618). The any of these three applications 614, 616, 618 is capable of establishing an initial registration (i.e., a "rough" guess) of the transformation from anatomy tracker space to the CAD-model (CT/MRI) coordinate system. Other alternative registration process that may be part of the registration model (Step 612) may include, for example, "probe-based" registration, "probe-mini-sweep based" registration, or even utilizing a calibrated digital camera to generate a photo of the patient anatomy to be registered and estimate pose and location therefrom.

Figure 11A:
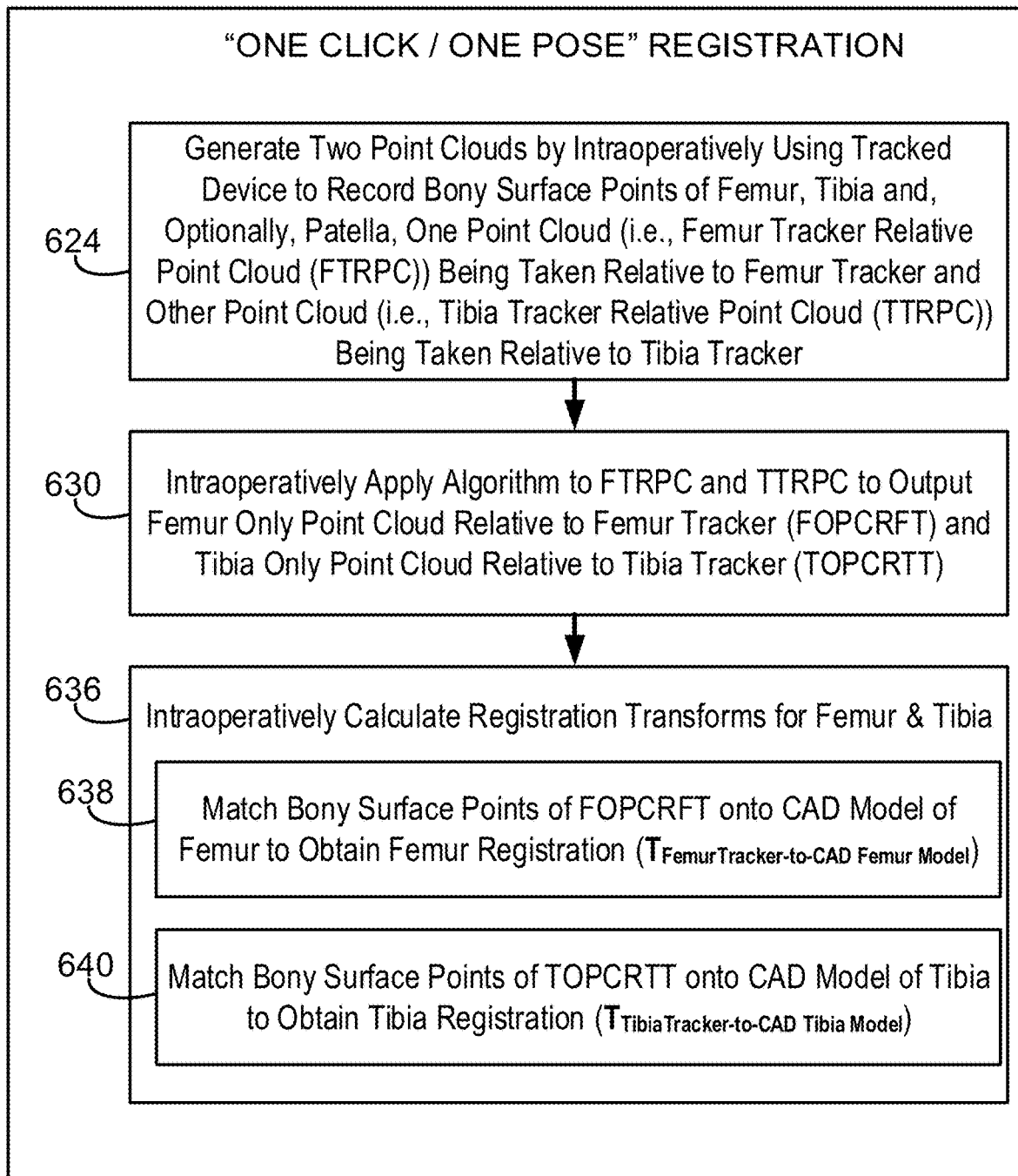
FIG. 11A is a flow chart of a portion of the registration process of FIG. 5A, namely the process for "one click/one pose" registration.
Figure 11B:
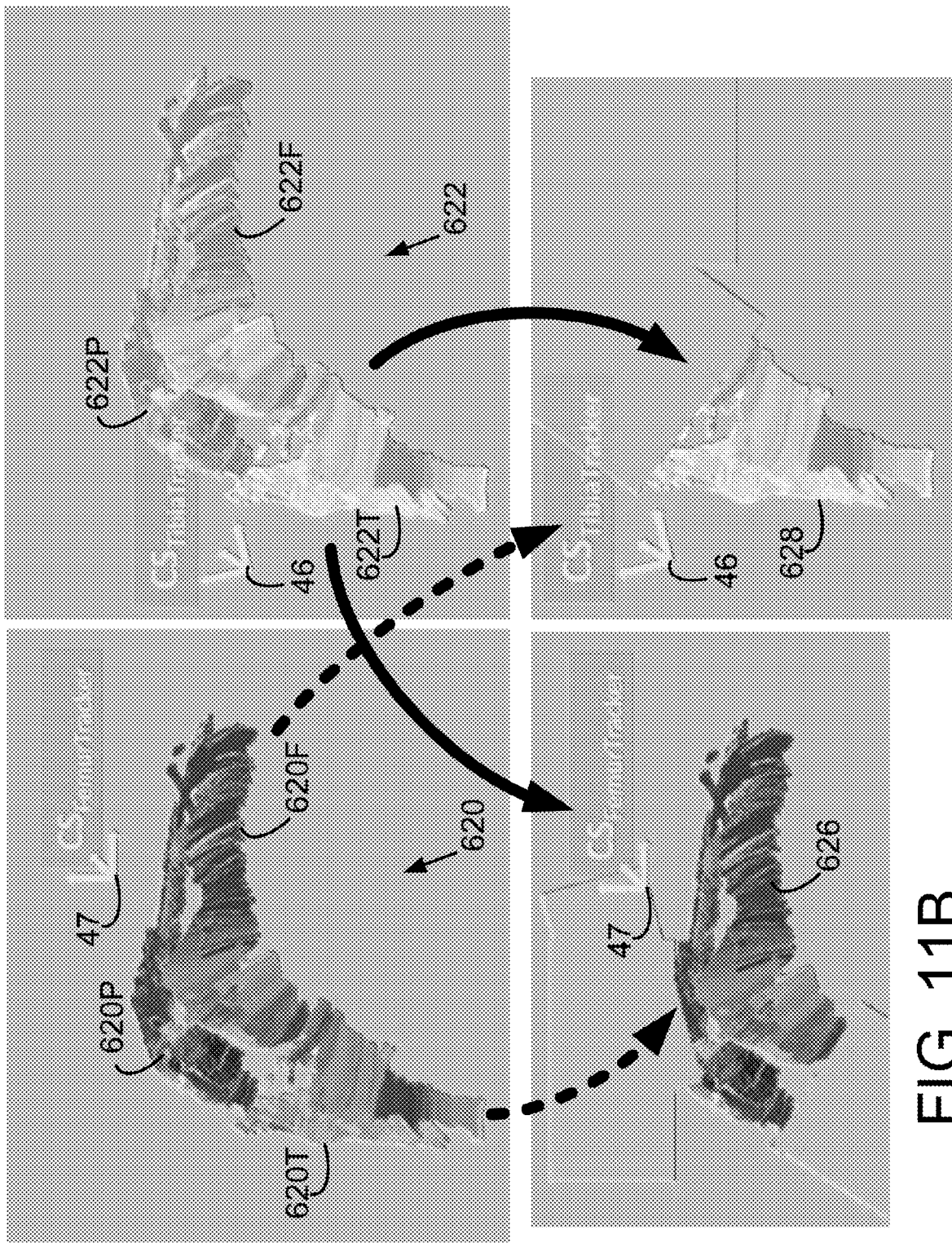
FIGS. 11B and 11C are pictorial depictions of aspects of the process of FIG. 11A.
Figure 11C:
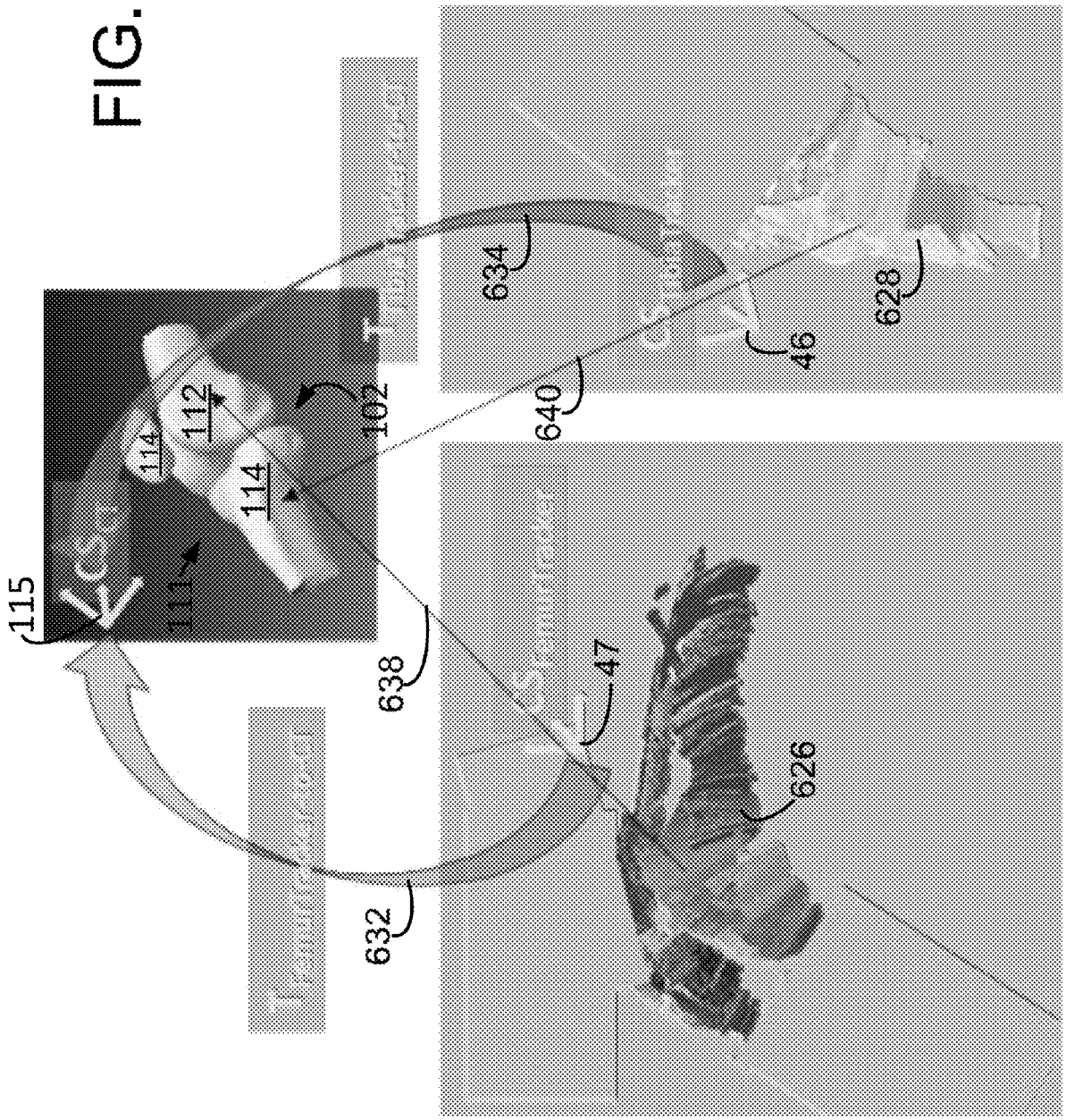

FIG. 11A is a flow chart of the process of the surgical system 100 for registration utilizing "one click/one pose" registration (Step 614), and FIGS. 11B and 11C are pictorial depictions of the process of FIG. 11A. As shown in FIGS. 11A and 11B, this process (Step 614) begins by generating two point clouds 620, 622 by intraoperatively using the tracked probe 57 in FIGS. 1, 10B and 10A to record bony surface points of the femur 11, tibia 10 and, optionally, the patella (Step 624). In this Step 624, one point cloud (i.e., the femur tracker relative point cloud ("FTRPC") 620 is taken relative to the femur tracker 47 in FIG. 1) and the other point cloud (i.e., tibia tracker relative point cloud ("TTRPC") 622 being taken relative to the tibia tracker 46) (Step 624). In other words, essentially two point clouds 620, 622 are acquired, one point cloud 620 with respect to the femur tracker 47 and the other point cloud 622 with respect to the tibia tracker 46.

As can be understood from FIG. 11B, the FTRPC 620 will have femur data points 620F, patella data points 620P and tibia data points 620T, although none of these data points are yet identified as such and are simply data points of the overall FTRPC 620. Similarly, the TTRPC 622 will have femur data points 622F, patella data points 622P and tibia data points 622T, although none of these data points are yet identified as such and are simply data points of the overall TTRPC 622.

As indicated in FIGS. 11A and 11B, the "one click/one pose" registration process (Step 614) continues by the intraoperative application of a classification algorithm to the FTRPC 620 and TTRPC 622 to output a femur only point cloud relative to the femur tracker ("FOPCRFT") 626 and a tibia only point cloud relative to the tibia tracker ("TOPCRTT") 628 (Step 630). This separation of the point clouds is advantageous since the pose of the knee in the pre-operative 3D CAD bone model might differ from the pose of the knee intra-operatively.

As can be understood from FIGS. 11A and 11C, subsequent to Step 630, the "one click/one pose" registration process (Step 614) continues by intraoperatively calculating registration transforms 632, 634 for the femur 11 and tibia 10, respectively (Step 636). This calculation of registration transforms may employ a registration algorithm (e.g., "Iterative Closest Point"). For example, bony surface points of the FOPCRFT 626 are matched onto the femur CAD model 112 to obtain the femur registration ($T_{FemurTracker\text{-}to\text{-}CAD\ Femur\ Model}$) (Step 638). Similarly, bony surface points of the TOPCRTT 628 are matched onto the tibia CAD model 114 to obtain the tibia registration ($T_{TibiaTracker\text{-}to\text{-}CAD\ Tibia\ Model}$) (Step 640). This "one click/one pose" registration of Step 614 is beneficial as it at least partially facilitates the intra-operative ultrasound surface capturing process of Step 512, where multiple bone surfaces are acquired simultaneously via the ultrasound probe 55.

Figure 12:
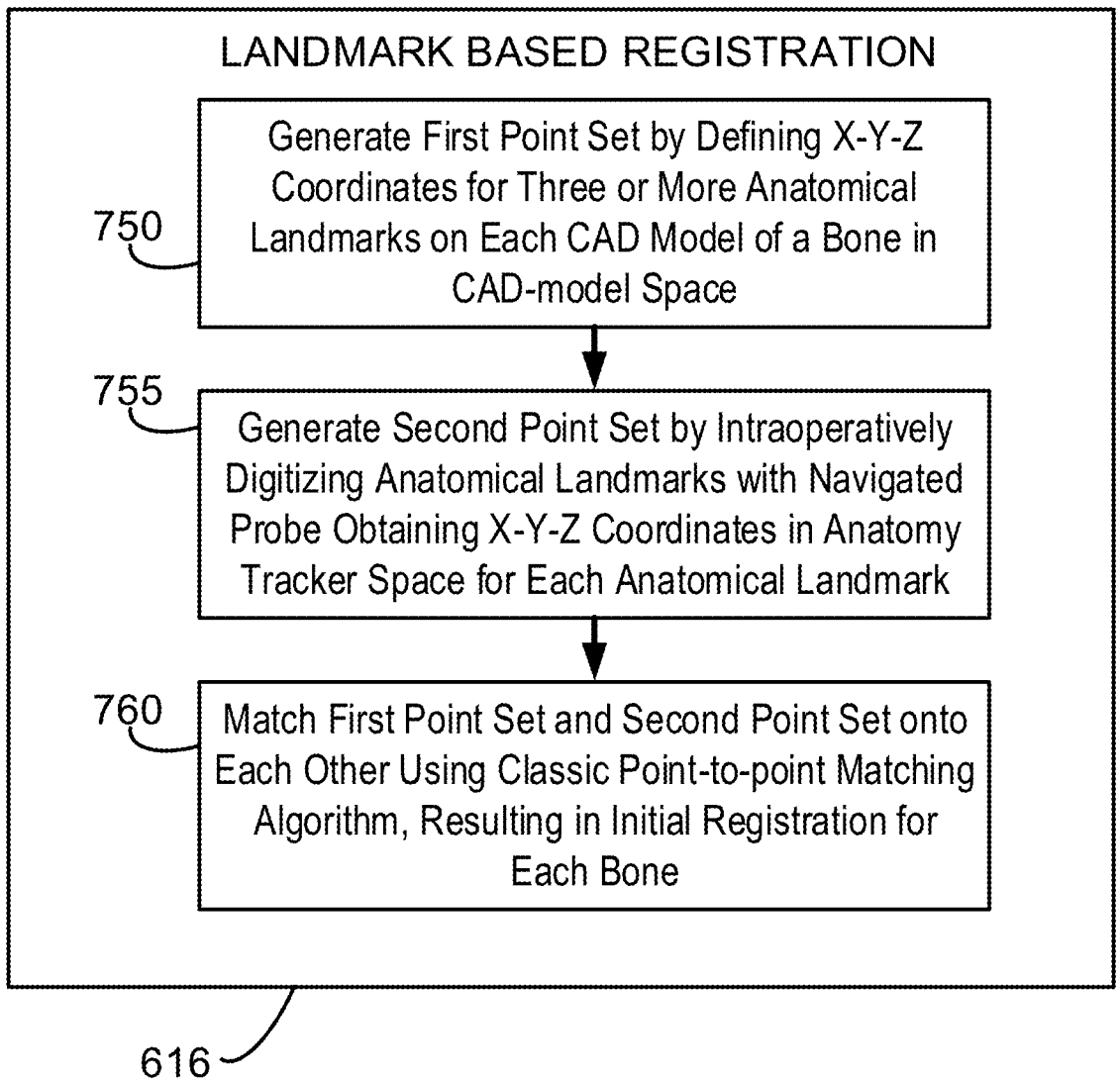
FIG. 12 is flow chart of a portion of the registration process of FIG. 5A, namely the process for landmark based registration.

FIG. 12 is a flow chart of the process of the surgical system 100 for registration utilizing landmark based registration (Step 616). As shown in FIG. 12, this process (Step 616) begins by generating a first point set by defining X-Y-Z coordinates for three or more anatomical landmarks on each 3D CAD model of a bone in CAD-model space (Step 750). In the present example where the surgery is in the context of a knee arthroplasty and the bones are a tibia 10 and femur 11 (see FIG. 1), this Step 750 generates a first point set by defining X-Y-Z coordinates for three or more anatomical landmarks on each of the 3D CAD femur model 112 and the 3D CAD tibia model 114. This Step 750 can be accomplished pre-operatively or intra-operatively.

Subsequent to Step 750, a second point set is generated by intraoperatively digitizing anatomical landmarks via the navigated probe 57 obtaining X-Y-Z coordinates in anatomy tracker space for each anatomical landmark defined in Step 750 (Step 755). In other words, for Step 755, the second points are digitized intraoperatively on the actual tibia 11 and femur 12 at landmarks on those bones that correspond to those landmarks defined on the corresponding 3D CAD tibia model 114 and 3D CAD femur model 112, respectively.

For the final aspect of Step 616, the first and second point sets are matched onto each other using a classic point-to-point matching algorithm, resulting in the initial registration for each bone (Step 760). In an alternative embodiment, the point-to-point algorithm of Step 760 may be replaced by a point-to-surface algorithm, wherein the pre-operative 3D CAD femur model 112 and the 3D CAD tibia model 114 do not have point clouds, but are surface models.

In summary, the landmark based registration 616 described in FIG. 12 can be said to include the digitization of landmarks in CAD space (pre-op planning) and in anatomy tracker space (intra-operatively). Having these two landmark sets is sufficient to calculate the initial registration completed via the registration module 612 when employing landmark based registration 616 (see FIG. 5A).

Figure 13A:
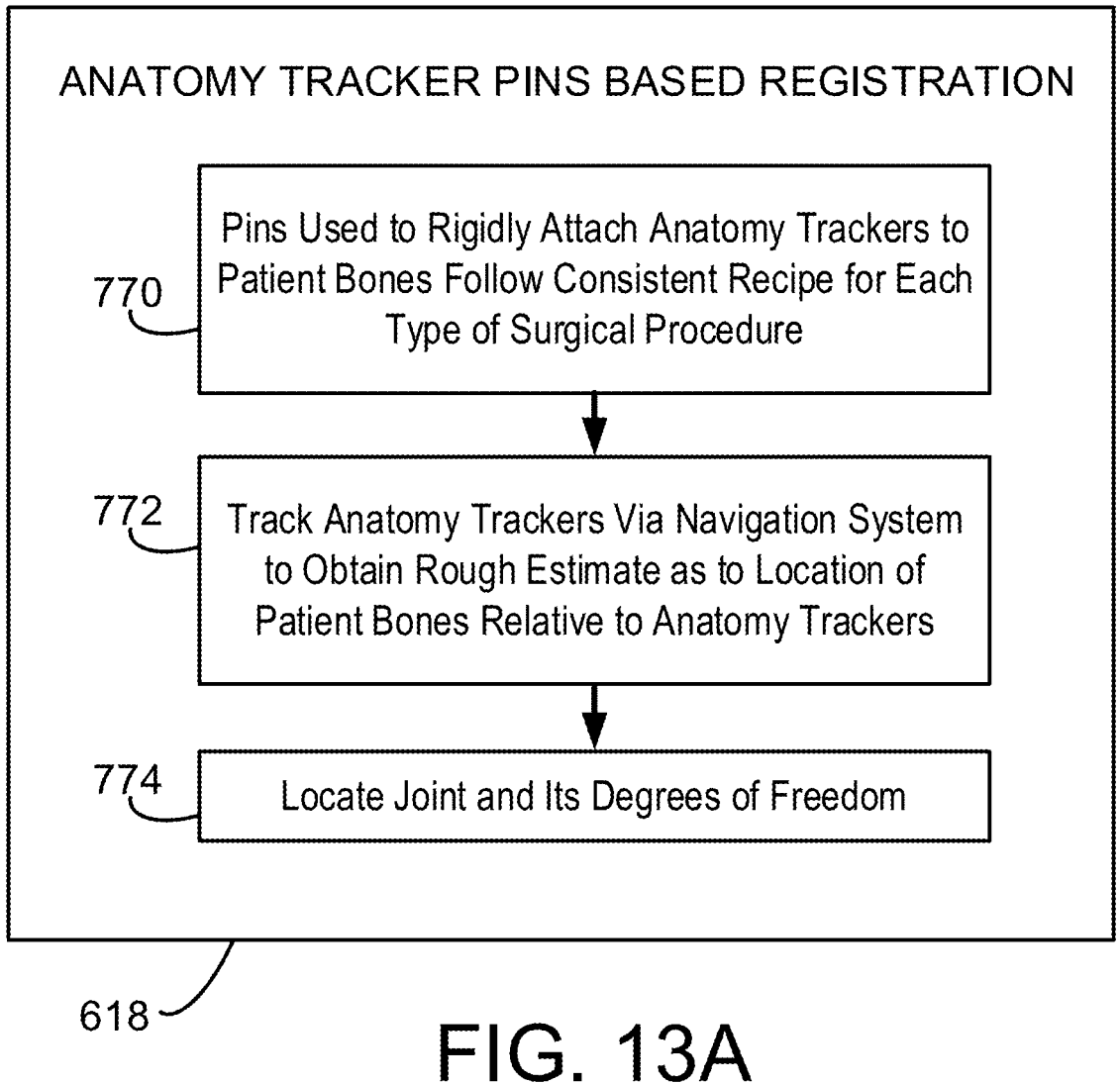
FIG. 13A is flow chart of a portion of the registration process of FIG. 5A, namely the process for anatomy tracker pins based registration.
Figure 13B:
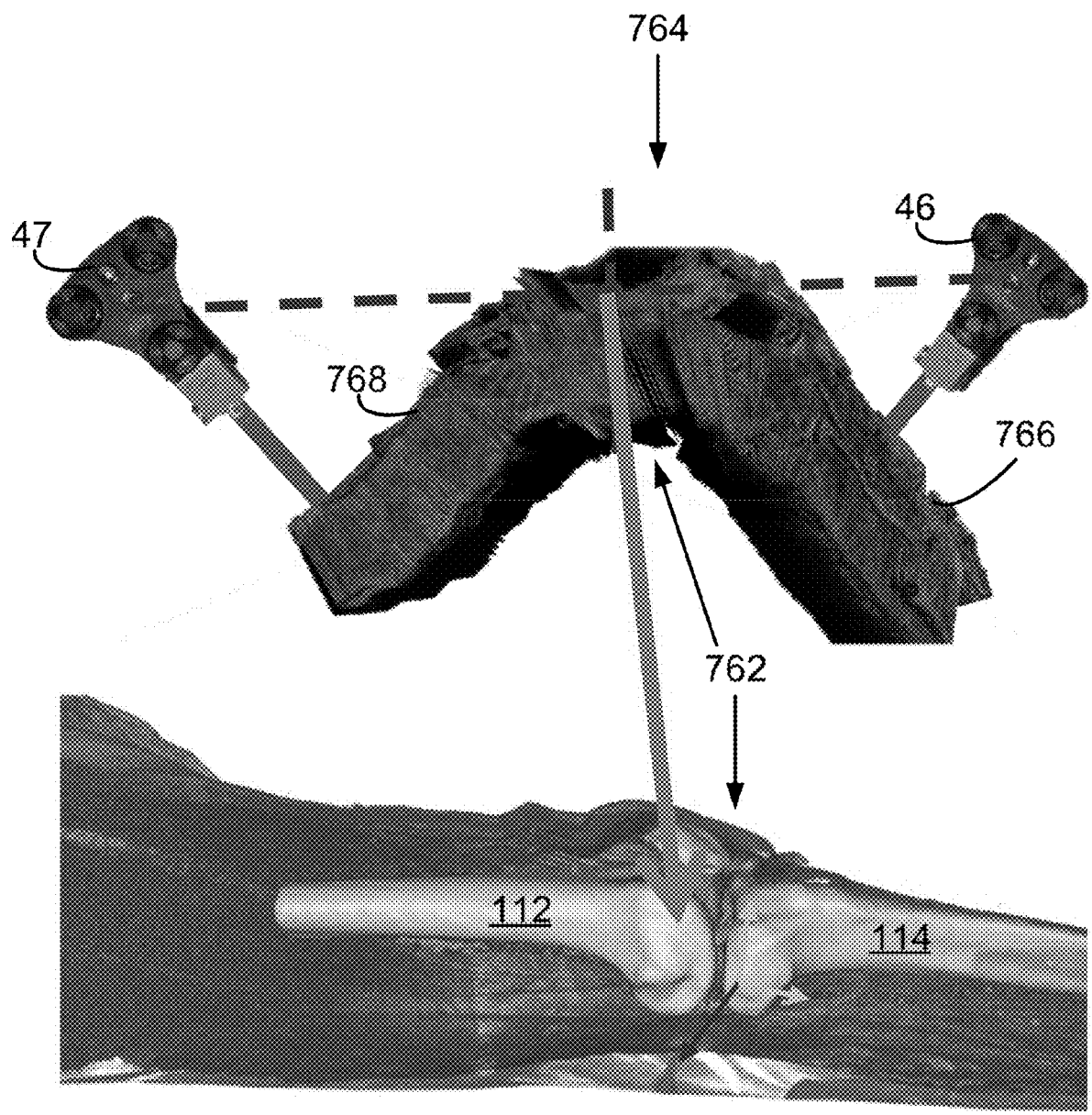
FIG. 13B is a pictorial depiction of an aspects of the process of FIG. 13A.

FIG. 13A is a flow chart of the process of the surgical system 100 for registration utilizing anatomy tracker pins based registration (Step 618). As illustrated in FIGS. 13A and 13B, this process (Step 618) begins by the mounting of the pins used to rigidly attach the anatomy trackers 46, 47 to the patient bone (e.g., tibia 10 and femur 11 in the context of this example, which is a knee arthroplasty), the mounting of the pins being done in a consistent, repeatable manner for each type of surgical procedure (Step 770). The navigation system 42 (FIG. 1) then tracks the anatomy trackers 46, 47 to obtain a rough estimate as to the location of the patient bones 10, 11 relative to the anatomy trackers 46, 47 (Step 772).

As can be understood from FIGS. 13A and 13B, for the final aspect of Step 618, the knee joint 762 is located and its degrees of freedom are determined (Step 774). In doing so, the patient femur 11 and tibia 10 (FIG. 1) are intraoperatively articulated relative to each other about the knee 762, causing the second point cloud 764, which is referenced to the trackers 46, 47 mounted on the patient tibia 10 and femur 11, to deflect such that a tibia portion 766 of the point cloud 764 and a femur portion 768 of the point cloud 764 articulate relative to each other at the knee joint 762. This articulation is transformed to the femur model 112 and tibia model 114.

In summary, the anatomy tracker pins based registration 618 described in FIGS. 13A and 13B can be said to employ some assumptions about the typical location where the anatomy trackers are placed and how the knee is bent (e.g. anatomy tracker pins mounted at anterior mid-shaft, knee is in mid-flexion (e.g. between 30° and 70°)). By using this knowledge, the location of the center of the knee joint and its orientation in 3D space with respect to the anatomy trackers pins can be roughly estimated. Eventually this location and orientation is used to define an initial registration transform, which is sufficient to calculate the initial registration completed via the registration module 612 when employing anatomy tracker pins based registration 618 (see FIG. 5A).

As indicated in FIG. 5A, once the registration module (Step 612) has completed the initial or "rough guess" registration process via any of the three alternative registration processes (i.e., "one click/one pose" registration (Step 614), "landmark based" registration (Step 616), or "anatomy tracker pins based" registration (618)), the registration module outputs the initial or "rough guess" registration data (e.g., the guess of the transform from the trackers 46, 47 to the 3D CAD bone models 111, 112, 113, 114) (Step 776).

iii. Calculation of Final Multiple Bone Registration

Figure 14A:
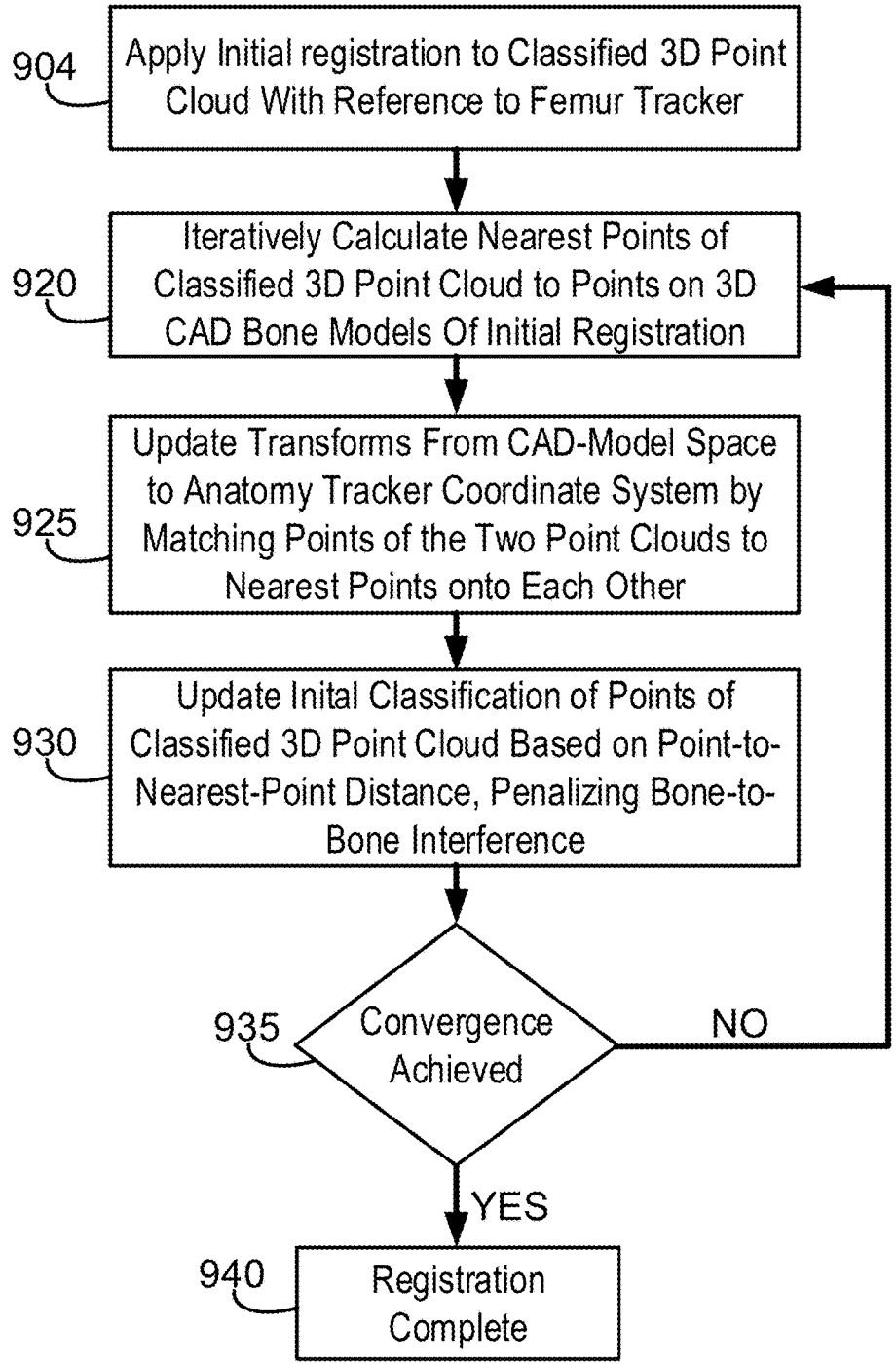
FIG. 14A is flow chart of a portion of the registration process of FIG. 5A, namely the process for the calculation of final multiple bone registration.
Figure 14B:
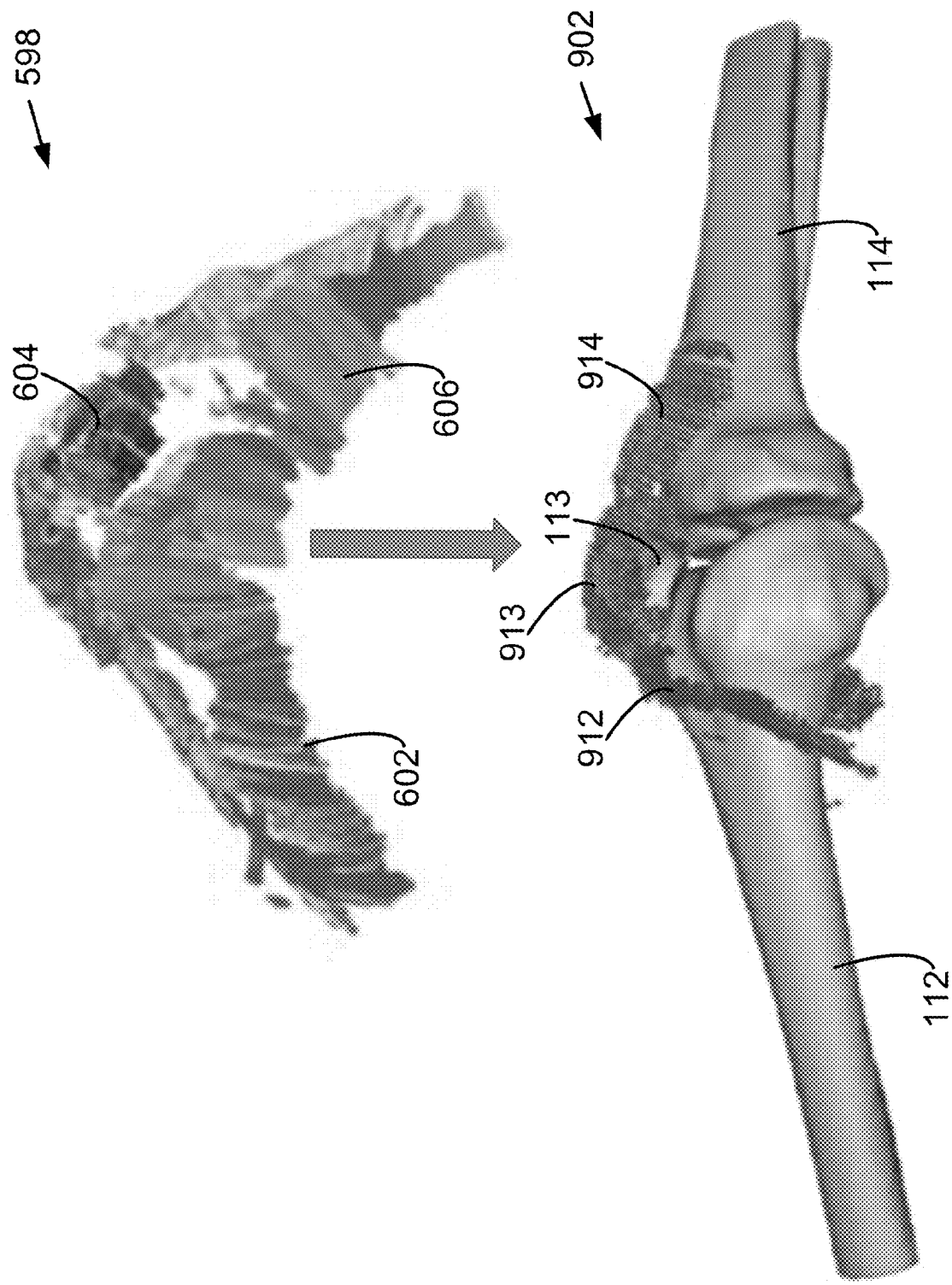
FIGS. 14B and 14C are pictorial depictions of aspects of the process of FIG. 14A.
Figure 14C:
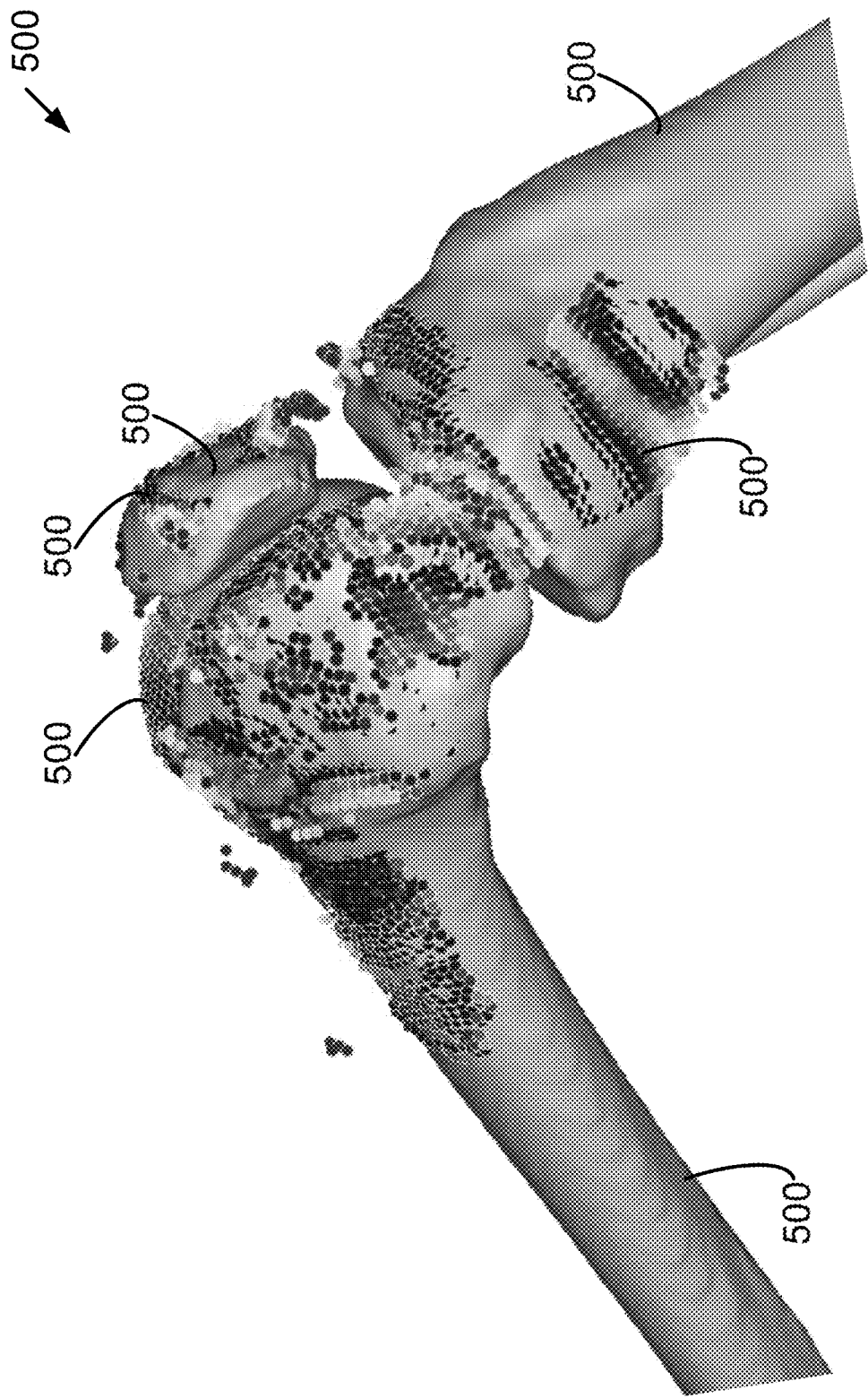

As can be understood from FIGS. 5A and 5B, the initial registration data of Step 776 is utilized with the classified 3D bone surface point cloud 598 of Step 600 to calculate the final multiple bone registration (Step 900), as will now be discussed with respect to FIGS. 14A-14C, wherein FIG. 14A is a flow chart of the process for Step 900 in FIG. 5A, and FIGS. 14B and 14C are pictorial depictions of aspects of the process of FIG. 14A. As shown in FIGS. 14A and 14B, the initial or rough registration data 902 of Step 776 of FIG. 5A is applied to the classified 3D point cloud 598 of Step 600 of FIG. 5A with reference to the femur tracker 47 (Step 904). As discussed above with respect to FIG. 5B and illustrated in FIG. 14B, the classified 3D point cloud 598 has femur points 602 classified to the femur, patella points 604 classified to the patella, and tibia points 606 classified to the tibia. As discussed above in the context of the initial registration module of Step 612 in FIG. 5A and depicted in FIG. 14B, the initial registration data 902 includes a femur point cloud 912, patella point cloud 913 (optional), and tibia point cloud 914 each generated via any of the three initial registration processes 614, 616, 618 of the initial registration module of Step 612, each point cloud 912, 913, 914 being registered to the applicable 3D CAD bone model 112, 113, 114 via the initial registration model of Step 612 and output therefrom according to Step 776.

As indicated in FIG. 14A, the final registration process (Step 900) continues by iteratively calculating the nearest points of the classified 3D point clouds 602, 604, 606 to the points of the point clouds 912, 913, 914 on the 3D CAD bone models 112, 113, 114 of the initial registration or transformation (Step 920). More specifically, the registration transforms are updated from CAD-model space to the anatomy tracker coordinate system by matching the points of the classified 3D point clouds 602, 604, 606 to the points of the point clouds 912, 913, 914 on the 3D CAD bone models 112, 113, 114 of the initial registration or transformation (Step 925). Step 925 is followed by updating the classification of the points of the classified 3D point clouds resulting from Step 925 based on a point-to-nearest-point distance analysis, penalizing for any bone-to-bone interference (Step 930). A check is then made to determine if convergence has been achieved between the classified 3D point clouds 602, 604, 606 and the point clouds 912, 913, 914 on the 3D CAD bone models 112, 113, 114 (Step 935). If convergence has not yet been achieved, then the calculation of the final multiple bone registration returns to Step 920 from the convergence check of Step 935. If convergence has been achieved, then the final registration is complete (Step 940), with the converged initial or rough registration data (e.g., the 3D CAD bone models 112, 113, 114 and the point clouds 912, 913, 914 thereon) finally registered with the classified 3D point clouds 602, 604, 606, the two sets of point clouds 912, 913, 914 and 602, 604, 606 being respectively matched and generally coextensive with each other about the 3D CAD bone models 112, 113, 114, as depicted in FIG. 14C. As illustrated in FIG. 2, with the final registration achieved according to Step 900 of FIG. 5A, the surgical system 100 and procedure can then proceed from registration (Step 805) to navigation (Step 805) and so on, utilizing the final registration data from Step 805 as needed throughout the surgery on the patient via the surgical system 100.

As a twist on the final registration process (900) of FIG. 5A discussed immediately above with respect to FIGS. 14A-14C, in one embodiment, the final registration process 900 continues by iteratively calculating the nearest points of the classified 3D point clouds 602, 604, 606 to the triangulated mesh bone surface on the 3D CAD bone models 112, 113, 114 of the initial registration or transformation. More specifically, the registration transforms are updated from CAD-model space to the anatomy tracker coordinate system by matching the points of the classified 3D point clouds 602, 604, 606 to the triangulated mesh bone surface on the 3D CAD bone models 112, 113, 114 of the initial registration or transformation. The final registration process 900 continues by running an optimization algorithm wherein a cost function is minimized. In one embodiment, this cost function, which depends on the registration matrices existing at that time, is a weighted sum of the following different terms: (1) for each point of the classified 3D point clouds 602, 604, 606, the minimum distance to the closest triangulated mesh bone surface on the 3D CAD bone models 112, 113, 114 of the initial registration or transformation after applying the registration matrices; (2) for each point of the classified 3D point clouds 602, 604, 606, a fixed penalization is assigned to a 3D CAD bone model 112, 113, 114 that does not match its initial guess in order to prevent the 3D CAD bone models 112, 113, 114 from being swapped; (3) for each point or location on the triangulated mesh surface of each 3D CAD bone model 112, 113, 114, a fixed penalization if this point or location lies within another 3D CAD bone model 112, 113, 114 to avoid bone collision; and (4) for each degree of freedom of the sought registration, a penalization term on the magnitude of the translation/registration to be applied on top of the initial registration, the assumption being that the initial registration is sufficiently accurate so there is no need to deviate from it. In one embodiment, the bone assignment is implicitly computed within the first step, so there is no need to explicitly alternate between optimization of the point cloud assignment then optimization of the transformations, as may be required when employing an Iterative Closest Point algorithm.

The final registration process 900 continues with a check being made to determine if convergence has been achieved between the classified 3D point clouds 602, 604, 606 and the triangulated mesh bone surface on the 3D CAD bone models 112, 113, 114. If convergence has not yet been achieved, then the calculation of the final multiple bone registration returns from the convergence check to again iteratively calculate the nearest points of the classified 3D point clouds 602, 604, 606 to the triangulated mesh bone surface on the 3D CAD bone models 112, 113, 114 of the initial registration or transformation, continuing through the rest of the above recited process until convergence is again checked.

If convergence has been achieved, then the final registration is complete with the converged initial or rough registration data (e.g., the triangulated mesh bone surface of the 3D CAD bone models 112, 113, 114) finally registered with the classified 3D point clouds 602, 604, 606, the point clouds 912, 913, 914 being respectively matched and generally coextensive with the respective areas of the triangulated mesh bone surface of the 3D CAD bone models 112, 113, 114. Again, as illustrated in FIG. 2, with the final registration achieved according to Step 900 of FIG. 5A, the surgical system 100 and procedure can then proceed from registration (Step 805) to navigation (Step 805) and so on, utilizing the final registration data from Step 805 as needed throughout the surgery on the patient via the surgical system 100.

The registration process disclosed herein is advantageous in that consistent registration of a single bone can be unforced such that there are no overlapping bones in the resulting registration. Further, the process is flexible/user-friendly and offers faster workflow as the medical professional does not need to avoid scanning more than one bone. The process also is not adversely impacted by outliers from other bones. Thus, when only one bone is registered, the user does not need to avoid accidently scanning another bone in the neighborhood.

Finally, the registration process disclosed herein is advantageous as it does not depend on the incision size of the procedure, which is not the case with registration processes known in the art. This is especially helpful for hip and shoulder procedures and even more so for ankle procedures, the incisions for these procedures being very small, making it hard to access the relevant bony structures with typical digitization tools (navigated pointer, sharp probe, etc.). Ultrasound advantageously enables the access to essentially all of the bony structures of the whole bone.

Further, the registration process disclosed herein is advantageous as it is not limited to a fully-robotic or robotic-assisted application. Specifically, the registration process could be also any navigated surgery employing pre-op imaging. By way of example, the registration process could be employed as part of a navigated cutting jig application, navigated ACL—reconstruction or even navigated procedures to remove an osteosarcoma.

IV. Registration System for Verifying Target of Surgery

There continues to be high concerns in minimizing the risk of completing a surgical procedure on the wrong side of the patient such as, for example, performing an arthroplasty on the patient's right knee when the surgery was supposed to be performed on the left knee. Accordingly, there is a need for a registration system 1500 that can be used to quickly confirm or verify that the surgical team will be operating on the correct target prior to the surgical team taking any significant step in the performance of the surgery.

Figure 15:
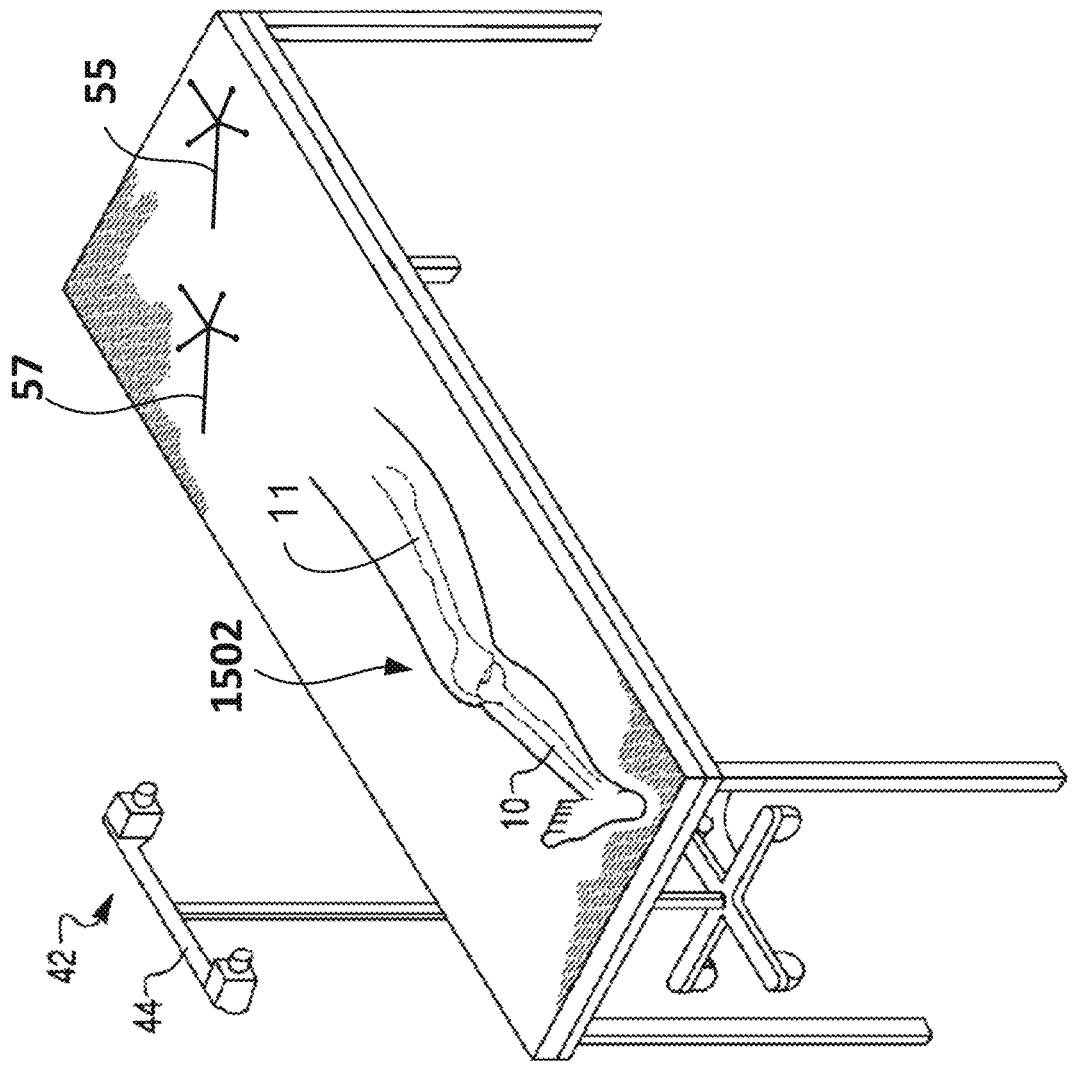
FIG. 15 is an illustration of the registration system or verifying a surgical target.
Figure 15:
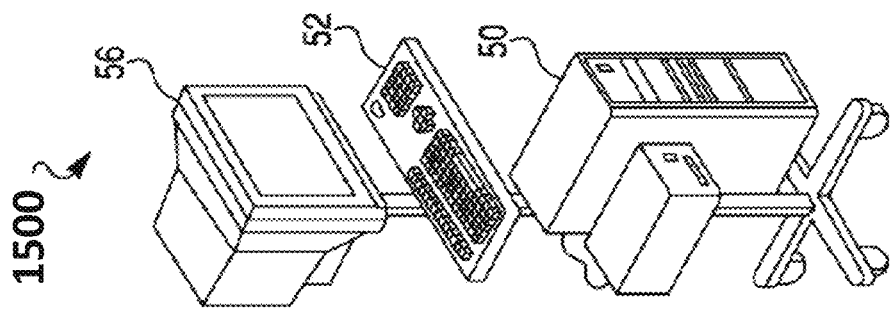

FIG. 15 is an illustration of the registration system 1500. As shown in FIG. 15, the registration system 1500 includes a navigation or tracking system 42, a computer 50, and registration tools 55, 57. The navigation or tracking system 42 includes a detection device 44 that tracks the registration tools 55, 57, and the computer 50 includes an input device and a display 56. The registration tools, which may be in the form of a tracked ultrasound probe 55 and/or a tracked stylus 57, may be used to image and/or touch certain anatomical landmarks of the patient in the vicinity of the surgical target 1502 in registering the patient anatomy to patient specific models and/or images generated preoperatively of the patient anatomy. All of these components of the registration system 1500 are configured to function much as the same elements of the surgical system 100 of FIG. 1 described above.

The navigation or tracking system 42 tracks the registration tools 55, 57 utilized in the registration of the patient's surgical target 1502 to verify that the surgical target is the correct one. In FIG. 15, the surgical target 1502 is the patient's knee 1502, but could also be a shoulder, elbow, hip, ankle, spine, etc.

In operation, the registration system 1500 can be used as a precursor to a robotic or robotic-assisted surgery performed with the above described surgical system 100 of FIG. 1. Similarly, the registration system 1500 can be used as a precursor to traditional non-robotic surgery. In either case, medical personal could utilize the registration system 1500 on the patient preoperatively to correctly identify the intended surgical target 1502. For example, in the context of a knee arthroplasty or other joint arthroplasty, the registration system 1500 is used to distinguish the target knee 1502 from the other non-target knee by scanning and/or touching the landmarks of the patient's tibia 10 and/or femur 11 adjacent the target knee 1502. In the context of a spine procedure, the registration system 1500 could be used to identify the bone boundaries of the vertebra and identify the appropriate vertebral level that is the target of the surgery. In either case, the registration system is employed to determine the correct location of the first and succeeding incisions.

In one embodiment, the pre-operative registration for purposes of surgical target verification can occur by holding the patient's suspected surgical target 1502 still and the scanning the patient's suspected surgical target 1502 with the tracked ultrasound probe. The resulting images are processed and registered to pre-operative patient specific images or computer models of the patient's surgical target via the computer 50 according to the methodology generally outlined in FIG. 5A and described in detail above. If the patient's suspected surgical target 1502 successfully registers to the pre-operative patient specific images or computer models of the patient's surgical target, this is verification that the patient's suspected surgical target 1502 is in fact the correct surgical target. The robotic, robotic-assisted or traditional surgery can then take place on the correctly identified surgical target.

V. Exemplary Computing System

Figure 16:
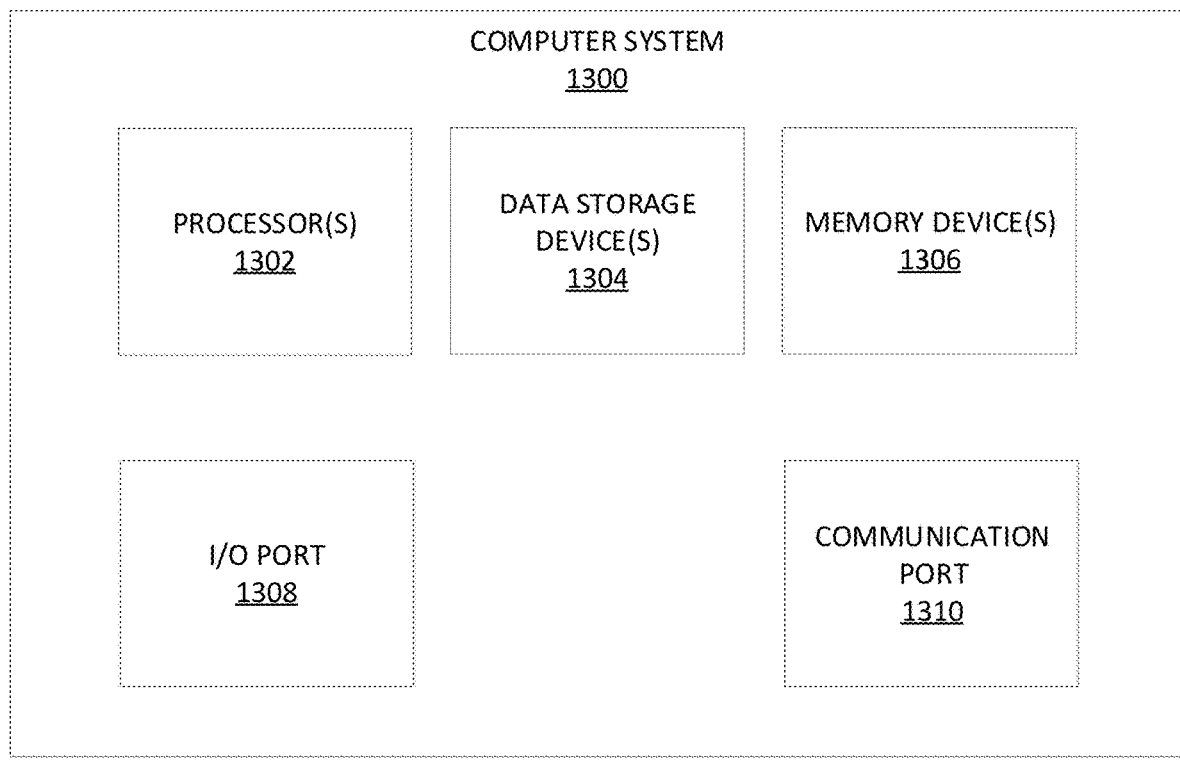
FIG. 16 is an example computing system having one or more computing units that may implement various systems and methods discussed herein.

Referring to FIG. 16, a detailed description of an example computing system 1300 having one or more computing units that may implement various systems and methods discussed herein is provided. The computing system 1300 may be applicable to any of the computers or systems utilized in the preoperative planning, registration, and postoperative analysis of the arthroplasty procedure, and other computing or network devices. It will be appreciated that specific implementations of these devices may be of differing possible specific computing architectures not all of which are specifically discussed herein but will be understood by those of ordinary skill in the art.

The computer system 1300 may be a computing system that is capable of executing a computer program product to execute a computer process. Data and program files may be input to the computer system 1300, which reads the files and executes the programs therein. Some of the elements of the computer system 1300 are shown in FIG. 16, including one or more hardware processors 1302, one or more data storage devices 1304, one or more memory devices 1308, and/or one or more ports 1308-1310. Additionally, other elements that will be recognized by those skilled in the art may be included in the computing system 1300 but are not explicitly depicted in FIG. 16 or discussed further herein. Various elements of the computer system 1300 may communicate with one another by way of one or more communication buses, point-to-point communication paths, or other communication means not explicitly depicted in FIG. 16.

The processor 1302 may include, for example, a central processing unit (CPU), a microprocessor, a microcontroller, a digital signal processor (DSP), and/or one or more internal levels of cache. There may be one or more processors 1302, such that the processor 1302 comprises a single central-processing unit, or a plurality of processing units capable of executing instructions and performing operations in parallel with each other, commonly referred to as a parallel processing environment.

The computer system 1300 may be a conventional computer, a distributed computer, or any other type of computer, such as one or more external computers made available via a cloud computing architecture. The presently described technology is optionally implemented in software stored on the data stored device(s) 1304, stored on the memory device(s) 1306, and/or communicated via one or more of the ports 1308-1310, thereby transforming the computer system 1300 in FIG. 16 to a special purpose machine for implementing the operations described herein. Examples of the computer system 1300 include personal computers, terminals, workstations, mobile phones, tablets, laptops, personal computers, multimedia consoles, gaming consoles, set top boxes, and the like.

The one or more data storage devices 1304 may include any non-volatile data storage device capable of storing data generated or employed within the computing system 1300, such as computer executable instructions for performing a computer process, which may include instructions of both application programs and an operating system (OS) that manages the various components of the computing system 1300. The data storage devices 1304 may include, without limitation, magnetic disk drives, optical disk drives, solid state drives (SSDs), flash drives, and the like. The data storage devices 1304 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 1306 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 1304 and/or the memory devices 1306, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 1300 includes one or more ports, such as an input/output (I/O) port 1308 and a communication port 1310, for communicating with other computing, network, or vehicle devices. It will be appreciated that the ports 1308-1310 may be combined or separate and that more or fewer ports may be included in the computer system 1300.

The I/O port 1308 may be connected to an I/O device, or other device, by which information is input to or output from the computing system 1300. Such I/O devices may include, without limitation, one or more input devices, output devices, and/or other devices.

In one implementation, the input devices convert a human-generated signal, such as, human voice, physical movement, physical touch or pressure, and/or the like, into electrical signals as input data into the computing system 1300 via the I/O port 1308. Similarly, the output devices may convert electrical signals received from computing system 1300 via the I/O port 1308 into signals that may be sensed as output by a human, such as sound, light, and/or touch. The input device may be an alphanumeric input device, including alphanumeric and other keys for communicating information and/or command selections to the processor 1302 via the I/O port 1308. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

In one implementation, a communication port 1310 is connected to a network by way of which the computer system 1300 may receive network data useful in executing the methods and systems set out herein as well as transmitting information and network configuration changes determined thereby. Stated differently, the communication port 1310 connects the computer system 1300 to one or more communication interface devices configured to transmit and/or receive information between the computing system 1300 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 1310 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 1310 may communicate with an antenna or other link for electromagnetic signal transmission and/or reception.

In an example implementation, patient data, bone models (e.g., generic, patient specific), transformation software, registration software, implant models, and other software and other modules and services may be embodied by instructions stored on the data storage devices 1304 and/or the memory devices 1306 and executed by the processor 1302. The computer system 1300 may be integrated with or otherwise form part of the surgical system 100.

The system set forth in FIG. 16 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed herein, for example, those shown in FIGS. 5A-14C, among others, may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure including any of the methods described herein may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

In general, while the embodiments described herein have been described with reference to particular embodiments, modifications can be made thereto without departing from the spirit and scope of the disclosure. Note also that the term "including" as used herein is intended to be inclusive, i.e. "including but not limited to."

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

What is claimed is:

1. A surgical system configured to process an ultrasound image of intraoperative patient bones, the ultrasound image including a bone surface for each of the intraoperative patient bones, the system comprising:
   at least one surgical tool; and
   a computing device including a processing device and a non-transitory computer-readable medium with one or more executable instructions stored thereon, the processing device configured to execute the one or more executable instructions, the one or more executable instructions including:
   i) detecting the bone surface of each of the intraoperative patient bones in the ultrasound image as ultrasound image pixels;

ii) segregating a first point cloud of the ultrasound image pixels associated with the bone surface of each of the intraoperative patient bones;
iii) compute a transformation of the first point cloud into a segregated 3D point cloud that is segregated such that the ultrasound image pixels of the segregated 3D point cloud are each correlated to a corresponding bone surface of the intraoperative patient bones;
iv) computing an initial or rough registration of a second point cloud taken from the intraoperative patient bones to pre-operative patient specific computer models of patient bones; and
v) compute a final multiple bone registration employing the initial or rough registration and the segregated 3D point cloud, wherein the final multiple bone registration achieves a final registration between the segregated 3D point cloud and the intraoperative patient bones,
wherein the at least one surgical tool is in communication with the computing device and the final multiple bone registration serves as an input to navigate the at least one surgical tool in relation to each of the intraoperative patient bones.

2. The system of claim 1, wherein the detecting of the bone surfaces occurs via an image processing algorithm forming at least a portion of the one or more executable instructions.

3. The system of claim 2, wherein the image processing algorithm includes a machine learning model.

4. The system of claim 2, wherein the segregating of the first point cloud occurs via a pixel classification neural network forming at least a portion of the one or more executable instructions.

5. The system of claim 2, wherein the segregating of the first point cloud occurs via an image-based classification neural network forming at least a portion of the one or more executable instructions.

6. The system of claim 1, wherein, in computing the transformation of the first point cloud into the segregated 3D point cloud, the ultrasound image pixels are calibrated to an ultrasound probe tracker and the ultrasound probe tracker is calibrated to a tracking camera.

7. The system of claim 6, wherein calibrating the ultrasound image pixels to the ultrasound probe tracker is based on a propagation speed of ultrasound waves in a certain medium.

8. The system of claim 1, wherein, in computing the transformation of the first point cloud into the segregated 3D point cloud, the ultrasound image pixels are calibrated to an ultrasound probe tracker, wherein the ultrasound probe tracker is calibrated to one or more of a tracking camera and a coordinate system relative to the bone surface via an anatomy tracker located on the bone surface of the intraoperative patient bones.

9. The system of claim 1, wherein the segregating of the first point cloud occurs via geometric analysis of the first point cloud.

10. The system of claim 1, wherein the second point cloud includes multiple point clouds relative to multiple trackers on the intraoperative patient bones.

11. The system of claim 10, wherein the multiple point clouds include one point cloud registered to one computer model of the pre-operative patient specific computer models of the patient bones and another point cloud registered to another computer model of the pre-operative patient specific computer models of the patient bones.

12. The system of claim 1, wherein the initial or rough registration is landmark based.

13. The system of claim 1, wherein the initial or rough registration is computed from a position and orientation of anatomy trackers.

14. The system of claim 1, wherein, in computing the initial or rough registration, a third point cloud and a fourth point cloud are generated by the system, the third point cloud being of a first bone of the intraoperative patient bones relative to a first tracker associated with the first bone, the fourth point cloud being of a second bone of the intraoperative patient bones relative to a second tracker associated with the second bone.

15. The system of claim 14, wherein, in computing the initial or rough registration, the system matches bony surface points of the third point cloud onto a computer model of the first bone and the system matches bony surface points of the fourth point cloud onto a computer model of the second bone.

16. The system of claim 1, wherein, in computing the final multiple bone registration wherein there is the final registration between the segregated 3D point cloud and the intraoperative patient bones, the system iteratively refines registration of the segregated 3D point cloud to the pre-operative patient specific computer models of the patient bones, and iteratively refines the segregation of the segregated 3D point cloud.

17. A method of processing an ultrasound image of intraoperative patient bones, the ultrasound image including a bone surface for each of the intraoperative patient bones, the method comprising:
   detecting the bone surface of each of the intraoperative patient bones in the ultrasound image as ultrasound image pixels;
   segregating a first point cloud of the ultrasound image pixels associated with the bone surface of each of the intraoperative patient bones;
   computing a transformation of the first point cloud into a segregated 3D point cloud that is segregated such that the ultrasound image pixels of the segregated 3D point cloud are each correlated to a corresponding bone surface of the intraoperative patient bones;
   computing an initial or rough registration of a second point cloud taken from the patient bones to pre-operative patient specific computer models of patient bones;
   computing a final multiple bone registration employing the initial or rough registration and the segregated 3D point cloud, wherein the final multiple bone registration achieves a final registration between the segregated 3D point cloud and the intraoperative patient bones; and
   using the final multiple bone registration to navigate at least one surgical tool in relation to each of the intraoperative patient bones.

18. The method of claim 17, wherein the detecting of the bone surfaces occurs via an image processing algorithm.

19. The method of claim 18, wherein the image processing algorithm includes a machine learning model.

20. The method of claim 18, wherein the segregating of the first point cloud occurs via a pixel classification neural network.

21. The method of claim 18, wherein the segregating of the first point cloud occurs via an image-based classification neural network.

22. The method of claim 17, wherein, in computing the transformation of the first point cloud into the segregated 3D point cloud, the ultrasound image pixels are calibrated to an ultrasound probe tracker and the ultrasound probe tracker is calibrated to a tracking camera.

23. The method of claim 22, wherein calibrating the ultrasound image pixels to the ultrasound probe tracker is based on a propagation speed of ultrasound waves in a certain medium.

24. The method of claim 17, wherein, in computing the transformation of the first point cloud into the segregated 3D point cloud, the ultrasound image pixels are calibrated to an ultrasound probe tracker, wherein the ultrasound probe tracker is calibrated to one or more of a tracking camera and a coordinate system relative to the bone surface via an anatomy tracker located on the bone surface of the intraoperative patient bones.

25. The method of claim 17, wherein the segregating of the first point cloud occurs via geometric analysis of the first point cloud.

26. The method of claim 17, wherein the second point cloud includes multiple point clouds relative to multiple trackers on the intraoperative patient bones.

27. The method of claim 26, wherein the multiple point clouds include one point cloud registered to one computer model of the pre-operative patient specific computer models of the patient bones and another point cloud registered to another computer model of the pre-operative patient specific computer models of the patient bones.

28. The method of claim 17, wherein the initial or rough registration is landmark based.

29. The method of claim 17, wherein the initial or rough registration is computed from a position and orientation of anatomy trackers.

30. The method of claim 17, wherein, in computing the initial or rough registration, a third point cloud and a fourth point cloud are generated, the third point cloud being of a first bone of the intraoperative patient bones relative to a first tracker associated with the first bone, the fourth point cloud being of a second bone of the intraoperative patient bones relative to a second tracker associated with the second bone.

31. The method of claim 30, wherein, in computing the initial or rough registration, bony surface points of the third point cloud are matched onto a computer model of the first bone and bony surface points of the fourth point cloud are matched onto a computer model of the second bone.

32. The method of claim 17, wherein, in computing the final multiple bone registration wherein there is the final registration between the segregated 3D bone surface point cloud and the patient bones, registration of the segregated 3D point cloud to the pre-operative patient specific computer model of the patient bones is iteratively refined, and the segregation of the segregated 3D point cloud is iteratively refined.

* * * * *